US012632777B2

(12) United States Patent
Yonetani

(10) Patent No.: US 12,632,777 B2
(45) Date of Patent: May 19, 2026

(54) MODEL GENERATION APPARATUS, MODEL GENERATION METHOD, COMPUTER-READABLE STORAGE MEDIUM STORING A MODEL GENERATION PROGRAM, MODEL GENERATION SYSTEM, INSPECTION SYSTEM, AND MONITORING SYSTEM

(71) Applicant: OMRON Corporation, Kyoto (JP)

(72) Inventor: Ryo Yonetani, Tokyo (JP)

(73) Assignee: OMRON Corporation, Kyoto (JP)

( * ) Notice: Subject to any disclaimer, the term of this patent is extended or adjusted under 35 U.S.C. 154(b) by 981 days.

(21) Appl. No.: 17/414,983

(22) PCT Filed: Nov. 18, 2019

(86) PCT No.: PCT/JP2019/044991
§ 371 (c)(1),
(2) Date: Jun. 17, 2021

(87) PCT Pub. No.: WO2020/148992
PCT Pub. Date: Jul. 23, 2020

(65) Prior Publication Data
US 2022/0067584 A1 Mar. 3, 2022

(30) Foreign Application Priority Data

Jan. 18, 2019 (JP) ................................. 2019-006778

(51) Int. Cl.
*G06N 20/00* (2019.01)
(52) U.S. Cl.
CPC ..................................... *G06N 20/00* (2019.01)
(58) Field of Classification Search
CPC ...................................................... G06N 20/00
See application file for complete search history.

(56) References Cited

U.S. PATENT DOCUMENTS 11,341,406 B1 * 5/2022 Redmon ................ G06N 3/084
2015/0365729 A1 * 12/2015 Kaya .................. H04N 21/6582
725/14

(Continued)

FOREIGN PATENT DOCUMENTS

CN 108701265 A 10/2018
JP 2012-26982 A 2/2012

(Continued)

OTHER PUBLICATIONS

Le Trieu Phong et al: "Privacy-Preserving Deep Learning via Additively Homomorphic Encryption", vol. 20180104:045638 Aug. 1, 2017 (Aug. 1, 2017), pp. 1-18, IACR, International Association for Cryptologic Research, XP061034574, Retrieved from the Internet: http://eprint.iacr.org/2017/715.pdf [retrieved on Aug. 1, 2017]; Cited in European Office Action issued on Aug. 21, 2023.

(Continued)

*Primary Examiner* — Matthew Ell
*Assistant Examiner* — Ishan Moundi
(74) *Attorney, Agent, or Firm* — METROLEX IP LAW GROUP, PLLC; Robert L. Scott, Esq.

(57) ABSTRACT

A model generation apparatus according to one or more embodiments may include: a generating unit that generates data using a generation model; a transmitting unit that transmits the generated data to a plurality of trained identification models that each have acquired, by machine learning using local learning data, a capability of identifying whether given data is the local learning data, and causes the identification models to perform an identification on the data; a receiving unit that receives results of identification with respect to the transmitted data executed by the identification models; and a learning processing unit that trains the generation model to generate data that causes identification performance of at least one of the plurality of identification (Continued)

models to be degraded, by performing machine learning using the received results of identification.

9 Claims, 43 Drawing Sheets

(56) References Cited

U.S. PATENT DOCUMENTS

| | | | |
|---|---|---|---|
| 2016/0042292 A1 | 2/2016 | Caplan et al. | |
| 2018/0349757 A1 | 12/2018 | Ando | |
| 2019/0370617 A1* | 12/2019 | Singh | G06T 11/60 |
| 2020/0005196 A1* | 1/2020 | Cai | G06F 16/9535 |
| 2020/0074294 A1* | 3/2020 | Long | G06N 3/044 |

FOREIGN PATENT DOCUMENTS

| | | | | |
|---|---|---|---|---|
| JP | 2017228224 A | * | 12/2017 | |
| JP | 2018-088157 A | | 6/2018 | |
| JP | 2018-147172 A | | 9/2018 | |
| JP | 2020027517 A | * | 2/2020 | |
| KR | 20170088516 A | * | 8/2017 | |

OTHER PUBLICATIONS

European Office Action issued on Aug. 21, 2023 in a counterpart European patent application.

Ian J. Goodfellow et al., "Generative Adversarial Nets", Advances in neural information processing systems, 2014, 2672-2680; Concise explanation of relevance provided in the specification.

Xinyue Zhu et al., "Emotion Classification with Data Augmentation Using Generative Adversarial Networks", arXiv (online), Dec. 14, 2017 (retrieved on Dec. 18, 2019), 14 pages, Retrieved from the Internet: <URL:https://arxiv.org/pdf/1711.00648.pdf>; Relevance is indicated in the (translated) ISR/WO mailed on Jan. 7, 2020.

English translation of the International Search Report ("ISR") of PCT/JP2019/044991 mailed on Jan. 7, 2020.

The Written Opinion("WO") of PCT/JP2019/044991 mailed on Jan. 7, 2020.

Chinease Office Action ("CNOA") issued on Feb. 2, 2024 in a counterpart Chinese patent application.

Corentin Hardy et al.; "MD-GAN; Multi-Discriminator Generative Adversarial Networks for Distributed Datasets"; arXiv:1811.03850v1 [cs.LG]; Nov. 9, 2018.

Keith Bonawitz et al.; "Practical Secure Aggregation for Privacy-Preserving Machine Learning"; Session E5 Privacy0Preserving Analytics; CCS'17; Oct. 30-Nov. 3, 2017, Dallas TX, USA.

Elth Ogston et al.; "A Method for Decentralized Clustering in Large Multi0Agent Systems".

* cited by examiner

| USER ID | GROUP ID |
|---------|----------|
| 000001 | a00001 |
| ⋮ | ⋮ |

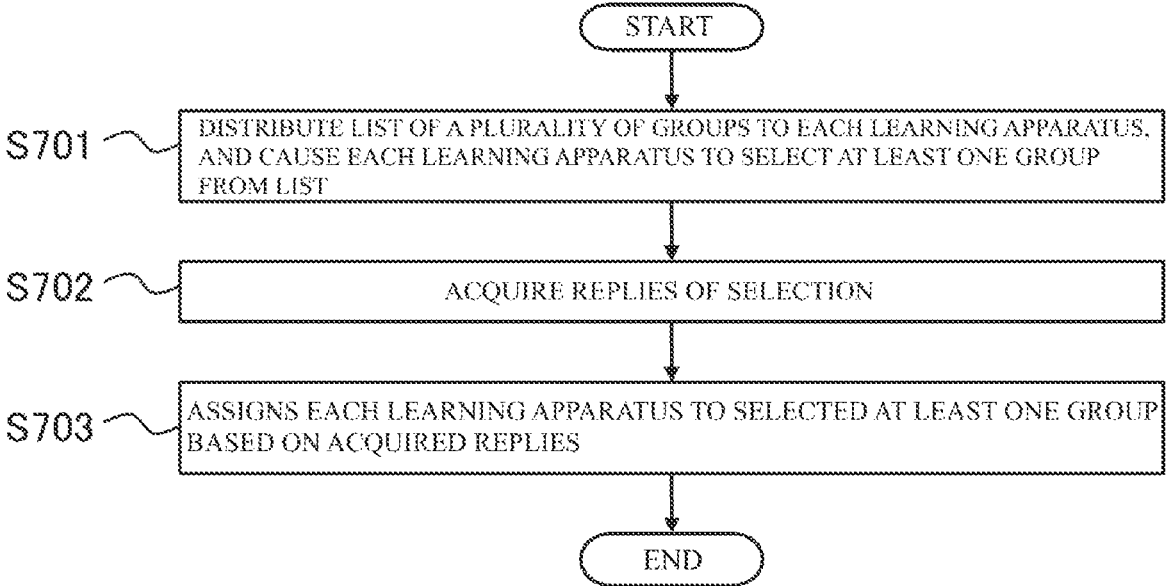

START

S701 — DISTRIBUTE LIST OF A PLURALITY OF GROUPS TO EACH LEARNING APPARATUS, AND CAUSE EACH LEARNING APPARATUS TO SELECT AT LEAST ONE GROUP FROM LIST

S702 — ACQUIRE REPLIES OF SELECTION

S703 — ASSIGNS EACH LEARNING APPARATUS TO SELECTED AT LEAST ONE GROUP BASED ON ACQUIRED REPLIES

END

FIG. 13

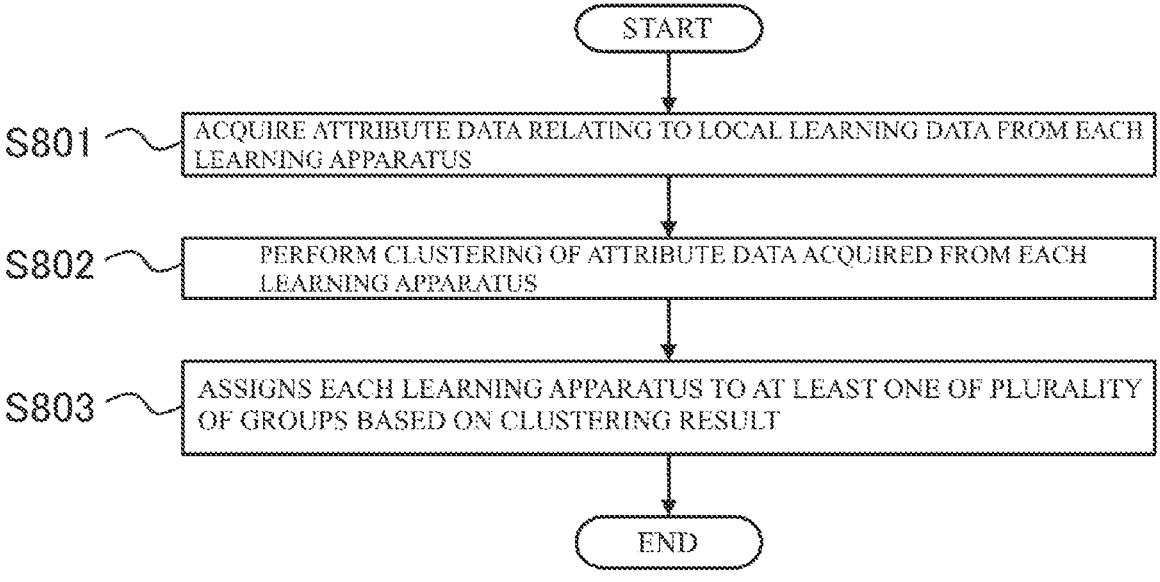

START

S801 — ACQUIRE ATTRIBUTE DATA RELATING TO LOCAL LEARNING DATA FROM EACH LEARNING APPARATUS

S802 — PERFORM CLUSTERING OF ATTRIBUTE DATA ACQUIRED FROM EACH LEARNING APPARATUS

S803 — ASSIGNS EACH LEARNING APPARATUS TO AT LEAST ONE OF PLURALITY OF GROUPS BASED ON CLUSTERING RESULT

END

Figure 21B:
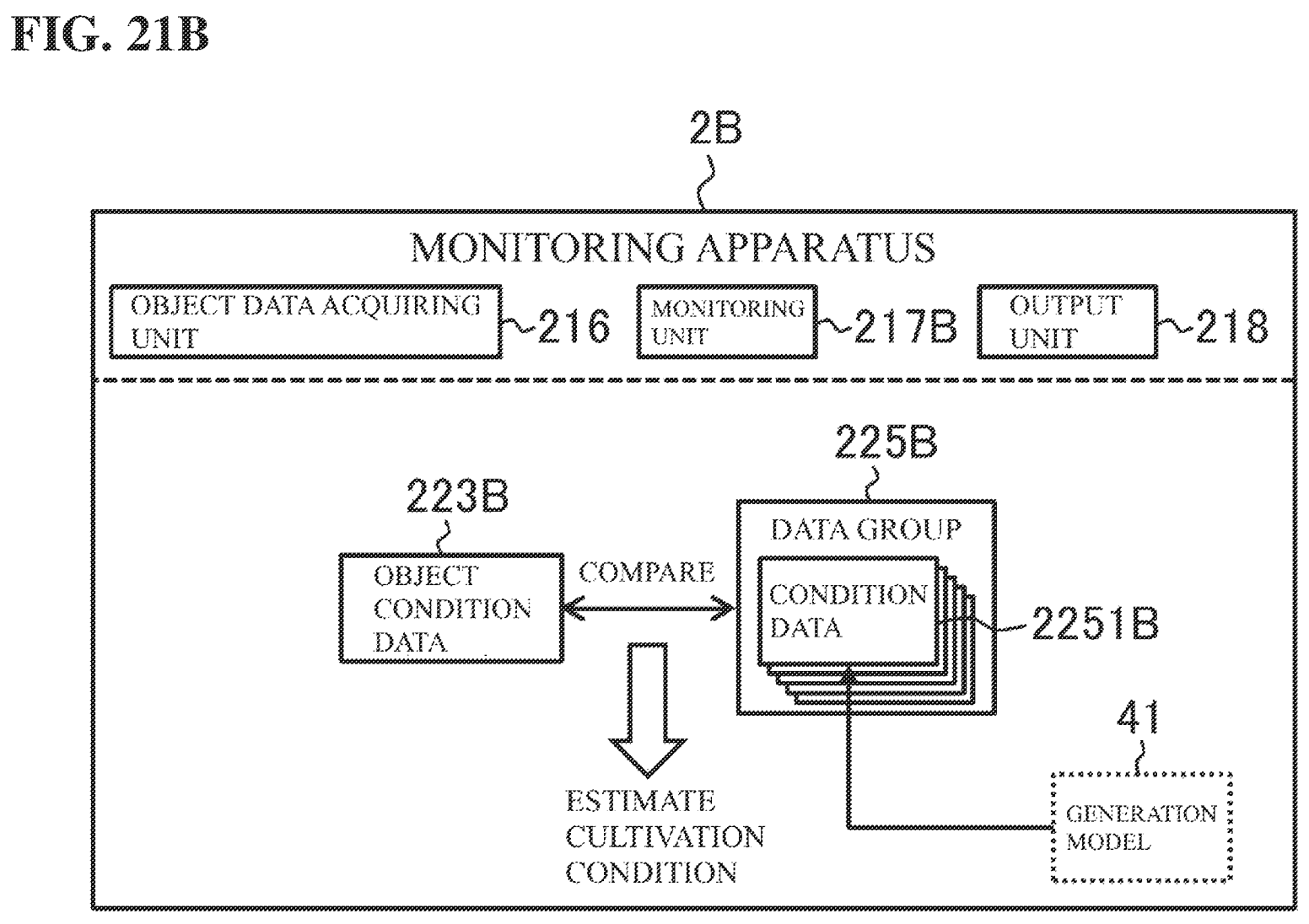

MONITORING APPARATUS

OBJECT DATA ACQUIRING UNIT ~216

MONITORING UNIT ~217B

OUTPUT UNIT ~218

225B — DATA GROUP

CONDITION DATA ~2251B

223B — OBJECT CONDITION DATA

COMPARE

ESTIMATE CULTIVATION CONDITION

41 — GENERATION MODEL

Figure 24B:
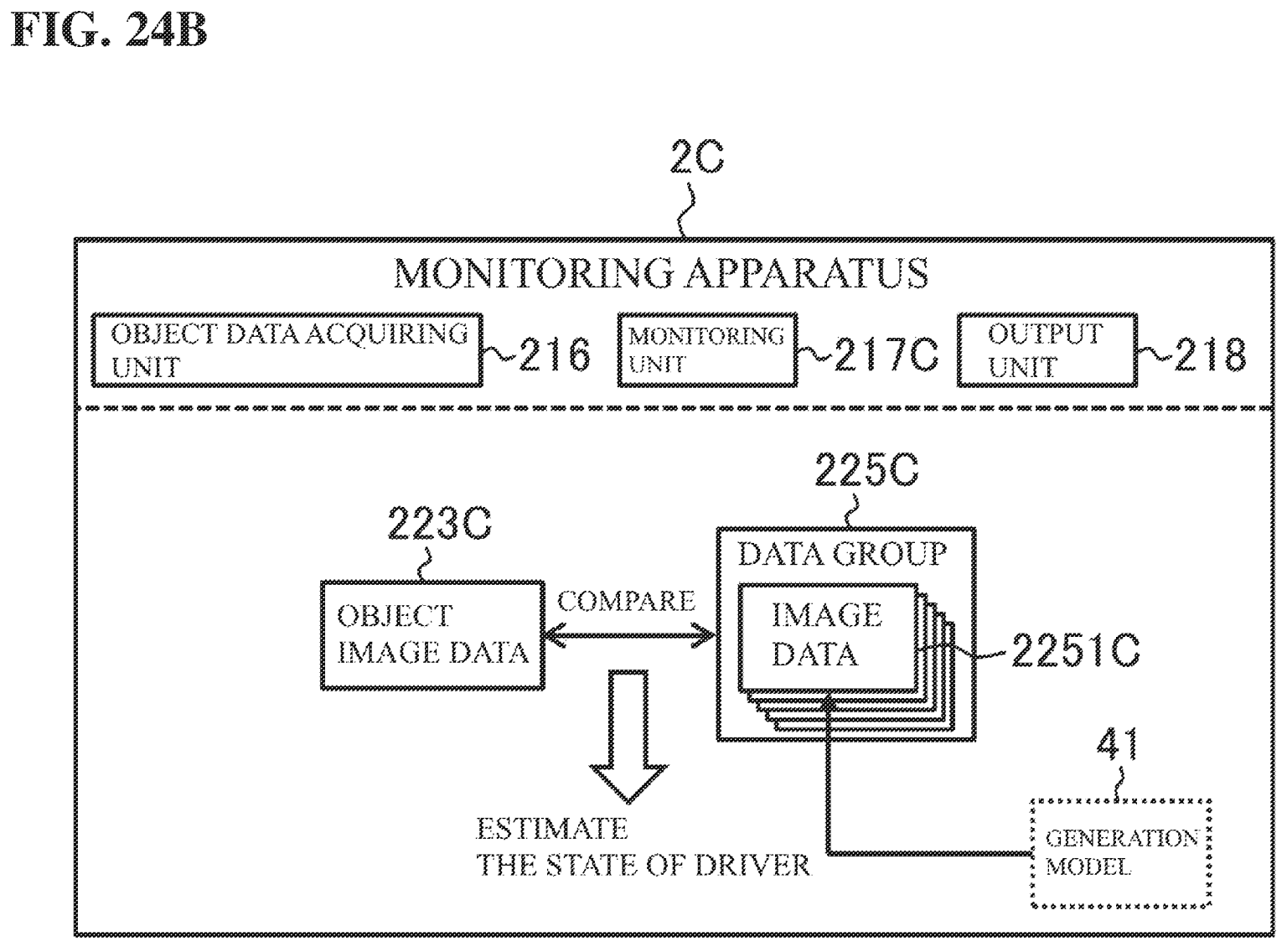

MONITORING APPARATUS

OBJECT DATA ACQUIRING UNIT ~216

MONITORING UNIT ~217C

OUTPUT UNIT ~218

223C

OBJECT IMAGE DATA

COMPARE

225C

DATA GROUP

IMAGE DATA

2251C

41

GENERATION MODEL

ESTIMATE THE STATE OF DRIVER

FIG. 27B

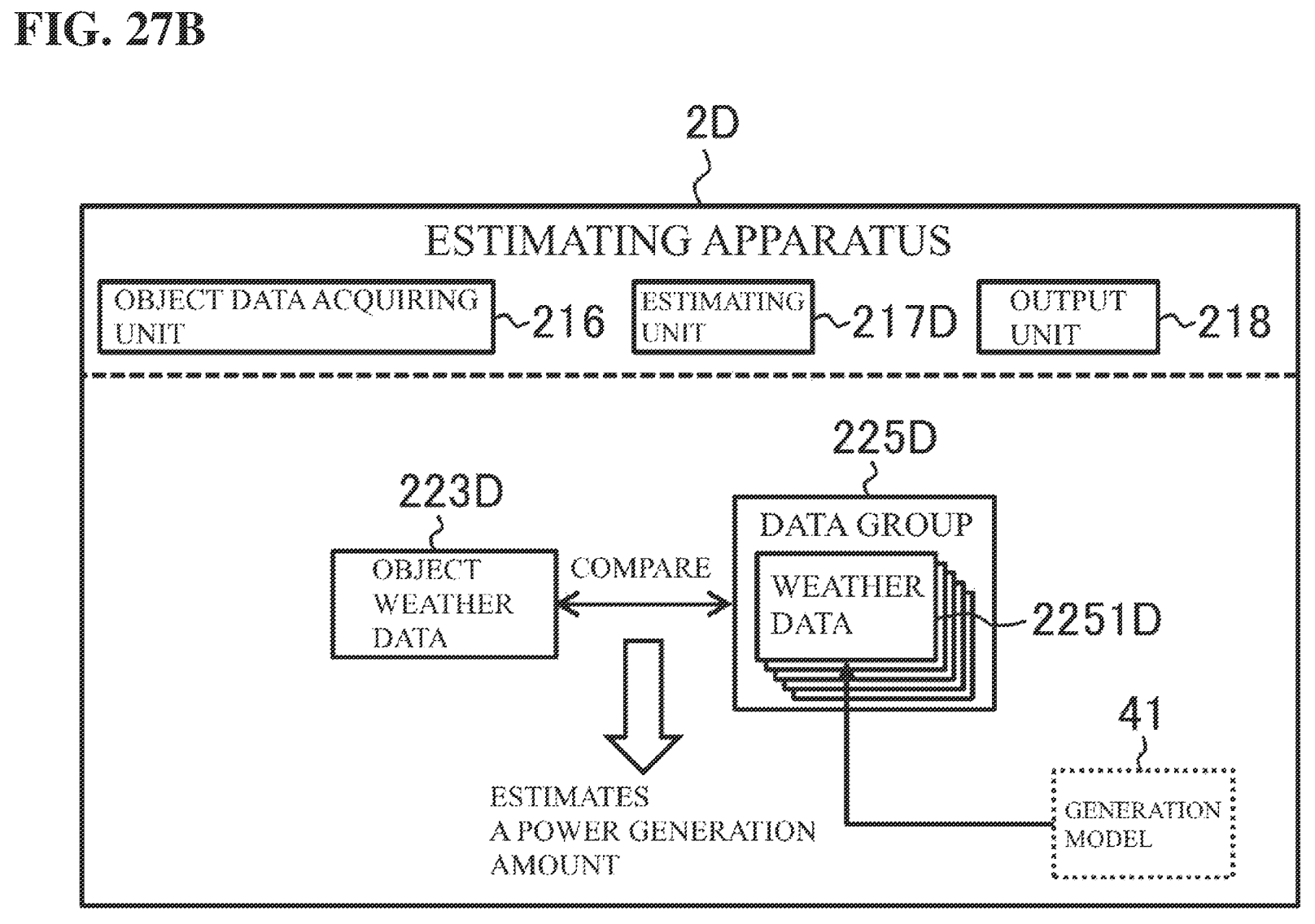

ESTIMATING APPARATUS 2D

OBJECT DATA ACQUIRING UNIT ~216

ESTIMATING UNIT ~217D

OUTPUT UNIT ~218

DATA GROUP 225D

WEATHER DATA 2251D

GENERATION MODEL 41

COMPARE

OBJECT WEATHER DATA 223D

ESTIMATES A POWER GENERATION AMOUNT

FIG. 28

MODEL GENERATION APPARATUS, MODEL GENERATION METHOD, COMPUTER-READABLE STORAGE MEDIUM STORING A MODEL GENERATION PROGRAM, MODEL GENERATION SYSTEM, INSPECTION SYSTEM, AND MONITORING SYSTEM

TECHNICAL FIELD

The present invention relates to a model generation apparatus, a model generation method, a model generation program, a model generation system, an inspection system, and a monitoring system.

RELATED ART

Heretofore, in scenarios such as production lines of producing products, a technique is used in which products to be produced are shot (photographed) by a shooting (photographing) apparatus, and the quality of the products are inspected based on the obtained image data. For example, Patent Document 1 proposes an inspection apparatus that determines whether an object to be inspected in an image is normal or anomalous based on a trained first neural network, and if it is determined that the object to be inspected is anomalous, classifies the type of the anomaly based on a trained second neural network.

RELATED ART DOCUMENT

Patent Document

Patent Document 1: JP 2012-026982A

Non-Patent Document

Non-Patent Document 1: Ian J. Goodfellow, Jean Pouget-Abadie, Mehdi Mirza, Bing Xu, David Warde-Farley, Sherjil Ozair, Aaron Courville, Yoshua Bengio, "Generative Adversarial Networks", Advances in neural information processing systems, 2672-2680, 2014.

SUMMARY

As described above, as a result of performing machine learning in which learning data that includes image data including images of products is used, a learning model can acquire the capability of estimating the state of a product in an image included in the image data. Therefore, as a result of using a trained learning model as an estimator (discriminator), the quality of a product to be inspected in an image included in object image data can be determined.

Also, the quality of a product to be inspected that is in an image included in object image data can be determined based on comparison between an image data group, which is collected as learning data, that includes images of normal or anomalous products, and the object image data, without using such a learning model. For example, when an image data group of images of normal products is compared with object image data, if the object image data is in accordance with the distribution of the image data group (that is, the object image data is similar to the image data group), it can be determined that the product in the image included in the object image data is normal. On the other hand, if the object image data deviates from the distribution of the image data group, it can be determined that the product in the image included in the object image data is anomalous. Note that, in the following, the learning data collected for learning an inference, such as for quality determination, may also be referred to as "inference learning data". In particular, when it is used in machine learning of an estimator, the learning data collected for learning an inference may also be referred to as "estimator learning data".

The inventors found that these known inspection methods in which image data is used have the following problem: In order to perform the visual inspection of products highly accurately using image data, it is desirable that a sufficient amount of and a wide variety of image data are collected as inference learning data to be used in learning for visual inspection. For example, when the amount of inference learning data to be used in the aforementioned machine learning is small, the accuracy of visual inspection performed by a trained estimator is not sufficient. Therefore, in order to improve the capability of the estimator for visual inspection, it is desirable that a sufficient amount of inference learning data is collected. However, collecting a sufficient amount of inference learning data is costly.

Therefore, the inventors examined how to increase the amount of inference learning data by mass-producing a plurality of different images from prepared images using a generation model. For example, a method of constructing a generation model, by machine learning, from image data prepared as learning data is proposed in Non-Patent Document 1. This generation model is trained to generate image data in accordance with the distribution of learning data by machine learning. That is, if image data including images of products is used as learning data, the generation model is trained to generate image data that may include images of the product. Therefore, as a result of using this generation model, image data including images of the product can be generated. Therefore, the amount of inference learning data that can be used for learning for visual inspection can be appropriately increased, and with this, the cost of collecting a sufficient amount of inference learning data in order to improve the accuracy of visual inspection can be reduced.

However, the inventors found that, even if such a generation model is used, the following problem is present. That is, there is a limit to the collection of learning data at individual sites, and therefore it is difficult to collect a large amount of learning data that is valuable for improving the inspection capability (e.g., image data at the time when an anomaly occurs in the product) in a short period of time. In addition, the image data obtained as learning data may be skewed due to location, environment, conditions, and the like. Therefore, it is difficult to collect a wide variety of image data at each individual site. Therefore, even if a generation model is constructed at each site, it is difficult to generate a wide variety of image data using the obtained generation model.

Therefore, the inventors examined how to construct a generation model with which a wide variety of image data can be generated by gathering image data obtained in many sites and performing machine learning using the gathered image data, in order to solve this problem. For example, assume that there are different factories in which the same products are visually inspected, and the shooting conditions such as camera arrangement and illumination are different between the factories. In this case, as a result of gathering image data obtained in each factory, a wide variety of image data in which shooting conditions are different can be obtained as learning data. Also, learning data including valuable events that have occurred in the factories (e.g., image data at the time when an anomaly occurs in the product) can be obtained.

However, individual sites may be independently operated based on their individual situation. At each site, learning data is basically collected irrespectively from other sites. Therefore, the learning data obtained at the respective sites is not uniform in terms of shooting conditions and the like. And what is more, it is not necessarily the same object that is inspected at the various sites. Therefore, it is possible that the original image data obtained in the respective sites cannot be used for common (shared) machine learning. In addition, if a large amount of learning data obtained at each site is gathered in a server, the cost of communication with the server is enormous. Also, the calculation cost incurred for constructing a generation model by performing machine learning using the gathered non-uniform and large-volume learning data increases. Therefore, it is possible that problems occur such as shortage of memory used for calculation processing, lengthening of calculation processing time, and the calculation processing being not completed in a predetermined time. Moreover, there are cases where learning data that is highly confidential is included in learning data obtained at each site. In this case, if the learning data obtained at each site is gathered in a server on a common (shared) network, the confidentiality of the learning data is lost.

As described above, there are various technical barriers to gathering learning data obtained at each site in order to perform machine learning of a generation model. Therefore, it is not realistic to increase the diversity of image data to be generated by a generation model with this method of gathering learning data. The inventors found that there is a problem in that it is difficult to construct, with the known methods, a generation model that can generate a wide variety of image data. Due to this, with the known methods, it is difficult to realize highly accurate visual inspection of products using image data.

Note that this problem is not specific to the scenario in which a generation model is constructed that is trained to generate image data that can be used in learning how to estimate the state (quality) of a product. A similar problem occurs in any scenario in which a generation model is constructed that is trained to generate predetermined data, in particular, data that can be used for learning a predetermined inference. Examples of scenarios of generating data that can be used for learning a predetermined inference using a generation model are a scenario in which the state of a plant from is estimated data regarding cultivation condition of the plant, a scenario in which the state of a driver is estimated from data obtained by observing the driver, a scenario in which the power generation amount of an power generator is estimated from data regarding weather, a scenario in which the health status of a subject is estimated from vital data of the subject, and so on. The predetermined learning data in these scenarios is image data, sound data, numerical data, text data, measurement data obtained by sensors, or the like. In these scenarios as well, it is difficult to collect various types of learning data for training a generation model at each site separately. Also, various technical barriers are present in terms of gathering learning data obtained at each site in order to perform machine learning of a generation model. Therefore, there is a problem in that it is difficult to construct, with the known methods, a generation model that can generate a wide variety of data. Due to this, with the known methods, it is difficult to realize highly accurate inference using predetermined data.

In view of the foregoing situation, one or more embodiments may provide a technique for constructing a generation model that may generate a wide variety of data.

A model generation apparatus, model generation method, computer-readable storage medium storing a model generation program, model generation system, inspection system, and monitoring system according to one or more embodiments may adopt the following configuration in order to solve the problem stated above.

That is, a model generation apparatus according to one or more a embodiments may include: a generating unit configured to generate data using a generation model; a transmitting unit configured to transmit the generated data to a plurality of trained identification models that each have acquired, by machine learning using local learning data, a capability of identifying whether given data is the local learning data, and cause the identification models to perform an identification on the data; a receiving unit configured to receive results of identification with respect to the transmitted data executed by the identification models; and a learning processing unit configured to train the generation model to generate data that causes identification performance of at least one of the plurality of identification models to be degraded, by performing machine learning using the received results of identification.

A model generation apparatus according to the configuration transmits data generated by the generation model (hereinafter, may also be referred to as "generation data") to the identification models, and causes the identification model to perform an identification on the data. Each identification model is constructed to identify whether given data is data included in the local learning data, by machine learning. Also, the model generation apparatus according to the configuration collects results of identifications executed by the identification models with respect to the transmitted generation data, and execute machine learning of the generation model using the collected results of identification.

Therefore, with this configuration, instead of collecting local learning data itself, results of identification performed by the identification models are collected in order to perform machine learning of the generation model. With this, in a case where the local learning data and the identification model are arranged in each of separate apparatuses, the cost of communication with the model generation apparatus can be kept low. Also, since the local learning data itself need not be used for machine learning of the generation model, the calculation cost of the model generation apparatus can be kept low. Moreover, the local learning data need not be gathered to the model generation apparatus, and therefore the contents of the local learning data can be prevented from being directly disclosed. That is, the confidentiality of the local learning data can be ensured to some degree. Therefore, according to the configuration, various problems that may occur in the aforementioned method of gathering learning data can be solved.

In addition, a model generation apparatus according to the configuration trains the generation model to generate data that causes the identification performance of at least one of the plurality of identification models to be degraded, by performing machine learning using the collected results of identification. That is, the generation model is trained to generate data that causes erroneous identification of (that is, deceives) at least one of the plurality of identification models by the machine learning. With this, a generation model that can generate data that is in accordance with the distribution of any non-uniform local learning data and has been used for the machine learning of the identification model can be constructed. Therefore, as a result of training by the machine learning, the generation model can acquire the capability of generating data that may be included in the distribution of the logical sum of pieces of local learning data that have been used for machine learning of the identification models. Therefore, according to the configuration, an environment for constructing a generation model that can generate various data can be realized. The data generated by the constructed generation model may be used for learning a predetermined inference.

Note that the generation model and the plurality of identification models are each a learning model that can acquire the capability by machine learning, and the type thereof is not limited in particular, and may be selected as appropriate depending on the embodiment. A neural network or the like may be used for the generation model and the plurality of identification models. The generation model may be referred to as a generator, and the identification model may also be referred to as a discriminator. Note that, in the machine learning, as a result of using data to which an additional condition (e.g., label) is given as the local learning data, a conditional generation model that can generate data according to the additional condition can be constructed. The generation model may also be such a conditional generation model. The additional condition need only be related to the type of data to be generated by the generation model, and may also be given by the attribute of data to be generated, the attribute of a feature appearing in data to be generated, or the like. When the data to be generated is image data, the attribute of data to be generated may be the resolution, the number of pixels, an item indicating whether or not a defect is present, or the like. Also, the attribute of a feature appearing in data to be generated may be the attribute of an object regarding which inference is performed, the type of the object, or the like.

The local learning data is learning data to be used for machine learning of the identification model, but the usage of the local learning data is not limited to the machine learning of the identification model. The local learning data may be collected for various purposes of use. For example, image data of product images may be collected as the local learning data in order to be used in learning for visual inspection (that is, to be used as inference learning data). The type of data included in the local learning data is not limited in particular, and may be selected as appropriate depending on the embodiment. The local learning data may be constituted by image data, sound data, numerical data, text data, measurement data obtained by a sensor, or the like. Each local learning data ultimately determines the distribution of data to be generated by the generation model. The generation model is configured to generate data of the same type as the local learning data. The trained generation model may be used for mass-producing data of the same type as the local learning data.

In a model generation apparatus according to the one or more embodiments, the identification models may be retained by the respective learning apparatuses, the transmitting unit may cause the identification models to each perform an identification on the data by transmitting the generated data to the learning apparatuses, and the receiving unit may receive results of identification performed by the identification models from the respective learning apparatuses. According to the configuration, a generation model that can generate various data can be constructed without gathering local learning data that has been used for machine learning of the identification model of each learning apparatus.

In a model generation apparatus according to the one or more embodiments, the results of identification performed by the identification models may be integrated by a secret calculation, and the learning processing unit may train the generation model by performing machine learning using the integrated results of identification. According to the configuration, the confidentiality of the local learning data that has been used for machine learning of the identification model retained by each learning apparatus can further be improved.

A model generation apparatus according to the one or more embodiments may further include a grouping unit configured to assign each learning apparatus to at least one of a plurality of groups, and may retain a generation model for each group. Also, the receiving unit may receive, for each group, the results of identification performed by the identification models from the respective learning apparatuses, and the learning processing unit may train, for each group, the generation model to generate data that causes erroneous identification with at least one of the plurality of identification models by performing machine learning using the received results of identification. According to the configuration, the learning apparatuses are classified into groups, and a generation model that can generate various data can be constructed for each group.

In a model generation apparatus according to the one or more embodiments, the grouping unit may distribute a list of the plurality of groups to each learning apparatus, cause the learning apparatus to select at least one group from the plurality of groups on the list, and assign the learning apparatus to the selected at least one group. According to the configuration, the learning apparatuses can be classified into groups with a simple method.

In a model generation apparatus according to the one or more embodiments, the grouping unit may acquire attribute data regarding the local learning data from each learning apparatus, perform clustering of the attribute data acquired from the learning apparatuses, and assign each of the plurality of learning apparatuses to at least one of the plurality of groups based on the clustering result. According to the configuration, the learning apparatuses can be classified into groups according to the attribute of local learning data.

Note that the attribute data may include any information regarding the local learning data, and may include information indicating the type of data included in the local learning data, information indicating the feature appearing in data, information indicating the purpose of use of data, and the like. The feature appearing in data may include any element that can be inferred from the data. When the local learning data is constituted by image data of product images, the feature appearing in data may be whether or not a defect is included in the product, the type of defect included in the product, or the like. Also, the purpose of use of data may be determined as appropriate depending on the embodiment. The data included in the local learning data may be used for learning a predetermined inference such as visual inspection, monitoring of cultivation condition, or the like.

A model generation apparatus according to the modes described above, one or more embodiments may also include an information processing method for realizing the configurations described above, a program, or a storage medium that can be read by a computer or the like, and stores such a program. Here, the storage medium that can be read by a computer or the like is a medium that stores information such as programs via an electrical, magnetic, optical, mechanical or chemical effect. Also, the model generation system according to one or more embodiments may be constituted by the model generation apparatus according to any of the modes described above and a plurality of learning apparatuses.

For example, a model generation system according to one or more embodiments may include a plurality of learning apparatuses and a model generation apparatus. Each learning apparatus is configured to execute collecting local learning data, and constructing a trained identification model that has acquired, by machine learning using local learning data, a capability of identifying whether given data is the local learning data. The model generation apparatus is configured to execute a generating data using a generation model, causing, by transmitting the generated data to the learning apparatuses, the identification models of the learning apparatuses to each perform an identification on the data, receiving, from the learning apparatuses, results of identification performed by the identification models of the respective learning apparatus, and a step of training the generation model to generate data that causes identification performance of at least one of the plurality of identification models to be degraded, by performing machine learning using the received results of identification.

Also, for example, a model generation system according to one or more embodiments may include a plurality of learning apparatuses and a model generation apparatus. Each learning apparatus is configured to execute collecting local learning data, and constructing a trained identification model that has acquired, by machine learning using local learning data, a capability of identifying whether given data is the local learning data. The model generation apparatus is configured to execute generating data using a generation model, a step of causing, by transmitting the generated data to the learning apparatuses, the identification models of the learning apparatuses to each perform an identification on the data, receiving, from the learning apparatuses, results of identification performed by the identification models of the respective learning apparatus, and a step of training the generation model to generate data that causes identification performance of at least one of the plurality of identification models to be degraded, by performing machine learning using the received results of identification. Moreover, each learning apparatus is configured to execute a step of acquiring object data, acquiring a data group that is collected as inference learning data for inferring the feature, and includes data generated by the trained generation model, inferring the feature appearing in the object data based on a comparison between the data group and the object data, and a step of outputting information regarding the result of inferring the feature.

Also, for example, a model generation system according to one or more embodiments may include a plurality of learning apparatuses and a model generation apparatus. Each learning apparatus is configured to execute a step of collecting local learning data, and constructing a trained identification model that has acquired, by machine learning using local learning data, a capability of identifying whether given data is the local learning data. The model generation apparatus is configured to execute generating data using a generation model, causing, by transmitting the generated data to the learning apparatuses, the identification models of the learning apparatuses to each perform an identification on the data, receiving, from the learning apparatuses, results of identification performed by the identification models of the respective learning apparatus, and training the generation model to generate data that causes identification performance of at least one of the plurality of identification models to be degraded, by performing machine learning using the received results of identification. Moreover, each learning apparatus is configured to execute collecting local inference learning data that is used to acquire the capability of inferring the feature by machine learning, and includes data generated by the trained generation model, constructing a trained estimator that has acquired the capability of inferring the feature appearing in data by machine learning using the collected local inference learning data, acquiring object data, estimating the feature appearing in the object data using the trained estimator, and outputting information regarding the result of estimating the feature.

Also, for example, a model generation method according to one or more embodiments is an information processing method in which a computer executes: generating data using a generation model; transmitting the generated data to a plurality of trained identification models that each have acquired, by machine learning using local learning data, a capability of identifying whether given data is the local learning data, and causing the identification models to perform an identification on the data; a step of receiving results of identification with respect to the transmitted data executed by the identification models; and training the generation model to generate data that causes identification performance of at least one of the plurality of identification models to be degraded, by performing machine learning using the received results of identification.

Also, for example, a non-transitory computer-readable storage medium storing model generation program, which when read and executed, causes a computer to perform operations including: a step of generating data using a generation model; transmitting the generated data to a plurality of trained identification models that each have acquired, by machine learning using local learning data, a capability of identifying whether given data is the local learning data, and causing the identification models to perform an identification on the data; receiving results of identification with respect to the transmitted data executed by the identification models; and training the generation model to generate data that causes identification performance of at least one of the plurality of identification models to be degraded, by performing machine learning using the received results of identification.

The modes described above can be applied to any scenario in which a generation model is constructed that has been trained to generate predetermined data, in particular, data that can be used for learning a predetermined inference. The modes described above may be applied to a scenario in which the state of a plant is estimated from data regarding the cultivation condition of the plant, a scenario in which the state of a driver is estimated from data obtained by observing the driver, a scenario in which the power generation amount of a power generator is estimated from data regarding the weather, a scenario in which the health status of a subject is estimated from vital data of the subject, or the like. The predetermined data may be image data, sound data, numerical data, text data, measurement data obtained by a sensor, or the like.

For example, an image generation system according to one or more embodiments include a plurality of learning apparatuses and a model generation apparatus. Each learning apparatus is configured to execute collecting local learning data including image data, and constructing a trained identification model that has acquired, by machine learning using local learning data, a capability of identifying whether given data is the image data included in the local learning data. The model generation apparatus is configured to execute generating image data using a generation model, causing, by transmitting the generated image data to the learning apparatuses, the identification models of the learning apparatuses to each perform an identification on the image data, receiving, from the learning apparatuses, results of identification performed by the identification models of the respective learning apparatus, and training the generation model to generate image data that causes identification performance of at least one of the plurality of identification models to be degraded, by performing machine learning using the received results of identification.

For example, a sensing data generation system according to one or more embodiments include a plurality of learning apparatuses and a model generation apparatus. Each learning apparatus is configured to execute collecting local learning data including sensing data obtained by a sensor, and constructing a trained identification model that has acquired, by machine learning using local learning data, a capability of identifying whether given data is the sensing data included in the local learning data. The model generation apparatus is configured to execute a step of generating sensing data using a generation model, causing, by transmitting the generated sensing data to the learning apparatuses, the identification models of the learning apparatuses to each perform an identification on to the sensing data, receiving, from the learning apparatuses, results of identification performed by the identification models of the respective learning apparatus, and a step of training the generation model to generate sensing data that causes identification performance of at least one of the plurality of identification models to be degraded, by performing machine learning using the received results of identification.

For example, an inspection system according to one or more embodiments include a plurality of inspection apparatuses and a model generation apparatus. Each inspection apparatus is configured to execute collecting local learning data including product image data of a product image, constructing a trained identification model that has acquired, by machine learning using local learning data, a capability of identifying whether given data is the product image data included in the local learning data. The model generation apparatus is configured to execute generating image data using a generation model, causing, by transmitting the generated image data to each learning apparatus, the identification model of the learning apparatus to perform an identification on the image data, receiving, from each learning apparatus, a result of an identification performed by the identification model of the learning apparatus, and training the generation model to generate image data that causes identification performance of at least one of the plurality of identification models to be degraded, by performing machine learning using the received results of identification.

Also, for example, a monitoring system according to one or more embodiments include a plurality of monitoring apparatuses that each monitors a cultivation condition of a plant and a model generation apparatus. Each monitoring apparatus is configured to execute collecting local learning data including condition data regarding a cultivation condition of the plant, and constructing a trained identification model that has acquired, by machine learning using local learning data, a capability of identifying whether given data is the condition data included in the local learning data. The model generation apparatus is configured to execute generating pseudo-condition data using a generation model, causing, by transmitting the generated pseudo-condition data to each learning apparatus, the identification model of the learning apparatus to perform in identification with respect to the pseudo-condition data, receiving, from each learning apparatus, a result of an identification performed by the identification model of the learning apparatus, and training the generation model to generate pseudo-condition data that causes identification performance of at least one of the plurality of identification models to be degraded, by performing machine learning using the received results of identification.

According to one or more embodiments, a generation model that may generate various data may be constructed.

BRIEF DESCRIPTION OF THE DRAWINGS

FIG. 5 is a schematic diagram illustrating an example of a software configuration of a model generation apparatus according to one or more embodiments.

FIG. 6 is a schematic diagram illustrating an example of a configuration of assignment information according to one or more embodiments.

FIG. 7B is a schematic diagram illustrating an example of a software configuration for inference processing of a learning apparatus according to one or more embodiments.

FIG. 12 is a diagram illustrating an example of a processing procedure relating to grouping of learning apparatuses by a model generation apparatus according to one or more embodiments.

FIG. 13 is a diagram illustrating an example of a processing procedure relating to grouping of learning apparatuses by a model generation apparatus according to one or more embodiments.

FIG. 21B is a schematic diagram illustrating an example of a software configuration for monitoring processing of a monitoring apparatus according to another mode.

FIG. 24B is a schematic diagram illustrating an example of a software configuration for monitoring processing of a monitoring apparatus according to another mode.

FIG. 27B is a schematic diagram illustrating an example of a software configuration for estimating processing of an estimating apparatus according to another mode.

FIG. 28 is a schematic diagram illustrating an example of another scenario to which one or more embodiments from the disclosure is applied.

DETAILED DESCRIPTION

Hereinafter, one or more embodiments (also referred to as "the present embodiment" below) will be described based on the drawings. However, embodiments described below are merely examples in every respect. Needless to say, various improvements and modifications may be made without departing from the contemplated scope. That is to say, to implement one or more embodiments disclosed herein, a specific configuration corresponding to that implementation may also be employed as appropriate. Note that, although data that is used in one or more embodiments is described using natural language, more specifically, the data is defined by pseudo-language, it is understood that in implementations, such data may be given by commands, parameters, machine language, or the like that can be recognized by a computer.

1. Application Example

Figure 1:
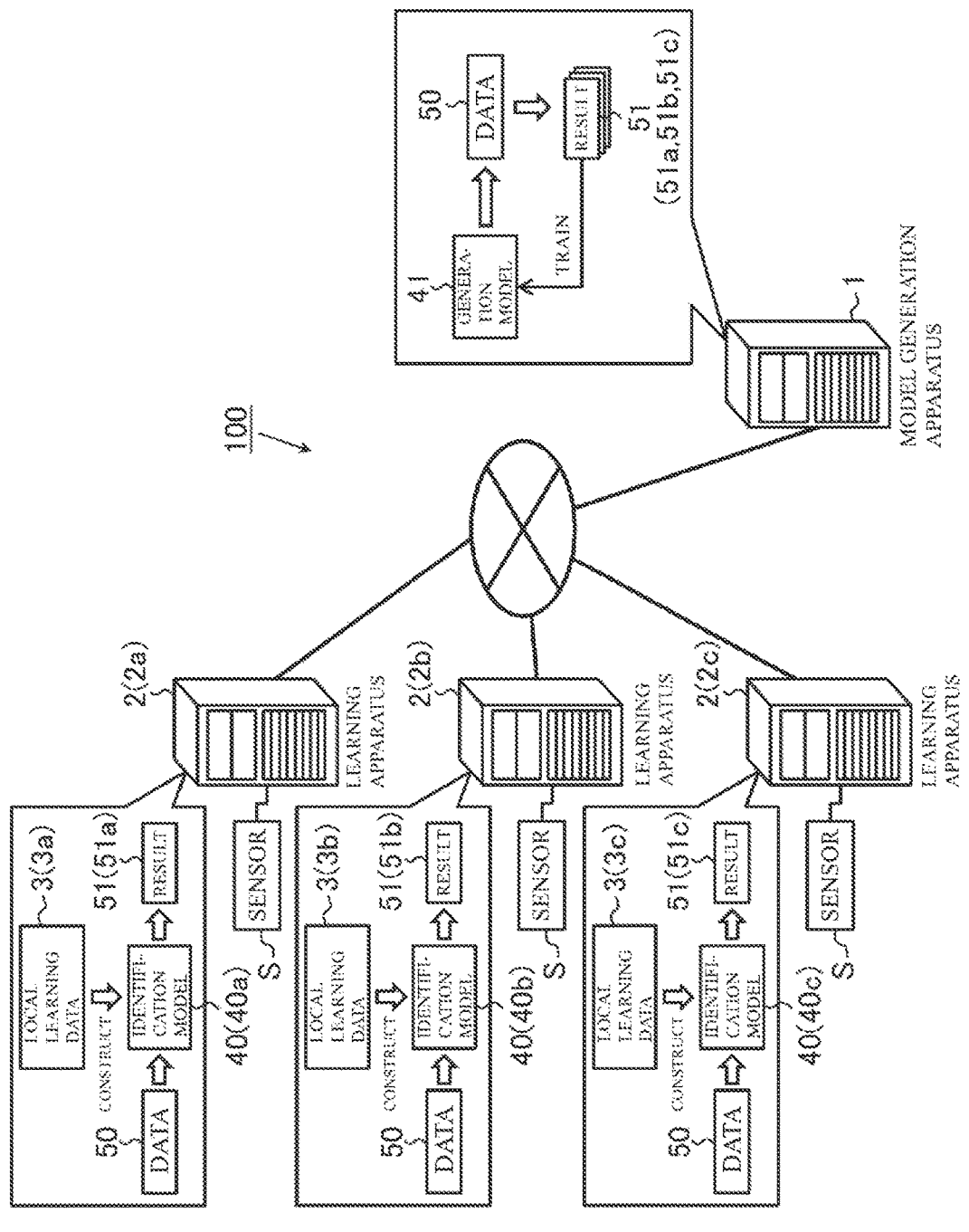
FIG. 1 is a schematic diagram illustrating an example of a scenario to which one or more embodiments are applied.

First, an example of a scenario to which the present invention is applied will be described using FIG. 1. FIG. 1 schematically illustrates an example of the scenario to which the present invention is applied. As illustrated in FIG. 1, a model generation system 100 according to the present embodiment includes a model generation apparatus 1 and a plurality of learning apparatuses 2. The model generation apparatus 1 and the learning apparatuses 2 may be connected to each other via a network. The type of the network may be selected as appropriate from the Internet, a wireless communication network, a mobile communication network, a telephone network, a dedicated network, and the like.

Each learning apparatus 2 according to the present embodiment is a computer configured to execute machine learning of an identification model 40 using local learning data 3. Specifically, each learning apparatus 2 according to the present embodiment collects local learning data 3. Also, each learning apparatus 2 constructs a trained identification model 40 that has acquired the capability of identifying whether or not given data is included in the local learning data 3 by performing machine learning using the local learning data 3.

As described above, the local learning data 3 is learning data that is used for machine learning of the identification model 40, but the usage of the local learning data 3 is not limited to the machine learning of the identification model 40. The local learning data 3 may be collected for various utilization purposes. For example, in order to be used for learning for visual inspection, image data including images of products may be collected as the local learning data 3. Each learning apparatus 2 may treat data collected for other utilization purposes as the local learning data 3.

In the present embodiment, sensors S are connected to respective learning apparatuses 2. With this, each learning apparatus 2 is configured to execute processing for inferring a feature appearing in sensing data obtained by the sensor S. Therefore, the local learning data 3 may be collected in order to be used to infer any feature included in the sensing data obtained by the sensor S. That is, the local learning data 3 may be constituted by a group of data obtained by the sensor S or a sensor of the same type.

Note that the type of the sensor S is not limited in particular as long as it is able to acquire some sort of data, and may be selected as appropriate depending on the embodiment. The sensor S may be a camera, a microphone, a photometer, a thermometer, a hygrometer, or a vital sensor, for example. The camera may be a common digital camera configured to acquire an RGB image, a depth camera configured to acquire a depth image, or an infrared camera configured to image an infrared amount, for example. A camera for taking the outer appearance of products may be adopted as the sensor S, as an example. In this case, the sensing data may be image data including images of products, and inferring a feature may mean estimating the state of the product in the image of the image data.

The learning apparatuses 2 may be arranged at separate sites, and used by different users, for example. Each learning apparatus 2 may collect inference learning data for the purpose of an inference that depends on the individual situation. In this case, each learning apparatus 2 may use the collected inference learning data as the local learning data 3. Note that the arrangement and the user of each learning apparatus 2 are not limited in particular, and may be selected as appropriate depending on the embodiment. For example, at least some learning apparatuses 2 may be arranged at the same site and used by the same user.

On the other hand, the model generation apparatus 1 according to the present embodiment is a computer configured to construct a generation model 41 that can generate the same type of data as the local learning data 3. Specifically, the model generation apparatus 1 according to the present embodiment generates data 50 using the generation model 41. Next, the model generation apparatus 1 causes the identification model 40 of each learning apparatus 2 to execute identification with the data 50 by transmitting the generated data 50 to the learning apparatuses 2. Each learning apparatus 2 identifies whether or not the data 50 is included in its local learning data 3 using the identification model 40.

The model generation apparatus 1 according to the present embodiment receives a result 51 of the identification performed by the identification model 40 of each learning apparatus 2 from each learning apparatus 2. Also, by machine learning in which the received results 51 of the identification are used, the model generation apparatus 1 trains the generation model 41 to generate data that causes the identification performance of at least one of the plurality of identification models 40 to be degraded.

Note that the type of data included in the local learning data 3 is not limited in particular, and may be selected as appropriate depending on the embodiment. The local learning data 3 may be constituted by image data, sound data, numerical data, text data, and measurement data obtained by a sensor, for example. All pieces of local learning data 3 ultimately determine the distribution of data that is generated by the generation model 41. The generation model 41 is configured to generate data of the same type as the local learning data 3. The trained generation model 41 may be used to mass-produce data of the same type as the local learning data 3. The mass-production of data of the same type may be performed to increase the number of pieces of data that are to be compared with object data regarding which a predetermined inference is to be performed, in order to increase the number of pieces of inference learning data that is used to cause an estimator to learn the capability of performing the predetermined inference, for example.

In the example in FIG. 1, there are three learning apparatuses 2a to 2c. In the following, for the sake of description, further reference signs such as a, b, and c are added when the learning apparatuses are distinguished, and when the learning apparatuses are not distinguished, these reference signs are omitted, as in "learning apparatus 2". The learning apparatuses 2a to 2c collect respective local learning data 3a to 3c, and execute machine learning of the identification models 40a to 40c using the obtained local learning data 3a to 3c. Accordingly, the learning apparatuses 2a to 2c construct respective trained identification models 40a to 40c that have acquired the capability of identifying whether or not given data is included in the respective own local learning data 3a to 3c.

More specifically, in the present embodiment, the learning apparatuses 2a to 2c each further acquire data generated by the generation model 41 (later-described data 53) from the model generation apparatus 1. Also, the learning apparatuses 2a to 2c execute machine learning of the identification models 40a to 40c using their own local learning data 3a to 3c, respectively, as well as the data generated by the generation model 41. With this, the learning apparatuses 2a to 2c cause the identification models 40a to 40c to learn the capability of identifying whether given data originates from their own local learning data 3a to 3c or from the generation model 41.

In contrast, the model generation apparatus 1 generates the data 50 using the generation model 41 and transmits the generated data 50 to each of the learning apparatuses 2a to 2c. The learning apparatuses 2a to 2c respectively identify whether or not the data 50 is included in their own local learning data 3a to 3c using their own identification models 40a to 40c. Also, the learning apparatuses 2a to 2c respectively transmit results 51a to 51c of identifications performed by their own identification models 40a to 40c to the model generation apparatus 1 as replies.

The model generation apparatus 1 receives the results 51a to 51c of identifications performed by the identification models 40a to 40c of the learning apparatuses 2a to 2c. Also, the model generation apparatus 1 trains the generation model 41 to generate data that causes the identification performance of at least one of the plurality of identification models 40a to 40c to be degraded, by performing machine learning using the received results 51a to 51c of identification. In other words, the model generation apparatus 1 trains the generation model 41 to generate data that is identified by at least one of the plurality of identification models 40a to 40c as being included in its own local learning data 3a to 3c. Note that the number of learning apparatuses 2 is not limited to the number illustrated in the example in FIG. 1, and may be determined as appropriate depending on the embodiment. The number of learning apparatuses 2 may be two, or four or more.

As described above, in the present embodiment, in order to perform machine learning of the generation model 41, the results 51 of the identification performed by the identification models 40 are collected, instead of the local learning data 3 itself being collected. Accordingly, the cost of communication with the model generation apparatus 1 can be kept low. Also, the local learning data 3 itself need not be used for the machine learning of the generation model 41, and therefore the cost of calculation with the model generation apparatus 1 can be kept low. Moreover, the local learning data 3 itself need not be gathered by the model generation apparatus 1, and therefore the contents of the local learning data 3 can be prevented from being directly apparent. Therefore, the confidentiality of the local learning data 3 can be secured to some degree.

In addition, in the present embodiment, the generation model 41 is trained, by machine learning using the collected results 51 of the identification, to generate data that causes the identification performance of at least one of the plurality of identification models 40 to be degraded. That is, the generation model 41 is trained, by machine learning, to generate data that causes erroneous identification with at least one of the identification models 40. Accordingly, a generation model 41 can be constructed that can generate data in accordance with the distribution of any of the local learning data 3 that is used for machine learning of the identification models 40.

Figure 2A:
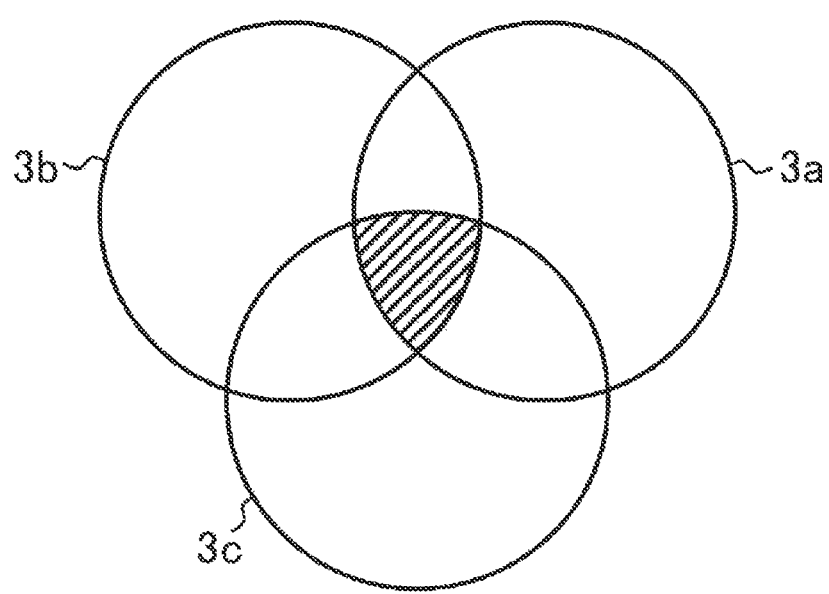
FIG. 2A is a diagram illustrating a problem with a trained generation model that is constructed using a model generation method according to a comparative example.
Figure 2B:
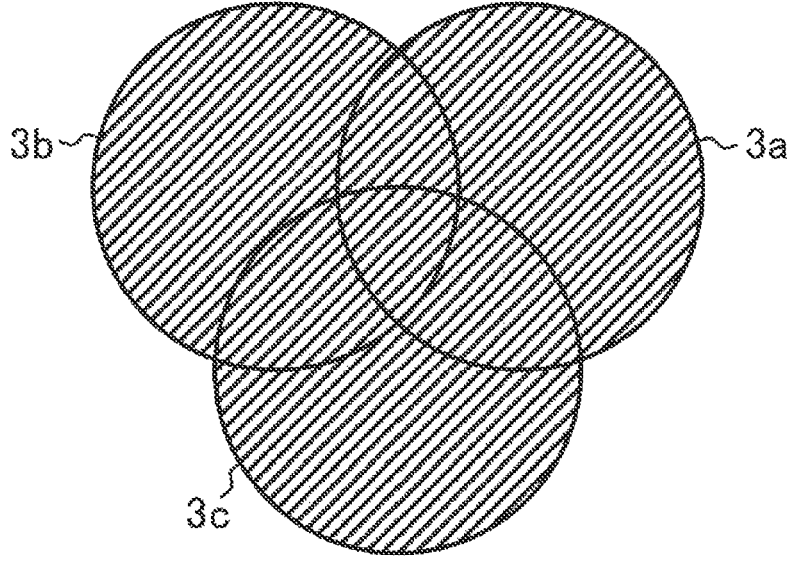
FIG. 2B is a diagram illustrating features of a trained generation model that is constructed by a model generation apparatus according to one or more embodiments.

This effect will be described in detail further using FIGS. 2A and 2B. As a learning method that is antithetical to the present embodiment, a method of training the generation model to generate data that causes the identification performance of all of the identification models 40 to be degraded is envisioned. FIG. 2A schematically illustrates the distribution of data that can be generated by a trained generation model that is constructed with this antithetical method. On the other hand, FIG. 2B schematically illustrates the distribution of data that can be generated by the trained generation model 41 that is constructed by the present embodiment.

In order to degrade the identification performance of all of the identification models 40, data that is shared by all of the local learning data 3 needs to be generated. That is, when the generation model is trained to generate data that causes the identification performance of all of the identification model 40 to be degraded, the data that can be generated by the constructed trained generation model is data that is included in a logical product of the pieces of local learning data 3 of the learning apparatuses 2. If the distribution of the local learning data 3 collected by each learning apparatus 2 is the same, the trained generation model constructed with this method can generate data in accordance with the distribution of the local learning data 3 of each learning apparatus 2.

However, the distributions of the pieces of local learning data 3 collected by the respective learning apparatuses 2 are not always the same. Specifically, when each learning apparatus 2 is independently operated based on the individual situation, basically, the local learning data 3 is collected irrespectively of the local learning data 3 of another learning apparatus 2. Therefore, the pieces of local learning data 3 collected by the respective learning apparatuses 2 are not uniform, and their distributions may differ considerably. For example, the distributions of the pieces of local learning data 3a to 3c collected by the respective learning apparatuses 2a to 2c may be different, as shown in FIG. 2A.

When the distributions of the local learning data 3 collected by the learning apparatuses 2 are widely different, the shared portion (that is, the logical product) becomes an extremely small range, as shown by the hatching in FIG. 2A. And if no shared portion is present in the distributions of the local learning data 3 collected by the learning apparatuses 2, then the generation model is constructed to generate data that is not included in any of the distributions. Therefore, if the generation model is trained to generate data that causes the identification performance of all of the identification models 40 to be degraded, the data that can be generated by the trained generation model to be constructed is extremely limited.

In contrast, when the identification performance of at least one of the plurality of identification models 40 is to be degraded, then this can be achieved by generating data that is in accordance with the distribution of at least one of the local learning data 3 that has been used for machine learning of the identification models 40. Therefore, when the generation model 41 is trained in accordance with the present embodiment to generate data that causes the identification performance of at least one of the plurality of identification models 40 to be degraded, the generation model 41 can acquire the capability of generating data according to the distribution of a logical sum of the local learning data 3 used for machine learning of the identification models 40.

Therefore, even if the distributions of the local learning data 3 collected by the learning apparatuses 2 are different, the trained generation model 41 can generate data that may be included in the distributions. For example, as shown by the hatching in FIG. 2B, even if the distributions of the local learning data 3a to 3c are different, as a result of the machine learning, the generation model 41 can acquire the capability of generating data that is included in the distribution of a logical sum of the local learning data 3a to 3c. Therefore, according to the present embodiment, a generation model 41 can be constructed that can generate a wide variety of data.

The plurality of identification models 40 and the generation model 41 are learning models that can acquire a capability by machine learning, and the type thereof is not limited in particular, and may be selected as appropriate depending on the embodiment. In the present embodiment, the plurality of identification models 40 and the generation model 41 are each configured by a neural network, as will be described later. Each identification model 40 may be referred to as a discriminator, and the generation model 41 may be referred to as a generator.

Note that each learning apparatus 2 according to the present embodiment executes processing for inferring a feature appearing in the data (the later-described object data 223) obtained by the sensor S. In the present embodiment, each learning apparatus 2 acquires a data group collected as inference learning data for inferring a feature. Here, each learning apparatus 2 may acquire data generated using the trained generation model 41. The generation of data by the trained generation model 41 may be executed by the learning apparatuses 2, or may be executed by another computer. With this, the learning apparatuses 2 may also acquire a data group including data generated by the trained generation model 41. Also, each learning apparatus 2 acquires object data. Then, each learning apparatus 2 infers a feature appearing in the object data based on a comparison between the object data and the data group. Each learning apparatus 2 outputs information regarding a result obtained by inferring a feature.

As described above, a wide variety of data can be generated with the trained generation model 41. In particular, the trained generation model 41 is configured to generate data that is difficult to collect by an individual learning apparatus 2 but may be obtained by another learning apparatus 2. Therefore, in each learning apparatus 2, with the data generated by such a generation model 41, not only the number of pieces of data included in a data group to be used for inference is increased, but also the variation of data can be increased. Accordingly, in each learning apparatus 2, the accuracy of inference based on the comparison with the data group can be improved.

2. Exemplary Configuration

[Hardware Configuration]
<Model Generation Apparatus>

Figure 3:
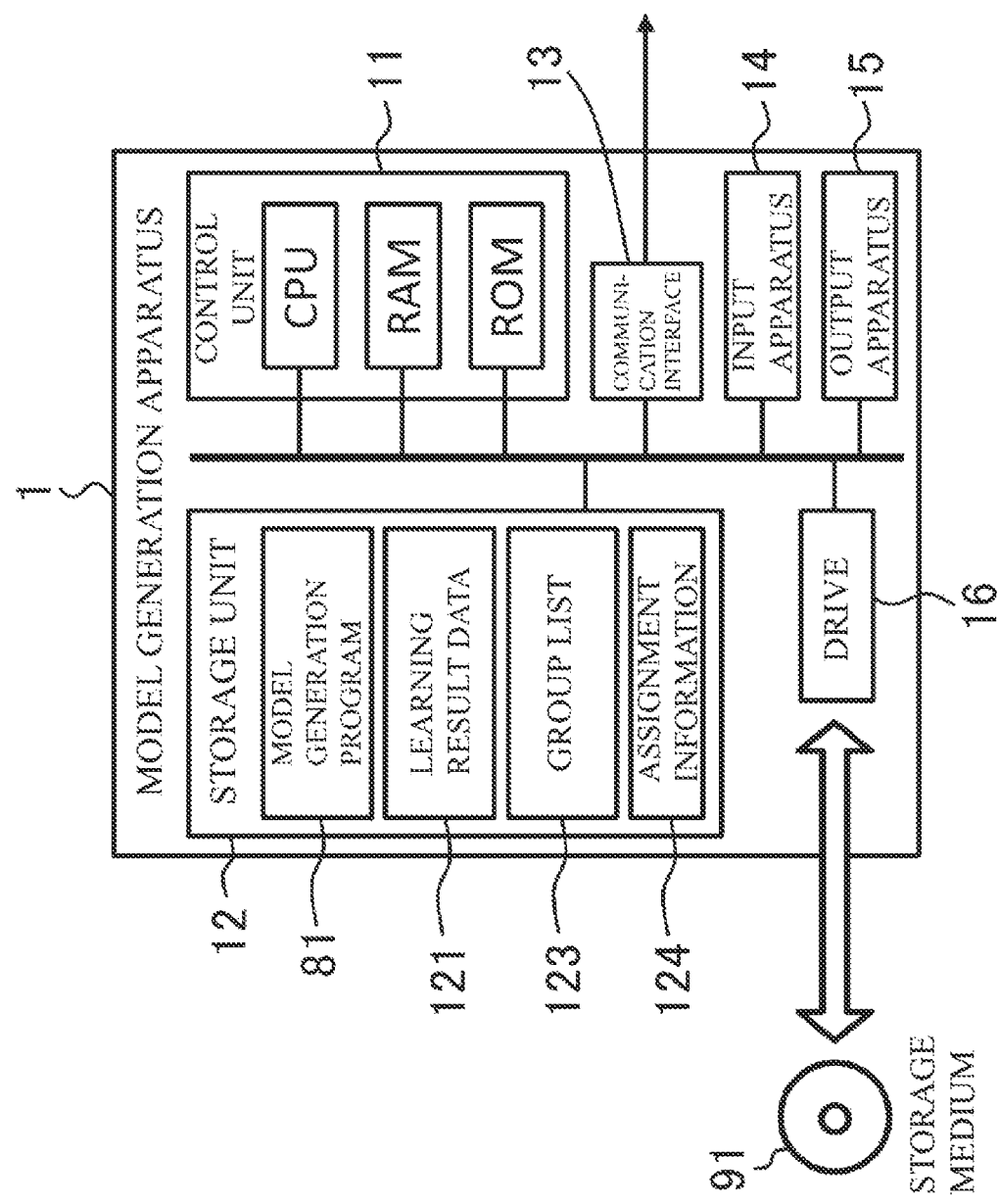
FIG. 3 is a schematic diagram illustrating an example of a hardware configuration of a model generation apparatus according to one or more embodiments.

Next, an example of the hardware configuration of the model generation apparatus 1 according to the present embodiment will be described using FIG. 3. FIG. 3 schematically illustrates an example of the hardware configuration of the model generation apparatus 1 according to the present embodiment.

As shown in FIG. 3, the model generation apparatus 1 according to the present embodiment is a computer in which a control unit 11, a storage unit 12, a communication interface 13, an input apparatus 14, an output apparatus 15, and a drive 16 are electrically connected. Note that, in FIG. 3, the communication interface is denoted as "communication I/F".

The control unit 11 includes a CPU (central processing unit), which is a hardware processor, a RAM (random access memory), ROM (read only memory), and the like, and is configured to execute information processing based on a program and various types of data. The storage unit 12 is an example of a memory, and is constituted by a hard disk drive, a solid-state drive, or the like. In the present embodiment, the storage unit 12 stores various types of information such as a model generation program 81, learning result data 121, a group list 123, and assignment information 124.

The model generation program 81 is a program for the model generation apparatus 1 to execute later-described information processing (FIG. 9) relating to machine learning of the generation model 41. The model generation program 81 includes a series of commands for this information processing. The learning result data 121 indicates information relating to the generation model 41 that is constructed by machine learning. The learning result data 121 is obtained as a result of executing the model generation program 81. The group list 123 is a list of a plurality of groups that are candidates for assigning the learning apparatuses 2. The assignment information 124 shows the correspondence relationship between the learning apparatuses 2 and the groups. The details will be described later.

The communication interface 13 is a wired LAN (Local Area Network) module, a wireless LAN module, or the like, and is an interface for performing wired or wireless communication via a network. The model generation apparatus 1 can perform data communication with another information processing apparatus (e.g., learning apparatus 2) via the network by using the communication interface 13.

The input apparatus 14 is an apparatus for performing input, such as a mouse or a keyboard. Also, the output apparatus 15 is an apparatus for performing output, such as a display, a speaker, or the like. An operator can operate the model generation apparatus 1 by using the input apparatus 14 and the output apparatus 15.

The drive 16 is a CD drive, a DVD drive, or the like, and is a drive apparatus for reading a program stored in a storage medium 91. The type of the drive 16 may be appropriately selected according to the type of the storage medium 91. At least one of the aforementioned model generation program 81, group list 123, and assignment information 124 may be stored in the storage medium 91.

The storage medium 91 is a medium that stores information such as programs via an electrical, magnetic, optical, mechanical or chemical effect such that the stored information, such as the programs, can be read by an apparatus or a machine such as a computer. The model generation apparatus 1 may acquire at least one of the aforementioned model generation program 81, group list 123, and assignment information 124 from the storage medium 91.

Here, in FIG. 3, a disk-type storage medium such as a CD or a DVD is illustrated as an example of the storage medium 91. However, the type of the storage medium 91 is not limited to the disk type, and may be a medium other than a disk-type medium. Media other than disk-type media include a semiconductor memory such as a flash memory, for example.

Note that, regarding the specific hardware configuration of the model generation apparatus 1, constituent elements can be omitted, replaced, and added as appropriate depending on the embodiment. For example, the control unit 11 may also include a plurality of hardware processors. The hardware processors may also be constituted by a microprocessor, an FPGA (field-programmable gate array), a DSP (digital signal processor), and the like. The storage unit 12 may be constituted by the RAM and ROM included in the control unit 11. At least one of the communication interface 13, the input apparatus 14, the output apparatus 15, and the drive 16 may be omitted. The model generation apparatus 1 may also be constituted by a plurality of computers. In this case, the hardware configuration of the computers may be the same, or may not be the same. Also, the model generation apparatus 1 may be a general-purpose server apparatus, a PC (Personal Computer), or the like, instead of an information processing apparatus that is specifically designed for the service to be provided.

<Learning Apparatus>

Figure 4:
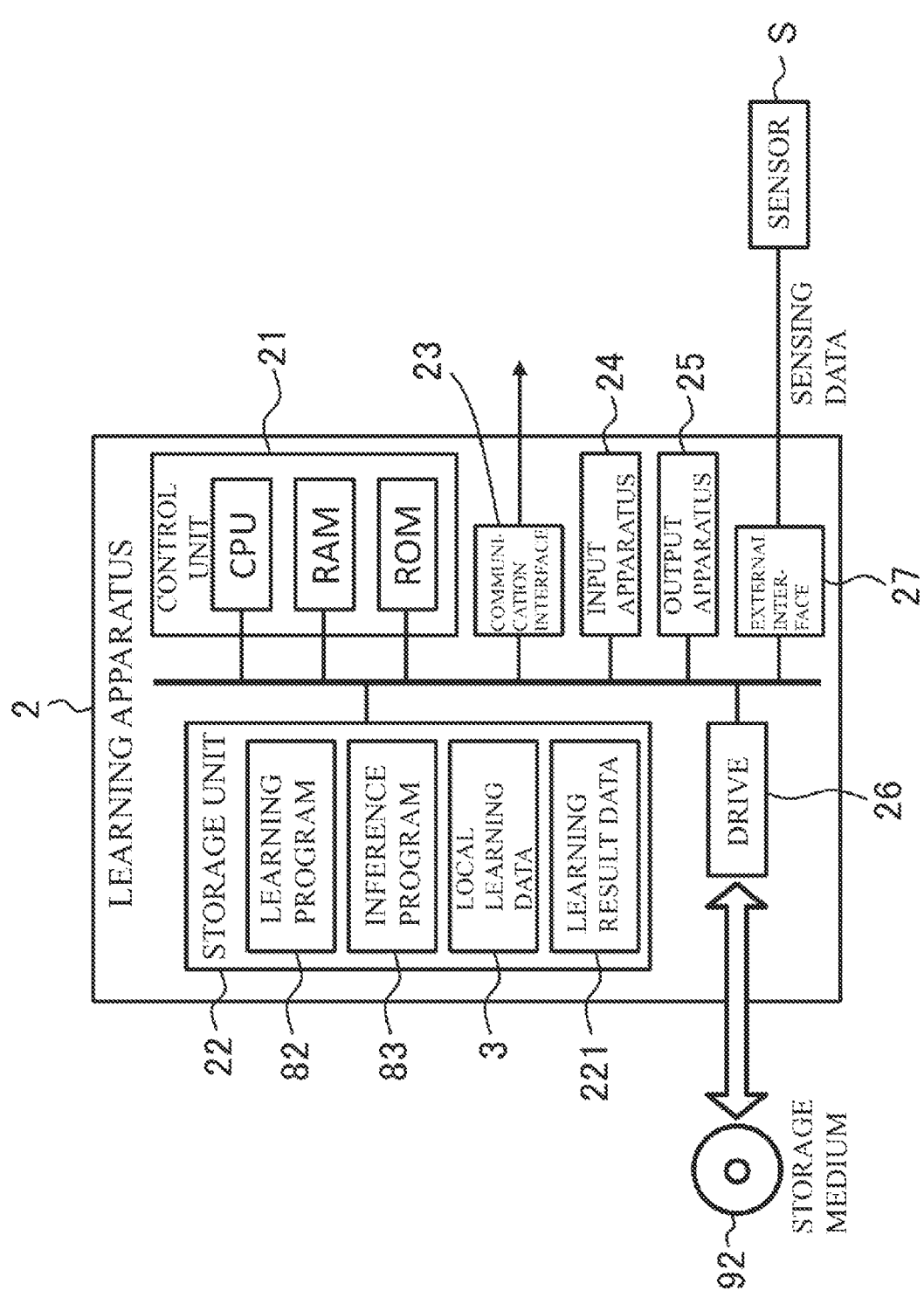
FIG. 4 is a schematic diagram illustrating an example of a hardware configuration of a learning apparatus according to one or more embodiments.

Next, an example of the hardware configuration of the learning apparatuses 2 according to the present embodiment will be described using FIG. 4. FIG. 4 schematically illustrates an example of the hardware configuration of the learning apparatuses 2 according to the present embodiment.

As shown in FIG. 4, each learning apparatus 2 according to the present embodiment is a computer in which a control unit 21, a storage unit 22, a communication interface 23, an input apparatus 24, an output apparatus 25, a drive 26, and an external interface 27 are electrically connected. Note that, in FIG. 4, the communication interface and the external interface are respectively denoted as "communication I/F" and "external I/F".

The units from the control unit 21 to the drive 26 of each learning apparatus 2 may be configured similarly to the units from the control unit 11 to the drive 16 of the model generation apparatus 1 described above. That is, the control unit 21 includes a CPU, which is a hardware processor, a RAM, ROM, and the like, and is configured to execute information processing based on a program and data. The storage unit 22 is constituted by a hard disk drive, a solid-state drive, or the like. The storage unit 22 stores various types of information such as a learning program 82, an inference program 83, local learning data 3, and learning result data 221.

The learning program 82 is a program for the learning apparatus 2 to execute later-described information processing (FIG. 8) relating to machine learning of the identification model 40. The learning program 82 includes a series of commands for this information processing. The learning result data 221 indicates information relating to the identification model 40 constructed by machine learning. The learning result data 221 is obtained as a result of executing the learning program 82. Also, the inference program 83 is a program for the learning apparatus 2 to execute later-described information processing (FIG. 10) of a predetermined inference with respect to data obtained by the sensor S. The inference program 83 includes a series of commands for this information processing. The local learning data 3 is used for machine learning of the identification model 40. The details will be described later.

The communication interface 23 is a wired LAN module, a wireless LAN module, or the like, and is an interface for performing wired or wireless communication via a network. Each learning apparatus 2 can perform data communication with another information processing apparatus (e.g., model generation apparatus 1) via the network by using the communication interface 23.

The input apparatus 24 is an apparatus for performing input, such as a mouse or a keyboard. Also, the output apparatus 25 is an apparatus for performing output, such as a display, a speaker, or the like. An operator can operate learning apparatus 2 by using the input apparatus 24 and the output apparatus 25.

The drive 26 is a CD drive, a DVD drive, or the like, and is a drive apparatus for reading a program stored in a storage medium 92. At least one of the aforementioned learning program 82, inference program 83, and local learning data 3 may be stored in the storage medium 92. Also, each learning apparatus 2 may acquire at least one of the aforementioned learning program 82, inference program 83, and local learning data 3 from the storage medium 92.

The external interface 27 is a USB (universal serial bus) port, a dedicated port, or the like, and is an interface for connecting to an external apparatus. The type and the number of external interfaces 27 may be appropriately selected according to the type and the number of external apparatuses to be connected. In the present embodiment, each learning apparatus 2 is connected to the sensor S via the external interface 27. With this, each learning apparatus 2 is configured to acquire sensing data with respect to which a predetermined inference is executed from the sensor S. Note that the configuration for acquiring the sensing data is not limited to this example, and may be determined as appropriate depending on the embodiment. For example, when the sensor S includes a communication interface, each learning apparatus 2 may also be connected to the sensor S via the communication interface 23 instead of the external interface 27.

Note that, as far as the specific hardware configuration of the learning apparatuses 2 is concerned, constituent elements can also be omitted, replaced, and added as appropriate depending on the embodiment. For example, the control unit 21 may include a plurality of hardware processors. The hardware processors may be constituted by a microprocessor, an FPGA, a DSP, and the like. The storage unit 22 may be constituted by the RAM and ROM included in the control unit 21. At least one of the communication interface 23, the input apparatus 24, the output apparatus 25, the drive 26, and the external interface 27 may be omitted. Each learning apparatus 2 may be constituted by a plurality of computers. In this case, the hardware configuration of the computers may be the same, or may not be the same. In the present embodiment, the hardware configuration of the learning apparatuses 2 is the same. However, the relationship of hardware configurations of the respective learning apparatuses 2 is not limited to this example. The hardware configuration may be different between one learning apparatus 2 and another learning apparatus 2. Each learning apparatus 2 may not only be a general-purpose server device, a general-purpose PC, or the like, but also an information processing apparatus that is specifically designed for the service to be provided.

[Software Configuration]

<Model Generation Apparatus>

Figure 5:
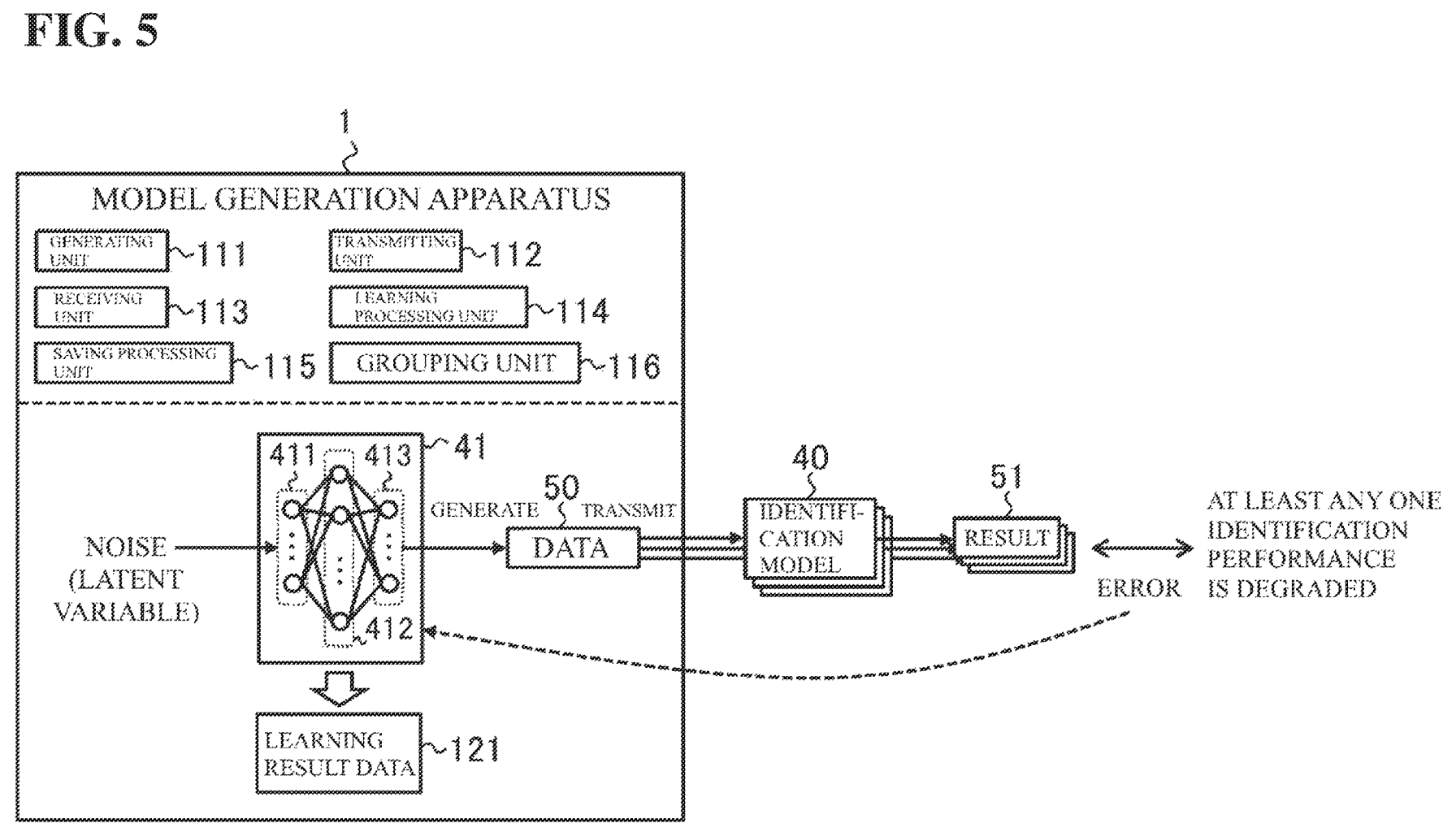

Next, an example of the software configuration of the model generation apparatus 1 according to the present embodiment will be described using FIG. 5. FIG. 5 schematically illustrates an example of the software configuration of the model generation apparatus 1 according to the present embodiment.

The control unit 11 of the model generation apparatus 1 deploys the model generation program 81 stored in the storage unit 12 in the RAM. Then, the control unit 11 controls each constituent element by the CPU interpreting and executing the model generation program 81 deployed in the RAM. With this, as shown in FIG. 5, the model generation apparatus 1 according to the present embodiment operates as a computer including a generating unit 111, a transmitting unit 112, a receiving unit 113, a learning processing unit 114, a saving processing unit 115, and a grouping unit 116, as software modules. That is, in the present embodiment, each software module of the model generation apparatus 1 is realized by the control unit 11 (CPU).

The generating unit 111 generates the data 50 using the generation model 41. In the present embodiment, noise (a latent variable) is obtained from a predetermined probability distribution. There is no limitation regarding the predetermined probability distribution, and it may be selected as appropriate depending on the embodiment. The predetermined probability distribution may be a Gaussian distribution or the like. The generating unit 111 inputs the acquired noise into the generation model 41, and executes computation processing of the generation model 41. With this, the generating unit 111 obtains the data 50 from the generation model 41.

The transmitting unit 112 transmits the generated data 50 to the identification models 40, and causes the identification models 40 to perform an identification on the data 50. The receiving unit 113 receives the result 51 of the identification performed by the identification models 40 with respect to the transmitted data 50. In the present embodiment, the identification models 40 are saved in the respective learning apparatuses 2. Therefore, the transmitting unit 112 causes the identification models 40 to perform an identification on the data 50 by transmitting the generated data 50 to each learning apparatus 2. Also, the receiving unit 113 receives the result 51 of the identification performed by the identification model 40 from each learning apparatus 2.

The learning processing unit 114 trains the generation model 41 to generate data that causes the identification performance of at least one of the plurality of identification models 40 to be degraded, by performing machine learning using the received results 51 of the identification. The saving processing unit 115 saves the information regarding the trained generation model 41 constructed by machine learning in a predetermined storage area.

The grouping unit 116 assigns each learning apparatus 2 to at least one of a plurality of groups. In correspondence therewith, the model generation apparatus 1 may retain a generation model 41 for each group individually. The transmitting unit 112 may cause, for each group, the identification models 40 to perform identification with the data 50 by transmitting the data 50 generated by the corresponding generation model 41 to each learning apparatus 2. The receiving unit 113 may receive, for each group, the results 51 of the identifications performed by the identification models

40 from each learning apparatus 2. Also, the learning processing unit 114 may train, for each group, the generation model 41 to generate data that causes the identification performance of at least one of the plurality of identification models 40 to be degraded, by performing machine learning using the received results 51 of the identification. In the present embodiment, the grouping unit 116 stores the result of assigning the learning apparatuses 2 to the groups in the assignment information 124.

FIG. 6 schematically illustrates a data configuration of the assignment information 124 according to the present embodiment. In the present embodiment, the assignment information 124 is structured in a table format, and each record (row data) includes a "user ID" field and a "group ID" field. In the "user ID" field, information for identifying each learning apparatus 2 is stored, and in the "group ID" field, information for identifying the group to which the learning apparatus 2 of interest is assigned is stored. One record shows one assignment result. Note that the data configuration of the assignment information 124 is not limited to this example, and may be determined as appropriate depending on the embodiment.

(Generation Model)

Next, an example of the generation model 41 will be described. As shown in FIG. 5, in the present embodiment, the generation model 41 is constituted by a neural network. Specifically, the generation model 41 is constituted by a neural network having a three-layer structure, and includes an input layer 411, an intermediate (hidden) layer 412, and an output layer 413, in this order from the input side. Note that the structure of the generation model 41 is not limited to this example, and may be determined as appropriate depending on the embodiment. For example, the number of intermediate layers included in the generation model 41 is not limited to one, but may be two or more.

The numbers of neurons (nodes) included in the respective layers 411 to 413 may be selected as appropriate depending on the embodiment. Neurons in the adjacent layers are connected as appropriate, and a weight (connection load) is set for each connection. In the example in FIG. 5, each neuron in one layer is connected to all neurons in the adjacent layer. However, the connections of neurons are not limited to this example, and may be set as appropriate depending on the embodiment. A threshold value is set for each neuron, and basically, the output of each neuron is determined based on whether or not the sum of products of inputs and respective weights exceeds the threshold value. The weights of the connections between neurons included in the layers 411 to 413 and the threshold value of each neuron are examples of the computation parameters of the generation model 41 to be used in computation processing.

In the present embodiment, since the generation model 41 is configured as described above, the generating unit 111 inputs noise obtained from the predetermined probability distribution to the input layer 411, and executes the computation processing of the neural network. With this, the generating unit 111 acquires the data 50 generated from the noise as the output from the output layer 413.

Also, the learning processing unit 114 adjusts the values of the computation parameters of the generation model 41 based on an error calculated so as to degrade the identification performance of any one identification model 40, by machine learning. The saving processing unit 115 generates information indicating the structure and the computation parameters of the trained generation model 41 constructed by machine learning as the learning result data 121, and saves the generated learning result data 121 in a predetermined storage area.

<Learning Apparatus>

(A) Learning Processing

Figure 7A:
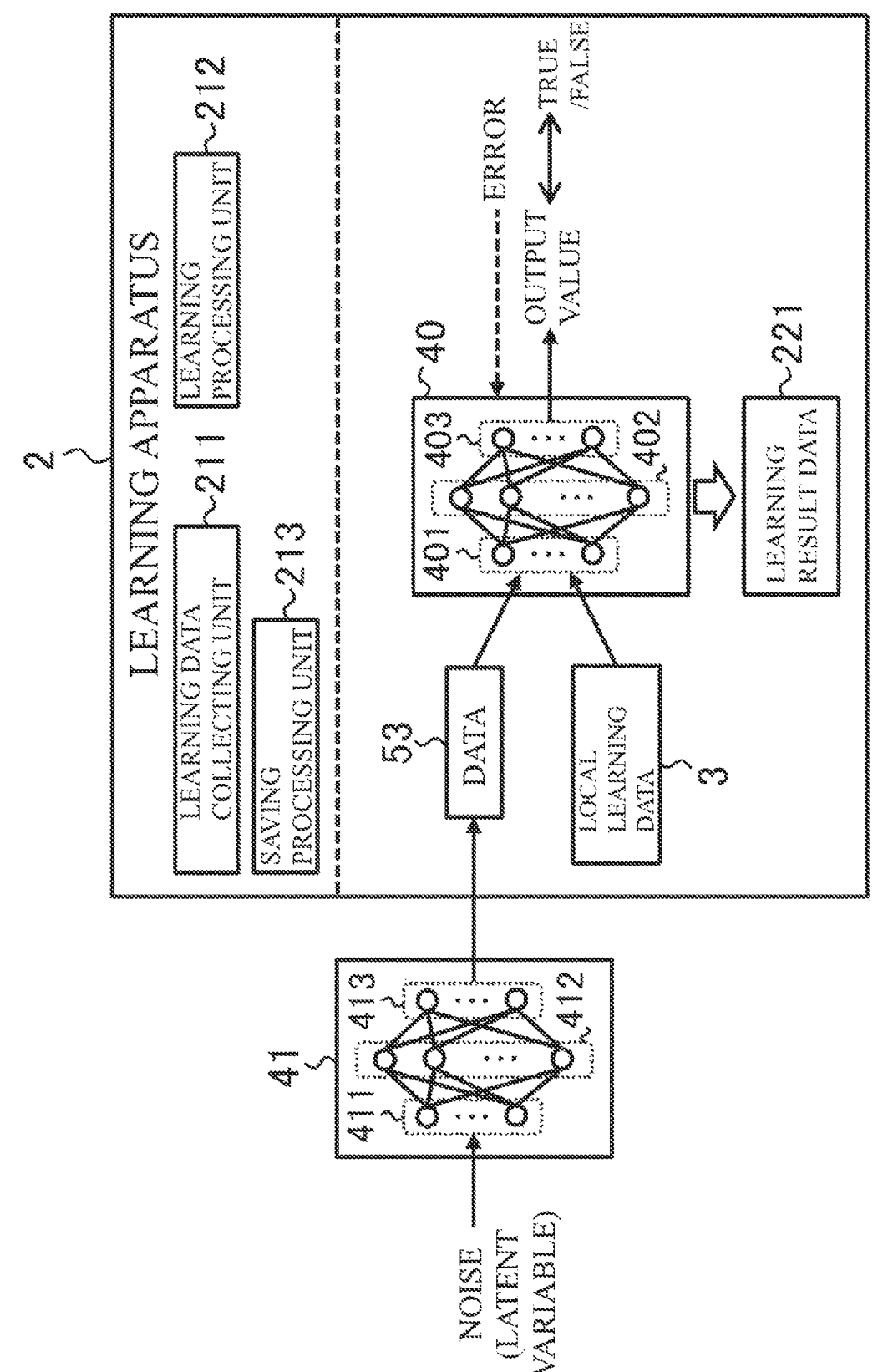
FIG. 7A is a schematic diagram illustrating an example of a software configuration for machine learning of a learning apparatus according to one or more embodiments.

Next, an example of the software configuration for the learning processing of the learning apparatuses 2 according to the present embodiment will be described using FIG. 7A. FIG. 7A schematically illustrates an example of the software configuration for the learning processing of the learning apparatuses 2 according to the present embodiment.

The control unit 21 of each learning apparatus 2 deploys the learning program 82 stored in the storage unit 22 in the RAM. Then, the control unit 21 controls each constituent element by the CPU interpreting and executing the learning program 82 deployed in the RAM. With this, each learning apparatus 2 according to the present embodiment operates as a computer including a learning data collecting unit 211, a learning processing unit 212, and a saving processing unit 213, as software modules, as shown in FIG. 7A. That is, in the present embodiment, each software module relating to the learning processing of the learning apparatuses 2 is realized by the control unit 21 (CPU).

The learning data collecting unit 211 collects the local learning data 3 to be used for machine learning of the identification model 40. The learning data collecting unit 211 may also handle the data collected for another purpose such as being used as the local learning data 3 in later-described inference processing. The learning processing unit 212 constructs a trained identification model 40 that has acquired the capability of identifying whether or not given data is included in the local learning data 3, by performing machine learning using the collected local learning data 3. The saving processing unit 213 saves the information regarding the trained identification model 40 constructed by machine learning in a predetermined storage area.

(Identification Model)

Next, an example of the identification model 40 will be described. As shown in FIG. 7A, in the present embodiment, the identification model 40 is constituted by a neural network. Specifically, similarly to the generation model 41 described above, the identification model 40 is constituted by a neural network having a three-layer structure, and includes an input layer 401, an intermediate (hidden) layer 402, and an output layer 403, in this order from the input side. Note that the structure of the identification model 40 is not limited to this example, and may be determined as appropriate depending on the embodiment. For example, the number of intermediate layers included in the identification model 40 is not limited to one, but may be two or more.

Similarly to the generation model 41 described above, the number of neurons (nodes) included in each of the layers 401 to 403 of the identification model 40 may be selected as appropriate depending on the embodiment. In the example in FIG. 7A, each neuron in one layer is connected to all neurons in the adjacent layer. However, the connections of neurons are not limited to this example, and may be set as appropriate depending on the embodiment. The weights of the connections between neurons included in the layers 401 to 403 and the threshold value of each neuron are examples of the computation parameters of the identification model 40 to be used in computation processing.

In the present embodiment, the learning processing unit 212 trains, by machine learning, the identification model 40 to identify whether the data input to the identification model 40 is data that was generated by the generation model 41 or data that is included in the local learning data 3. That is, the identification model 40 is trained to identify whether given data originates from the generation model 41 or from the local learning data 3. Note that, in FIG. 7A, "originating from the local learning data 3" is expressed as "True", and "originating from the generation model 41" is expressed as "False". Note that the method of expressing the originality is not limited to this example, but may be selected as appropriate depending on the embodiment.

As an example of this machine learning processing, first, the learning processing unit 212 acquires data 53 generated by the generation model 41 in addition to the collected local learning data 3. The data 53 is generated by inputting noise extracted from a predetermined probability distribution into the input layer 411 of the generation model 41, and executing the computation processing of the generation model 41, similarly to the data 50. Next, the learning processing unit 212 executes machine learning of the identification model 40 using the local learning data 3 and the data 53.

The correct answer data of identification with the data 53 generated by the generation model 41 is "False". On the other hand, the correct answer data of identification with the data included in the local learning data 3 is "True". Therefore, as a result of associating correct answer data indicating "False" with the data 53, a learning data set can be generated that contributes to learning of the capability of identifying that given data originates from the generation model 41. Also, as a result of associating data included in the local learning data 3 with correct answer data indicating "True", a learning data set can be generated that contributes to learning of the capability of identifying that given data originates from the local learning data 3. Note that "True" may be expressed by "1", and the "False" may be expressed by "0". The machine learning of the identification model 40 by the learning processing unit 212 can be regarded as supervised learning using each learning data set.

That is, the learning processing unit 212 inputs the data 53 generated by the generation model 41 to the input layer 401 of the identification model 40, and executes computation processing of the identification model 40. With this, the learning processing unit 212 acquires an output value corresponding to the result of identifying whether the input data originates from the local learning data 3 or from the generation model 41, from the output layer 403. In this scenario, the input data is the data 53 generated by the generation model 41, and therefore the correct answer is that the identification model 40 makes the identification "False". The learning processing unit 212 calculates the error between the output value obtained from the output layer 403 and this correct answer, with respect to the data 53 generated by the generation model 41.

Also, the learning processing unit 212 inputs data included in the local learning data 3 to the input layer 401 of the identification model 40, and executes the computation processing of the identification model 40. With this, the learning processing unit 212 acquires an output value corresponding to the result of identifying whether the input data originates from the local learning data 3 or from the generation model 41, from the output layer 403. In this scenario, the input data is data included in the local learning data 3, and therefore the correct answer is that the identification model 40 makes the identification "True". The learning processing unit 212 calculates the error between the output value obtained from the output layer 403 and this correct answer, with respect to the data included in the local learning data 3.

Then, the learning processing unit 212 adjusts the computation parameter values of the identification model 40 such that the sum of the calculated errors decreases. The learning processing unit 212 repeats the adjustment of the computation parameter values of the identification model 40 by the series of processing described above until the sum of errors between the output value obtained from the output layer 403 and the correct answer of True/False becomes less than or equal to a threshold value. With this, the learning processing unit 212 can train the identification model 40 so as to acquire the capability of identifying whether given data is data generated by the generation model 41 or data included in the local learning data 3. The saving processing unit 213 generates information indicating the structure and the computation parameters of the trained identification model 40 constructed by machine learning as the learning result data 221, and saves the generated learning result data 221 in a predetermined storage area.

(B) Inference Processing

Figure 7B:
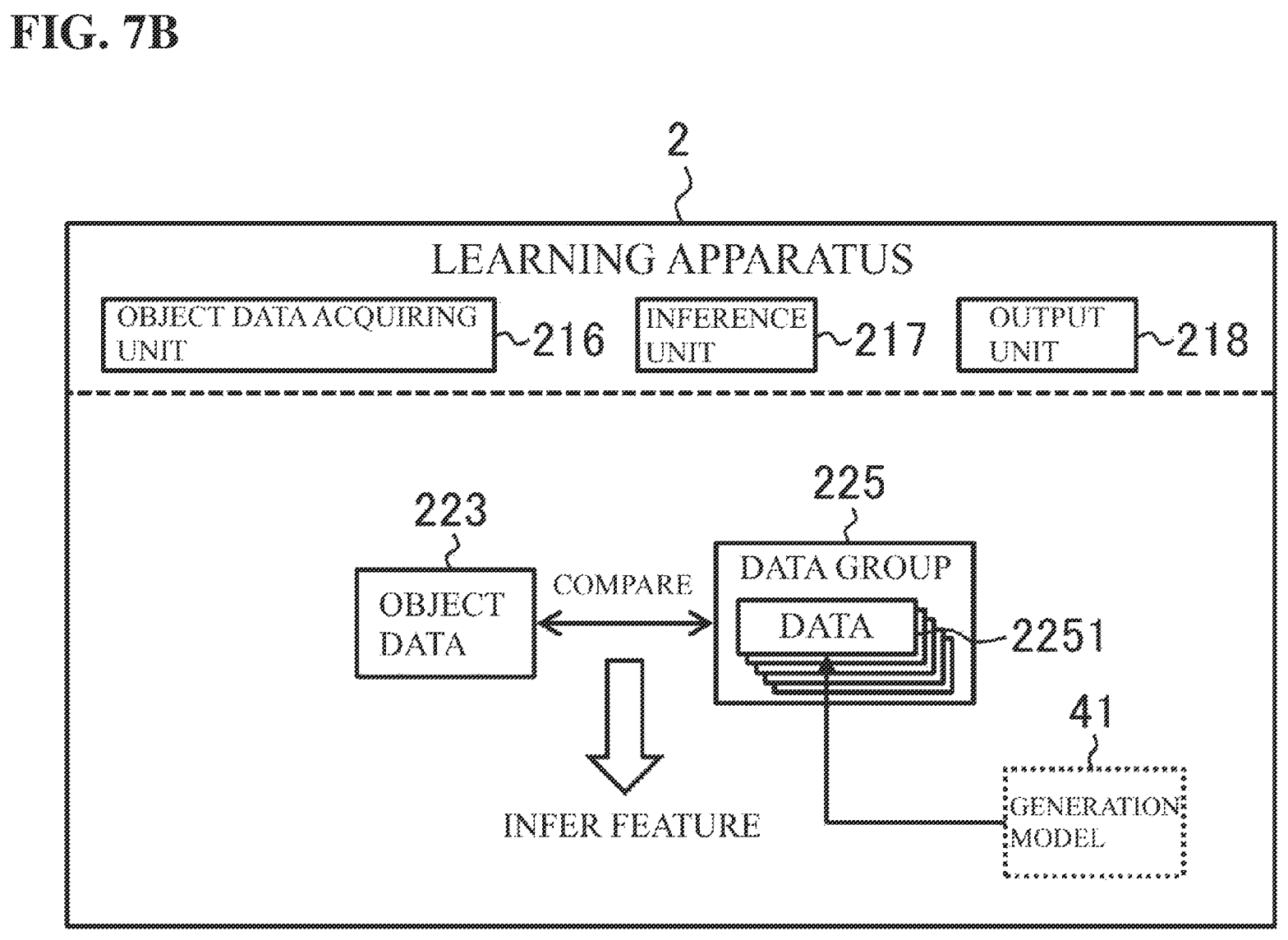

Next, an example of a software configuration for the inference processing of the learning apparatuses 2 according to the present embodiment is explained using FIG. 7B. FIG. 7B schematically illustrates an example of the software configuration for the inference processing of the learning apparatuses 2 according to the present embodiment.

The control unit 21 of each learning apparatus 2 deploys the inference program 83 stored in the storage unit 22 in the RAM. Also, the control unit 21 controls the constituent elements by the CPU interpreting and executing the inference program 83 deployed in the RAM. With this, each learning apparatus 2 according to the present embodiment operates as a computer including an object data acquiring unit 216, an inference unit 217, and an output unit 218 as software modules, as shown in FIG. 7B. That is, in the present embodiment, the software modules for the inference processing of the learning apparatuses 2 is realized by the control unit 21 (CPU).

The object data acquiring unit 216 acquires object data 223 on which the inference processing is to be performed. In the present embodiment, the object data acquiring unit 216 acquires the object data 223 from the sensor S. The inference unit 217 acquires a data group 225 collected as inference learning data for inferring a feature. The data group 225 is constituted by a plurality of pieces of data 2251 regarding the feature to be inferred. The data 2251 included in the data group 225 may be data included in the local learning data 3, data generated by the generation model 41, or the like. The inference unit 217 may also acquire data generated using the trained generation model 41. The generation of data by the trained generation model 41 may be executed by the learning apparatuses 2, or may be executed by another computer. When the generation of data by the trained generation model 41 is executed by the learning apparatuses 2, the inference unit 217 includes the trained generation model 41 by retaining the learning result data 121. The inference unit 217 generates data using the trained generation model 41. With this, the inference unit 217 may acquire the data group 225 including data generated by the trained generation model 41. Also, the inference unit 217 infers features appearing in the object data 223 based on a comparison between the data group 225 and the object data 223. Note that this "inferring" may be either of deriving a discrete value (e.g., a class corresponding to a specific feature) by grouping (classification, identification) or deriving a continuous value (e.g., probability that a specific feature is present) by regression, for example. The output unit 218 outputs information regarding the result of inference of a feature.

<Other Considerations>

The software modules of the model generation apparatus 1 and the learning apparatuses 2 will be described in detail in a later-described exemplary operation. Note that, in the present embodiment, an example is described in which the software modules of the model generation apparatus 1 and the learning apparatuses 2 are realized by a general-purpose CPU. However, some of or all of the software modules described above may be realized by at least one dedicated processor. Also, regarding the software configuration of the model generation apparatus 1 and the learning apparatuses 2, software modules may also be omitted, replaced, and added as appropriate depending on the embodiment.

3. Exemplary Operation

[Learning Processing]

In the present embodiment, the machine learning of the identification model 40 by the learning apparatuses 2 and the machine learning of the generation model 41 by the model generation apparatus 1 may be alternatingly and repeatedly executed. The number of repetitions is not limited in particular, and may be selected as appropriate depending on the embodiment. With this, the identification accuracy of the identification model 40 and the accuracy of data generation by the generation model 41 can be improved. That is, the identification model 40 can be caused to learn the capability of appropriately identifying whether or not the given data is included in the local learning data 3. Also, the generation model 41 can be caused to learn the capability of appropriately generating data that may be included in the distribution of any local learning data 3 from the noise extracted from a predetermined probability distribution. In the following, exemplary operations relating to the machine learning of the learning apparatuses 2 and the model generation apparatus 1 will be described.

(A) Learning Apparatuses

Figure 8:
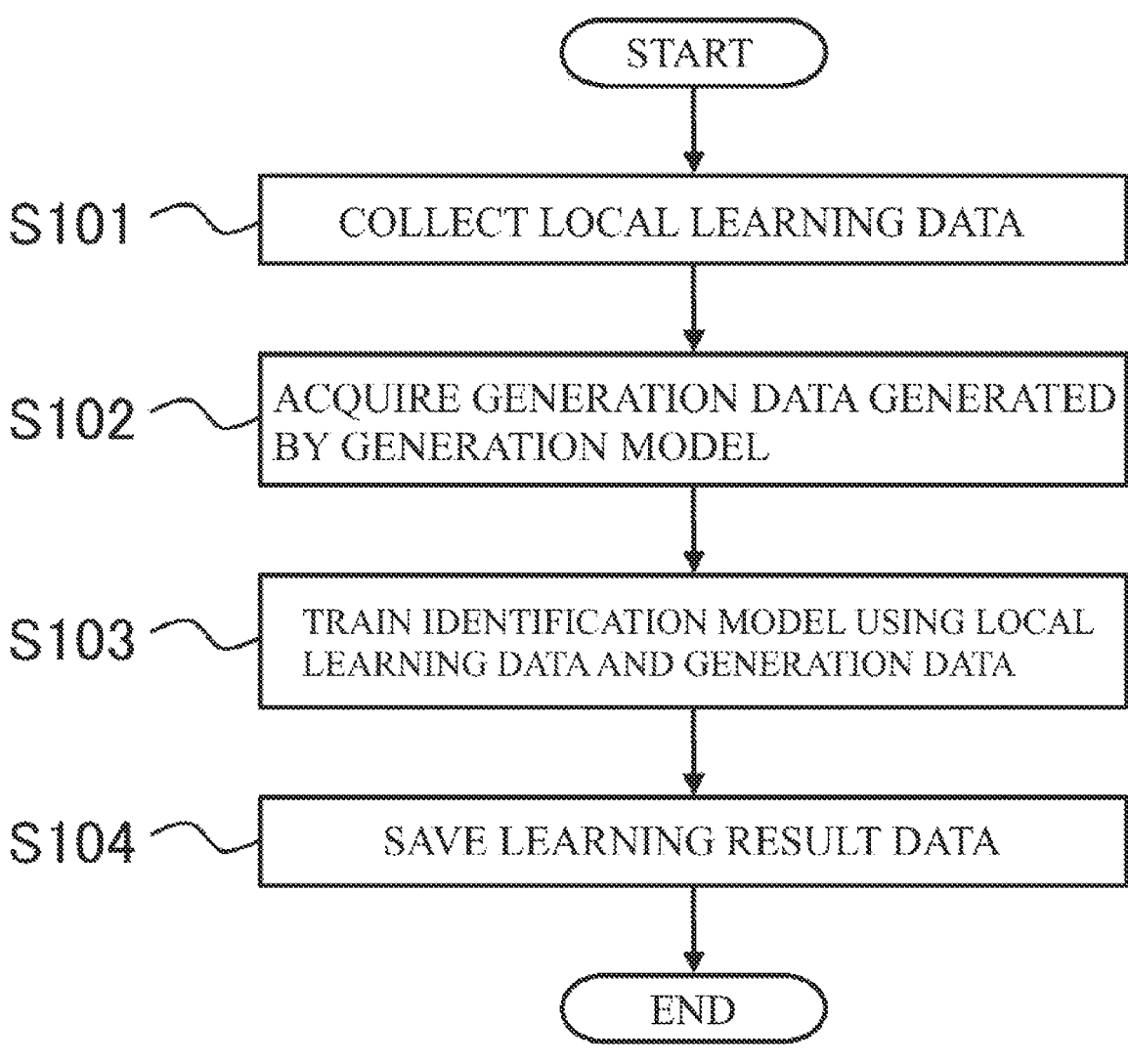
FIG. 8 is a diagram illustrating illustrates an example of a processing procedure of machine learning of an identification model by a learning apparatus according to one or more embodiments.

First, an exemplary operation of the learning apparatuses 2 relating to the machine learning of the identification model 40 will be described using FIG. 8. FIG. 8 is a flowchart illustrating an example of the processing procedure relating to the machine learning of the identification model 40 by the learning apparatuses 2. Note that the processing procedures to be described in the following are merely examples, and each step may be modified to the extent possible. Moreover, in the processing procedure described below, steps may also be omitted, replaced, or added as appropriate depending on the embodiment.

(Step S101)

In step S101, the control unit 21 operates as the learning data collecting unit 211, and collects the local learning data 3.

The method of generating the local learning data 3 is not limited in particular, and may be selected as appropriate depending on the embodiment. In the present embodiment, the local learning data 3 may be used to infer features appearing in the data obtained by the sensor S. Therefore, for example, a sensor of the same type as the sensor S is prepared, and measurements are performed under various conditions using the prepared sensor, and with this, a plurality of pieces of data in which a predetermined feature appears or does not appear are acquired. The local learning data 3 may be constituted by a plurality of pieces of data acquired in this way. Note that a label indicating the feature that appears in each piece of data may be appended to the data.

The local learning data 3 may be automatically generated by the operation of the computer, or may be manually generated by an operator's manipulation. Also, the local learning data 3 may be generated by the learning apparatuses 2, or may be generated by a computer other than the learning apparatuses 2. When the local learning data 3 is generated by each learning apparatus 2, the control unit 21 may collect the local learning data 3 automatically, or by manually executing the processing described above by an operator's manipulation via the input apparatus 24. On the other hand, when the local learning data 3 is generated by another computer, the control unit 21 may also collect the local learning data 3 generated by the other computer via a network, the storage medium 92, or the like. A portion of the local learning data 3 may be generated by the learning apparatuses 2, and the rest may be generated by another computer.

The number of pieces of data that constitute the local learning data 3 is not limited in particular, and may be selected as appropriate depending on the embodiment. Also, the control unit 21 may also use the data 2251 included in the data group 225 to be used for inference as the local learning data 3. Upon collecting the local learning data 3, the control unit 21 advances the processing to the next step S102.

(Step S102)

In step S102, the control unit 21 operates as the learning processing unit 212, and acquires the data 53 generated by the generation model 41.

In the present embodiment, the control unit 11 of the model generation apparatus 1 extracts noise from the predetermined probability distribution, inputs the extracted noise to the input layer 411 of the generation model 41, and executes the computation processing of the generation model 41. That is, the control unit 11 inputs noise to the input layer 411 of the generation model 41, and determines, sequentially from the input side, how each of the neurons included in the layers 411 to 413 fires. With this, the control unit 11 acquires the data 53 generated from the noise as the output from the output layer 413. The control unit 21 acquires the data 53 generated by the generation model 41 in this way. In the present embodiment, the data 53 that is generated is pseudo sensing data.

The path through which the data 53 is acquired is not limited in particular, and may be selected as appropriate depending on the embodiment. For example, the control unit 21 may directly acquire the data 53 from the model generation apparatus 1 by accessing the model generation apparatus 1 via the network. In this case, the control unit 11 of the model generation apparatus 1 may generate the data 53 using the generation model 41 in response to a request from the learning apparatuses 2. Also, the control unit 11 may transmit the generated data 53 as appropriate to the learning apparatuses 2. With this, the control unit 21 may acquire the data 53 from the model generation apparatus 1. Also, for example, the control unit 11 of the model generation apparatus 1 may save the data 53 generated by the generation model 41 in an external storage apparatus such as a data server. The data server may be a NAS (network attached storage) or the like. In this case, the control unit 21 may indirectly acquire the data 53 from the model generation apparatus 1 by accessing an external storage apparatus and acquiring the data 53 from the external storage apparatus.

The number of pieces of the data 53 to be acquired is not limited in particular, and may be selected as appropriate depending on the embodiment. Upon acquiring the data 53 generated by the generation model 41, the control unit 21 advances the processing to the next step S103. Note that this step S102 may also be executed before step S101.

(Step S103)

In step S103, the control unit 21 operates as the learning processing unit 212, and constructs a trained identification model 40 that has acquired the capability of identifying whether or not the given data is included in the local learning data 3 by machine learning in which the collected local learning data 3 is used. In the present embodiment, the control unit 21 trains the identification model 40 to identify whether given data originates from the local learning data 3 or from the generation model 41 using the local learning data 3 and the data 53 generated by the generation model 41. This machine learning processing may use stochastic gradient descent, mini-batch gradient descent, or the like.

Specifically, the control unit 21 inputs the data 53 generated by the generation model 41 to the input layer 401 of the identification model 40, and performs firing determination of each of the neurons included in the layers 401 to 403 sequentially from the input side. With this, the control unit 21 acquires an output value corresponding to the result of identifying whether the input data originates from the local learning data 3 or from the generation model 41, from the output layer 403. In this scenario, because the input data is the data 53 generated by the generation model 41, the correct answer is that the identification model 40 makes the identification "False". The control unit 21 calculates, with respect to the data 53 generated by the generation model 41, the error between the output value obtained from the output layer 403 and this correct answer.

Also, the control unit 21 inputs data included in the local learning data 3 to the input layer 401 of the identification model 40, and performs firing determination of each of the neurons included in the layers 401 to 403 sequentially from the input side. With this, the control unit 21 acquires an output value corresponding to the result of identifying whether the input data originates from the local learning data 3 or from the generation model 41, from the output layer 403. In this scenario, because the input data is the data included in the local learning data 3, the correct answer is that the identification model 40 makes the identification "True". The control unit 21 calculates, with respect to the data included in the local learning data 3, the error between the output value obtained from the output layer 403 and this correct answer.

[Math. 1]

$$-E_{x \in X_i}(\log D_i(x)) - E(\log(1 - D_i(G(z))))$$  Formula 1

Each error may be calculated by the loss function in Formula 1, for example. $X_i$ in Formula 1 indicates a set of the local learning data 3 of the $i^{th}$ learning apparatus 2, and x indicates a sample included in $X_i$. $D_i$ indicates the value of identification by the identification model 40 of the $i^{th}$ learning apparatus 2. z indicates noise, and G indicates the data generated by the generation model 41. E indicates the expected value with respect to the sample. Note that the loss function in Formula 1 is an example, the calculation of each error is not limited to this example, and may be selected as appropriate depending on the embodiment.

The control unit 21 calculates, by back propagation, the error of each of the weights of the connections between the neurons and the threshold value of each neuron in the identification model 40, using the gradients of the calculated errors of the output value. The control unit 21 updates the values of the weights of the connections between the neurons and the threshold values of the neurons in the identification model 40 based on the calculated errors. For example, the control unit 21 extracts samples from the local learning data 3 and the data 53 generated by the generation model 41, and adjusts the values of the computation parameters by performing the processing described above using the extracted samples. The control unit 21 repeats this adjustment a predetermined number of times. The number of times of repeating the adjustment is not limited in particular, and may be selected as appropriate depending on the embodiment. With this, the control unit 21 can construct an identification model 40 that has been trained to be able to appropriately identify whether given data originates from the local learning data 3 or from the generation model 41, with respect to the local learning data 3 and the data 53 generated by the generation model 41. Upon completing the machine learning of the identification model 40, the control unit 21 advances the processing to the next step S104.

(Step S104)

In step S104, the control unit 21 operates as the saving processing unit 213, and saves the information regarding the trained identification model 40 that has been constructed by machine learning in a predetermined storage area. In the present embodiment, the control unit 21 generates information indicating the structure and the computation parameters of the trained neural network (identification model 40) constructed by machine learning in step S103, as the learning result data 221. Also, the control unit 21 saves the generated learning result data 221 in a predetermined storage area.

The predetermined storage area may be the RAM in the control unit 21, the storage unit 22, an external storage apparatus, or a storage medium, or a combination of these, for example. The storage media may be a CD, a DVD, or the like, and the control unit 21 may store the learning result data 221 in the storage media via the drive 26. The external storage apparatus may be a data server such as a NAS. In this case, the control unit 21 may also store the learning result data 221 in the data server via a network using the communication interface 23. Moreover, the external storage apparatus may also be an external storage apparatus connected to the learning apparatus 2, for example.

With this, upon completing saving of the learning result data 221, the control unit 21 ends the series of processing regarding the machine learning of the identification model 40.

Note that, as described above, alternating execution of the machine learning of the identification model 40 by one of the learning apparatuses 2 and the machine learning of the generation model 41 by the model generation apparatus 1 may be repeated. In the process of this repetition, the control unit 21 may omit step S104, and temporarily save information regarding a provisional trained identification model 40 in the RAM. Alternatively, the control unit 21 may save information regarding a provisional trained identification model 40 in a predetermined storage area as the learning result data 221, without omitting this step S104. Also, in the process of the repetition, the control unit 21 may omit the processing in step S101.

(B) Model Generation Apparatus

Figure 9:
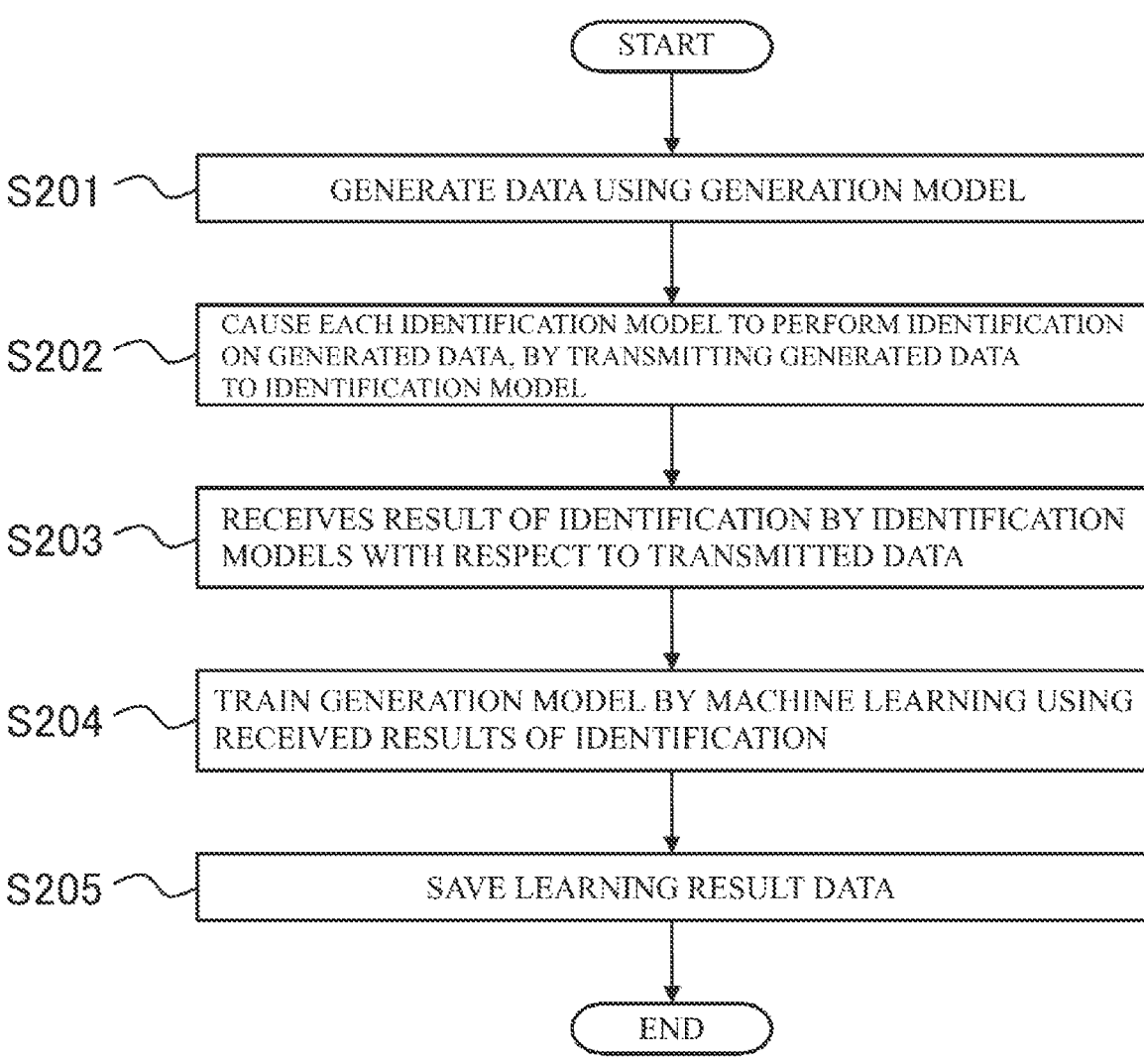
FIG. 9 is a diagram illustrating illustrates an example of a processing procedure of machine learning of a generation model by a model generation apparatus according to one or more embodiments.

Next an exemplary operation of the model generation apparatus 1 relating to machine learning of the generation model 41 will be described using FIG. 9. FIG. 9 is a flowchart illustrating an example of a processing procedure relating to the machine learning of the generation model 41 by the model generation apparatus 1. The processing procedure described below is an example of a "model generation method" according to the present invention. Note that each processing procedure described below is merely an example, and each step may be changed to the extent possible. Moreover, in the processing procedure described below, steps may also be omitted, replaced, or added as appropriate depending on the embodiment.

(Step S201)

In step S201, the control unit 11 operates as the generating unit 111, and the data 50 is generated using the generation model 41. In the initial stage, the generation model 41 may be given by a template, or may be designated by an operator via the input apparatus 14. In the course of repeating the machine learning with the identification model 40 and the machine learning with the generation model 41, the generation model 41 may also be given by the learning result obtained in the previous machine learning.

In the present embodiment, the control unit 11 configures the setting of the generation model 41 based on these. Next, the control unit 11 extracts a plurality of noises from a predetermined probability distribution such as a Gaussian distribution. The number of noises to be extracted may be selected as appropriate depending on the embodiment. Also, the control unit 11 inputs the extracted noises to the input layer 411 of the generation model 41, and determines, sequentially from the input side, how each of the neurons included in the layers 411 to 413 fires. With this, the control unit 11 acquires various pieces of data 50 generated in correspondence with the respective noise from the output layer 413. Upon generating the data 50, the control unit 11 advances the processing to the next step S202.

(Steps S202 and S203)

In step S202, the control unit 11 operates as the transmitting unit 112, and causes the identification models 40 to perform an identification on the data 50, by transmitting the generated data 50 to the identification models 40. In step S203, the control unit 11 operates as the receiving unit 113, and receives the result 51 of the identification by the identification models 40 regarding the transmitted data 50.

In the present embodiment, the control unit 11 transmits the data 50 to the learning apparatuses 2 via a network using the communication interface 13. With this, the control unit 11 causes the identification models 40 to perform an identification on the data 50. Also, the control unit 11 receives the result 51 of the identification by the identification model 40 from the learning apparatuses 2 via the network. Upon acquiring the result 51 of the identification from the learning apparatuses 2, the control unit 11 advances the processing to the next step S204.

Note that the path for transmitting the data 50, and the path for receiving the result 51 of the identification is not limited in particular, and may be selected as appropriate depending on the embodiment. For example, the control unit 11 may directly transmit the data 50 to the learning apparatuses 2 via a network. Also, the control unit 11 may transmit the generated data 50 to an external storage apparatus such as a data server, and cause the learning apparatuses 2 to acquire the data 50 stored in the external storage apparatus, for example. With this, the control unit 11 may indirectly transmit the generated data 50 to the learning apparatuses 2. The same applies to the path for receiving the results 51 of the identification.

(Step S204)

In step S204, the control unit 11 operates as the learning processing unit 114, and trains the generation model 41 to generate data that causes the identification performance of at least one of the plurality of identification models 40 to be degraded, by performing machine learning using the received results 51 of the identification. That is, the control unit 11 trains the generation model 41 to generate data that causes at least one of the plurality of identification models 40 to identify as "True" (that is, identify as originating from the local learning data 3). The method of calculating the error so as to degrade at least one of the plurality of identification models 40 may be selected as appropriate depending on the embodiment. In the present embodiment, a softmax function is used to calculate this error as follows.

[Math. 2]

$$y_i = D_i(G(z)) \tag{Formula 2}$$

Specifically, in the aforementioned step S202, the control units 21 of the learning apparatuses 2 execute (perform) identification with the data 50 generated by the generation model 41 using the identification models 40. The output value $y_i$ of the $i^{th}$ identification model 40 is expressed by the above Formula 2. The control unit 21 executes calculation of the following Formula 3 based on the output value of this identification model 40.

[Math. 3]

$$S(ly_i) = \frac{\exp(ly_i)}{\sum_m \exp(ly_m)} \tag{Formula 3}$$

First, the control unit 21 calculates $\exp(ly_i)$. Also, the control unit 21 obtains the computation results of the other learning apparatuses 2, and calculates the total sum of $\exp(ly_m)$ in Formula 3, and calculates the softmax function $S(ly_i)$ using the calculated total sum. Note that l is a parameter. By increasing the value of l, the degree of degradation of the identification performance of at least one of the plurality of identification models 40 can be increased. On the other hand, by decreasing the value of l, the degree of degradation of the identification performance of at least one of the plurality of identification models 40 is decreased, and it is possible to approach learning that degrades the identification performance of all identification models 40. The value of l may be determined as appropriate. For example, the value of l may be designated by the operator. Also, the value of l may be determined in accordance with the variation in distribution of the local learning data 3 of the learning apparatuses 2, for example. Specifically, when the variation in the distribution of the local learning data 3 of the learning apparatuses 2 is small, the learning apparatuses 2 retain similar data as the respective local learning data 3. In this case, the value of l may be set to a small value. On the other hand, when the variation in distribution of pieces of local learning data 3 of the learning apparatuses 2 is large, the learning apparatuses 2 retain non-uniform data as the respective local learning data 3. In this case, the value of l may be set to a large value. The variation in distribution may be calculated by an index for dispersion or the like.

[Math. 4]

$$Y = \Sigma_i y_i S(ly_i) \tag{Formula 4}$$

[Math. 5]

$$F(Y) = E((Y-1)^2) \tag{Formula 5}$$

Next, the control unit 21 calculates $y_i S(ly_i)$ of Formula 4 above. Moreover, the control unit 21 obtains the computation results of the other learning apparatuses 2, and calculates Y. Y corresponds to a result obtained by integrating the outputs of the identification models 40 regarding the generated data 50. The control unit 21 calculates F (Y) in Formula 5 above based on the calculated Y. F (Y) is an example of a loss function (error) of the generation model 41. Note that the loss function for calculating the error is not limited to the example of Formula 5, and may be selected as appropriate depending on the embodiment.

[Math. 6]

$$V_i = \frac{\partial F(Y)}{\partial Y} \times \frac{\partial Y}{y_i} \times \frac{\partial y_i}{\partial G(z)}$$ 
<div align="right">Formula 6</div>

Also, the control unit 21 calculates $V_i$ in Formula 6 above based on the calculated F (Y). $V_i$ corresponds to a gradient obtained by back-propagating the error F (Y) from the output side to the input side of the identification model 40. In step S203 above, the control unit 21 of each learning apparatus 2 returns the calculated $V_i$ as the result 51 of the identification.

[Math. 7]

$$V = \Sigma_i V_i$$
<div align="right">Formula 7</div>

In this step S204, the control unit 11 calculates a total sum V (Formula 7) of $V_i$ acquired from each learning apparatus 2. With this, the control unit 11 integrates the results 51 of the identification by the identification models 40. Also, the control unit 11 trains the generation model 41 by performing machine learning using the integrated results 51 of the identification. Specifically, the control unit 11 calculates the errors of the weights of the connections between the neurons and the threshold values of the neurons in the generation model 41 by back propagation using the calculated gradient V. Also, the control unit 11 updates the values of the weights of the connections between the neurons and the threshold values of the neurons in the generation model 41 based on the calculated errors.

With this, the values of computation parameters of the generation model 41 are adjusted so as to degrade at least one of the plurality of identification models 40. That is, the control unit 11 can construct a generation model 41 that is trained to generate data that causes the identification performance of at least one of the plurality of identification models 40 to be degraded. Upon completing the machine learning of the generation model 41, the control unit 11 advances the processing to the next step S205.

Note that the result 51 of the identification returned from the learning apparatuses 2 is not limited to this example, as long as it is usable in updating the computation parameters of the generation model 41, and may be determined as appropriate depending on the embodiment. For example, if the model generation apparatus 1 can execute the back propagation calculation of each identification model 40, the control unit 11 may obtain an output value of each identification model 40 as the result 51 of the identification. In this case, the control unit 11 may execute the computation processing described above of the learning apparatuses 2. Also, the method of calculating an error so as to degrade the identification performance of at least one of the plurality of identification models 40 is not limited to the method of using a softmax function. A max function may also be used to calculate this error instead of the softmax function, for example.

(Step S205)

In step S205, the control unit 11 operates as the saving processing unit 115, and saves the information regarding the trained generation model 41 constructed by machine learning in a predetermined storage area. In the present embodiment, the control unit 11 generates information indicating the structure and the computation parameters of the trained neural network (generation model 41) constructed by the machine learning in step S204 as the learning result data 121. Also, the control unit 11 saves the generated learning result data 121 in a predetermined storage area. The predetermined storage area may be the RAM in the control unit 11, the storage unit 12, an external storage apparatus, or a storage medium, or a combination of these, for example. With this, upon completing the saving of the learning result data 121, the control unit 11 ends the series of processing regarding the machine learning of the generation model 41.

Note that, as described above, the alternating execution of the machine learning of the identification model 40 by one of the learning apparatuses 2 and the machine learning of the generation model 41 by the model generation apparatus 1 may also be repeated. In the process of this repetition, the control unit 11 may omit step S205, and temporarily save the information (learning result) regarding a provisional trained generation model 41 in the RAM. Alternatively, the control unit 11 may not omit step S205, and save the information regarding a provisional trained generation model 41 in the predetermined storage area as the learning result data 121.

[Inference Processing]

Figure 10:
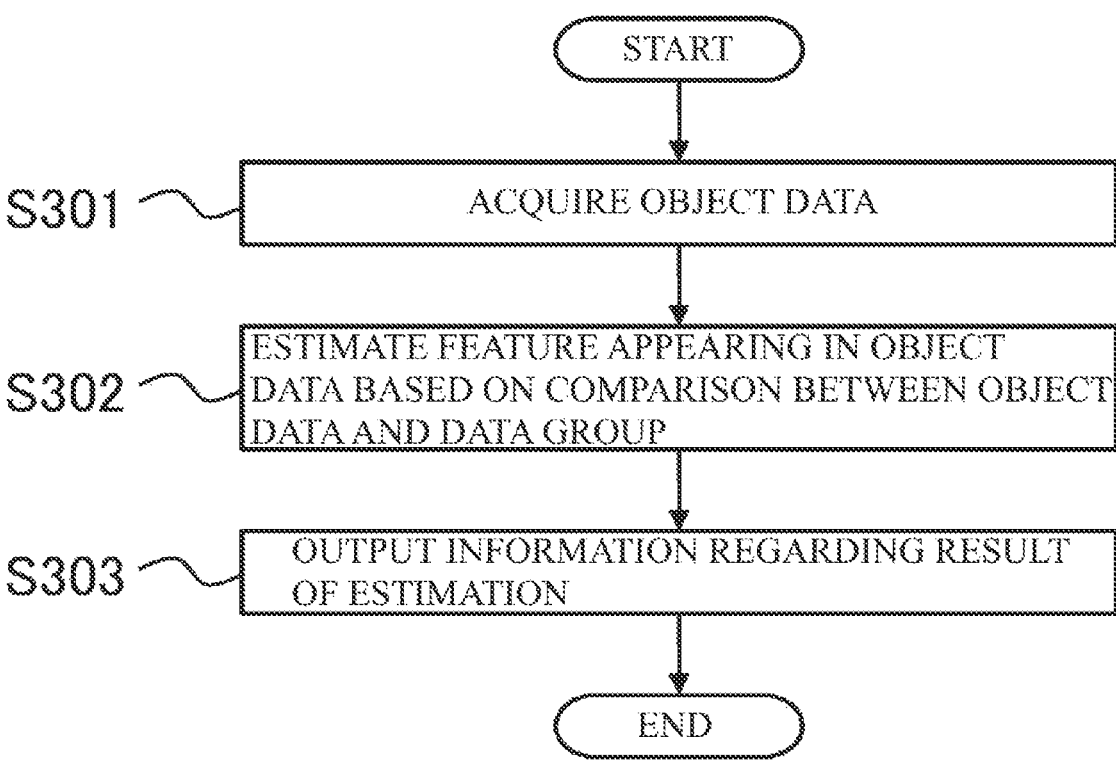
FIG. 10 is a diagram illustrating an example of a processing procedure relating to predetermined inference by a learning apparatus according to one or more embodiments.

Next, an exemplary operation of each learning apparatus 2 relating to the inference processing will be described using FIG. 10. FIG. 10 is a flowchart illustrating an example of the processing procedure relating to the inference processing performed by each learning apparatus 2. Note that the processing procedures described below are merely examples, and each step may be changed to the extent possible. Moreover, in the processing procedure described below, steps may also be omitted, replaced, or added as appropriate depending on the embodiment.

(Step S301)

In step S301, the control unit 21 operates as the object data acquiring unit 216, and acquires the object data 223 with respect to which a predetermined inference is to be performed. In the present embodiment, the learning apparatuses 2 are respectively connected to the sensors S via the external interfaces 27. Therefore, the control unit 21 acquires the object data 223 from the sensor S via the external interface 27.

Note that the path through which the object data 223 is acquired is not limited to this example, and may be determined as appropriate depending on the embodiment. For example, another computer that is different from the learning apparatuses 2 may be connected to the sensor S. In this case, the control unit 21 may also acquire the object data 223 by receiving the object data 223 transmitted from the other computer. Upon acquiring the object data 223, the control unit 21 advances the processing to the next step S302.

(Step S302)

In step S302, the control unit 21 operates as the inference unit 217, and acquires the data group 225 collected as the inference learning data for inferring a feature. The data group 225 is constituted by a plurality of pieces of data 2251 relating to the feature to be inferred. The data 2251 included in the data group 225 may be data included in the local learning data 3, data generated by the generation model 41, or the like.

Also, the control unit 21 may also acquire data generated using the trained generation model 41 as the data 2251. The generation of data by the trained generation model 41 may be executed by learning apparatuses 2, or may also be executed by another computer. When the generation of data by the trained generation model 41 is executed in the learning apparatuses 2, the control unit 21 includes the trained generation model 41 by retaining the learning result data 121. The control unit 21 may acquire the learning result data 121 generated by the learning processing described above via a network, a storage medium 92, or the like. In this case, the control unit 21 configures the setting of the trained generation model 41 by referring to the learning result data 121. Also, the control unit 21 extracts a plurality of noises from a predetermined probability distribution such as a Gaussian distribution. Also, the control unit 21 inputs the extracted noises to the input layer 411 of the generation model 41, and determines, sequentially from the input side, how each of the neurons included in the layers 411 to 413 fires. With this, the control unit 21 acquires generated data corresponding to each noise from the output layer 413. The control unit 21 can acquire the data group 225 including the data generated by the trained generation model 41 by adding the acquired data to the data group 225 as the data 2251. Alternatively, the control unit 21 may also acquire data generated by another computer using the trained generation model 41 via a network, a storage medium 92, or the like.

Next, the control unit 21 infers the feature or features appearing in the object data 223 based on a comparison between the data group 225 and the object data 223. The method of inferring the feature or features appearing in the object data 223 based on a comparison with the data group 225 may be selected as appropriate depending on the embodiment. A scenario is envisioned in which each set of data 2251 included in the data group 225 is data in which a predetermined feature appears, and it is estimated whether or not the predetermined feature appears in the object data 223 based on a comparison with the data group 225 as the inference of the feature, for example. For example, in a scenario in which the object data 223 is image data including images of products, and it is estimated whether or not a defect is included in the product, as the inference of the feature, each set of data 2251 constituting the data group 225 serving as the image data of an image of the product including a defect or not including a defect is an example of the data in which the predetermined feature appears. In this case, the control unit 21 may also calculate the similarity between each set of data 2251 and the object data 223, in the comparison between the data group 225 and the object data 223. The similarity may be calculated by a normal (distance), or the like.

Also, the control unit 21 may also determine whether or not the object data 223 is included in the distribution of the data 2251 constituting the data group 225 based on the calculated similarity. For example, the configuration may be such that the control unit 21 compares the calculated similarity and a threshold value, and if the calculated similarity is the threshold value or less, determines that the object data 223 is included in the distribution of the data 2251 constituting the data group 225. The threshold value may be determined as appropriate. In this case, the control unit 21 can estimate that the predetermined feature appearing in each set of data 2251 also appears in the object data 223. In the example described above, when each set of data 2251 is image data of an image of a product including a defect, the control unit 21 can estimate that the product in the image of the object data 223 includes a defect. On the other hand, if the calculated similarity exceeds the threshold value, the control unit 21 may determine that the object data 223 is not included in the distribution of the data 2251 constituting the data group 225. In this case, the control unit 21 can estimate that the predetermined feature appearing in the data 2251 does not appear in the object data 223. In the example described above, the control unit 21 can estimate that the product in the image of the object data 223 does not include a defect.

When inference is performed with respect to a plurality of features, the data group 225 may be constituted by data 2251 collected for each feature. In this case, a label indicating the feature appearing in each set of data 2251 is appended to the data 2251, and the data 2251 may be classified based on this label. Also, the control unit 21 may also calculate the similarity between each set of data 2251 and the object data 223 for each feature, and estimate whether or not the feature appears in the object data 223. For example, the control unit 21 may infer that the feature that appears in the data 2251 having a highest similarity with the object data 223 also appears in the object data 223. Upon inferring the feature appearing in the object data 223 based on the comparison with the data group 225, the control unit 21 advances the processing to the next step S303.
(Step S303)

In step S303, the control unit 21 operates as the output unit 218, and outputs the information regarding the result of inferring the feature.

The output destination and the contents of information to be output may be determined as appropriate depending on the embodiment. For example, the control unit 21 may output the result of inferring the feature in step S302 to the output apparatus 25 as is. Also, the control unit 21 may also execute some information processing based on the result of inferring the feature, for example. Also, the control unit 21 may output the result of executing the information processing as the information regarding the result of inferring the feature. The outputting of the result of executing the information processing may include outputting a specific message such as a warning depending on the result of the inference, controlling the operation of an apparatus to be controlled depending on the result of the inference, or the like. The output destination may be the output apparatus 25, an apparatus to be controlled, or the like. Upon completing the output of information regarding the result of inference, the control unit 21 ends the series of processing regarding the predetermined inference processing.
[Grouping of Learning Apparatuses]

Figure 11:
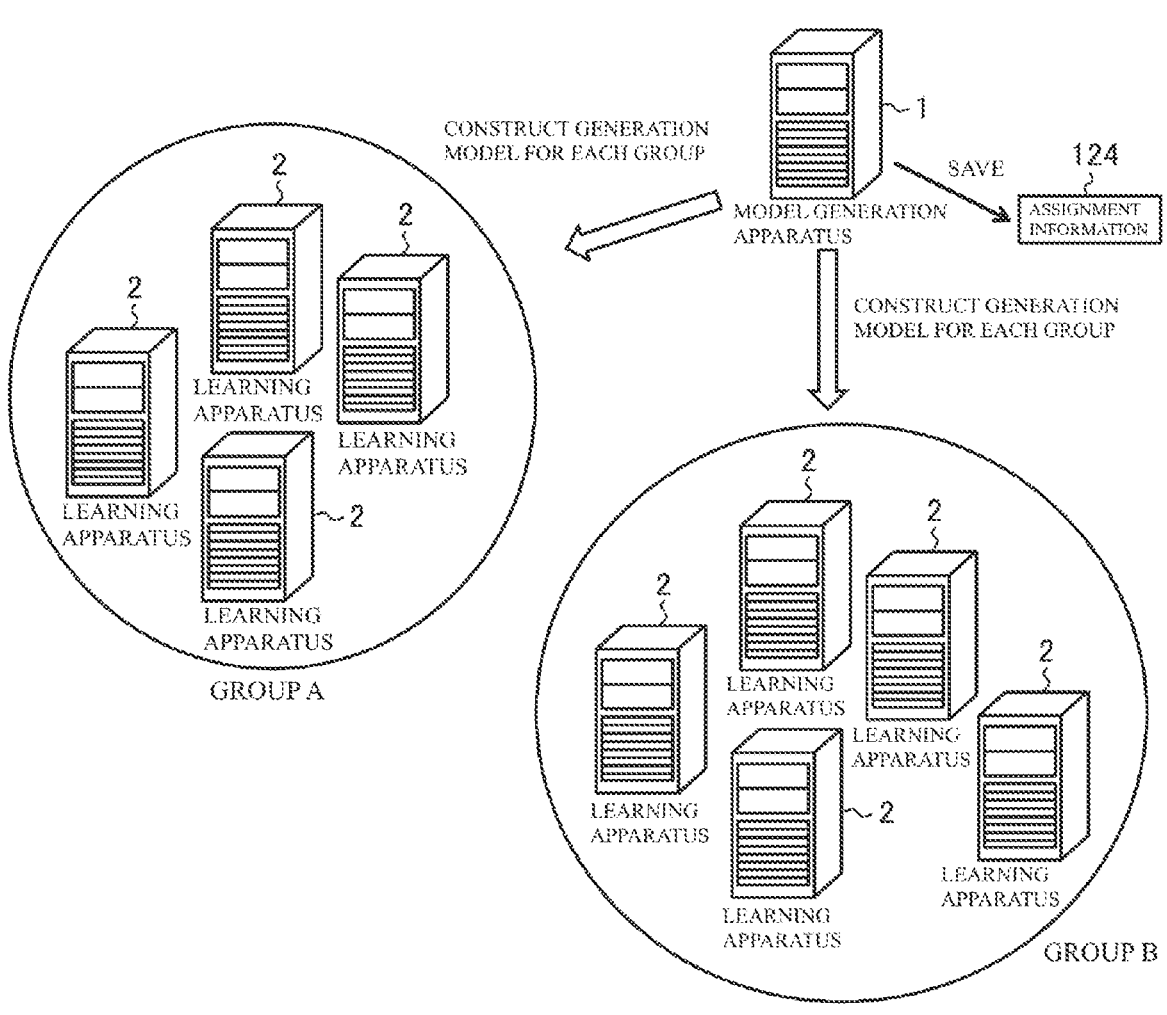
FIG. 11 is a schematic diagram illustrating schematically illustrate grouping processing according to one or more embodiments.

Next, an example of grouping of the learning apparatuses 2 will be described using FIG. 11. FIG. 11 schematically illustrates an example of a scenario in which grouping of the learning apparatuses 2 is performed.

The model generation apparatus 1 constructs a generation model 41 for generating data in accordance with the distribution of the local learning data 3 collected with the learning apparatuses 2, as one object. For example, assume that the local learning data 3 collected by one learning apparatus 2 and the local learning data 3 collected by another learning apparatus 2 are constituted by the same type of data. In this case, the generation model 41 that can generate data in accordance with the distribution of the local learning data 3 of the learning apparatuses 2 can be appropriately constructed by the machine learning processing described above. On the other hand, assume that the local learning data 3 collected by one learning apparatus 2 and the local learning data 3 collected by another learning apparatus 2 are constituted by different types of data, for example. A case where one type of local learning data 3 is constituted by image data, and another type of local learning data 3 is constituted by sound data is an example of this case. In this case, it is difficult to construct a generation model 41 that can generate data in accordance with the distribution of the local learning data 3 of each learning apparatus 2.

Therefore, in the present embodiment, the control unit 11 may operates as a grouping unit 116, and may assign each learning apparatus 2 to at least one of a plurality of groups. The groups may be set as appropriate. For example, each group may be set as appropriate depending on the type of data included in the local learning data, the features that appear in the data, the purpose of use of the data, or the like. In FIG. 11, a scenario is illustrated in which the learning apparatuses 2 are each assigned to one of two groups, namely a group A and a group B. The control unit 11 stores the group assignment result regarding the learning apparatuses 2 in assignment information 124.

When this grouping processing is executed, the model generation apparatus 1 retains (holds) a generation model 41 for each group. Also, the control unit 11 executes the processing of steps S201 to 205 described above within the same group, in other words, for each group individually. That is, in step S201, the control unit 11 generates data 50 for each group using a corresponding generation model 41. In step S202, the control unit 11 causes, for each group, the corresponding identification model 40 to execute identification with respect to data 50 by transmitting the data 50 generated by the corresponding generation model 41 to the learning apparatus 2. In step S203, the control unit 11 receives, for each group, the result 51 of the identification performed by the identification model 40 from the corresponding learning apparatus 2. In step S204, the control unit 11 trains, for each group, the corresponding generation model 41 to generate data that causes the identification performance of at least one of the plurality of identification models 40 to be degraded, by performing machine learning using the received results 51 of the identification. Also, in step S205, the control unit 11 saves, for each group, information regarding the trained generation model 41 constructed by machine learning in a predetermined storage area.

The method of grouping may be determined as appropriate depending on the embodiment. In the present embodiment, the control unit 11 assigns each learning apparatus 2 to at least one of plurality of groups using one of the following two methods.

(A) First Grouping Method

First, an example of a first grouping method will be described using FIG. 12. FIG. 12 is a flowchart illustrating an example of the processing procedure relating to assigning each learning apparatus 2 to a group by the first grouping method. In the first grouping method, the control unit 11 assigns each learning apparatus 2 to at least one of a plurality of groups by causing the learning apparatus 2 to select a desired group from a group list.

Note that when the first grouping method is adopted as the method of assigning each learning apparatus 2 to a group, the processing of assigning each learning apparatus 2 to at least one of the plurality of groups is constituted by the processing in steps S701 to S703 below. Note that the processing procedure described below is merely an example, and the processing may be modified to the extent possible. Also, in the processing procedure described below, steps may also be omitted, replaced, or added as appropriate depending on the embodiment.

In step S701, the control unit 11 distributes a group list 123 listing a plurality of groups to each learning apparatus 2. With this, the control unit 11 causes each learning apparatus 2 to select at least one group from the plurality of groups on the group list 123. The groups included in the group list 123 may be set in accordance with attributes such as the local learning data 3, the learning apparatus 2, or the user of the learning apparatus 2. For example, in an example of visual inspection, groups may be set in accordance with attributes such as line number, factory name, or corporate name. Also, a new group may be set to the group list 123 by request from the learning apparatuses 2. An operator of each learning apparatus 2 can refer to the group list 123 output to the output apparatus 25, and select at least one group from the group list 123 by operating the input apparatus 24. Also, the operator can add a new group to the group list 123 by operating the input apparatus 24. Each learning apparatus 2 may also select two or more groups. The control unit 21 of each learning apparatus 2 returns the reply of group selection to the model generation apparatus 1, according to this operation.

In step S702, the control unit 11 acquires this reply of selection from the learning apparatuses 2. Also, in step S703, the control unit 11 assigns each learning apparatus 2 to at least one selected group based on the acquired replies. Upon completing assignment of at least one group, the control unit 11, ends the series of processing regarding the assignment of groups by the first grouping method. According to this first grouping method, the control unit 11 can perform grouping of the learning apparatuses 2 with a simple method.

(B) Second Grouping Method

Next, an example of a second grouping method will be described using FIG. 13. FIG. 13 is a flowchart illustrating an example of the processing procedure relating to assigning each learning apparatus 2 to a group by the second grouping method. In the second grouping method, the control unit 11 assigns each learning apparatus 2 to an appropriate group according to the attribute of the local learning data 3.

Note that when the second grouping method is adopted as the method of assigning each learning apparatus 2 to a group, the processing of assigning each learning apparatus 2 to at least one of a plurality of groups is constituted by the processing in steps S801 to S803 below. Note that the processing procedure described below is merely an example, and the processing may be modified to the extent possible. Also, in the processing procedure described below, steps may also be omitted, replaced, or added as appropriate depending on the embodiment.

(Step S801)

In step S801, the control unit 11 acquires attribute data regarding the local learning data 3 from each learning apparatus 2. The method of acquiring the attribute data may be similar to the method of acquiring the result 51 of the identification from each learning apparatus 2, in step S203 described above. The control unit 11 may directly or indirectly acquire the attribute data from each learning apparatus 2.

The attribute data may include any information regarding the local learning data 3, and may include information indicating the type of data included in the local learning data 3, information indicating the feature appearing in data, information indicating the purpose of use of data, and the like. The feature appearing in data may include any element that can be inferred from the data. When the local learning data 3 is constituted by image data of product images, the feature appearing in data may be whether or not a defect is included in the product, the type of defect included in the product, or the like. Also, the purpose of use of data may be determined as appropriate depending on the embodiment. The data included in the local learning data 3 may be used for learning a predetermined inference such as visual inspection, monitoring of cultivation condition, or the like. The attribute data may be generated by each learning apparatus 2 when collecting the local learning data 3 in step S101. Upon acquiring the attribute data, the control unit 11, advances the processing to the next step S802.
(Steps S802 and S803)

In step S802, the control unit 11 performs clustering of the attribute data acquired from each learning apparatus 2. The method of clustering is not limited in particular, and may be selected as appropriate depending on the embodiment. A known method such as k-means clustering may be adopted for clustering.

In step S803, the control unit 11 assigns each learning apparatus 2 to at least one of the plurality of groups based on the clustering result. The control unit 11 assigns learning apparatuses 2 regarding which acquired attribute data is assigned to the same class to the same group, for example. In this case, each group may be set in accordance with the class of the attribute data. Also, the control unit 11 may also assign each learning apparatus 2 to two or more groups based on the clustering result.

Upon completing assignment of groups based on the clustering result, the control unit 11, ends the series of processing regarding the assignment of groups by the second grouping method. According to this second grouping method, the control unit 11 can assign each learning apparatus 2 to an appropriate group according to the attribute of the local learning data 3.

As a result of adopting at least one of the two method described above, the control unit 11 can appropriately perform grouping of the learning apparatuses 2. Note that the method of grouping is not limited to these examples, and may be determined as appropriate depending on the embodiment. For example, the control unit 11 may also accept grouping designated by an operator via the input apparatus 14, for example. In this case, the control unit 11 may perform grouping of the learning apparatuses 2 according to the designation made by the operator.

[Features]

As described above, the model generation apparatus 1 according to the present embodiment collects, in step S203, the result 51 of the identification performed by the identification models 40, instead of collecting the local learning data 3 itself, in order to perform machine learning of the generation model 41, in step S204. With this, the communication cost of the model generation apparatus 1 can be kept low. Also, the local learning data 3 need not be used in machine learning of the generation model 41, and therefore the calculation cost of the model generation apparatus 1 can be kept low, in step S203. Moreover, the local learning data 3 itself need not be gathered to the model generation apparatus 1, and therefore the contents of the local learning data 3 can be prevented from being directly disclosed. Therefore, the confidentiality of the local learning data 3 can be secured to some degree.

In addition, in the present embodiment, in step S204, the generation model 41 is trained to generate data that causes the identification performance of at least one of the plurality of identification models 40 to be degraded, by performing machine learning using the collected results 51 of the identification. That is, the generation model 41 is trained to generate data that causes erroneous identification with at least one of the identification models 40 by the machine learning. Accordingly, a generation model 41 that can generate data in accordance with the distribution of any of the local learning data 3 that is used for machine learning of the identification models 40 can be constructed. Therefore, the trained generation model 41 can generate data in accordance with the distribution of the logical sum of the pieces of local learning data 3 that are used for machine learning of the respective identification models 40. That is, even if the distributions of the pieces of local learning data 3 collected by the respective learning apparatuses 2 are different, the trained generation model 41 can generate data that may be included in each distribution. Therefore, according to the present embodiment, a generation model 41 that can generate various data can be constructed.

Note that the constructed trained generation model 41 may be used to increase the number of pieces of inference learning data, that is, in the present embodiment, the number of pieces of data 2251 that construct the data group 225 to be used for inference. According to the generation model 41 constructed according to the present embodiment, data that may be included in the distribution of the local learning data 3 collected by each learning apparatus 2 can be generated. Therefore, data that is difficult to collect by an individual learning apparatus 2 but may be obtained by another learning apparatus 2 can be obtained by the generation model 41. Accordingly, not only the number of pieces of data 2251 included in the data group 225 is increased, but also the variation of the data 2251 can be increased, and with this, the inference accuracy in step S302 can be increased.

WORKING EXAMPLE

In order to verify the effects described above, generation models according to a working example and a comparative example were constructed. Note that the invention is not limited to the working example below.
<Conditions>
    number of sets of local learning data: 3
    data constituting local learning data: two-dimensional numerical data given by (v, w)
    first local learning data: numerical values randomly sampled from a normal distribution with an average of (v, w) being (−0.67, 0.5) and a standard deviation of 0.3
    second local learning data: numerical values randomly sampled from a normal distribution with an average of (v, w) being (0.67, 0.5) and a standard deviation of 0.3
    third local learning data: numerical values randomly sampled from a normal distribution with an average of (v, w) being (0, −1) and a standard deviation of 0.3.
    number of sets of data constituting local learning data: 30000 pieces (10000 samples×3 locals)
    identification model: four-layer structured neural network, prepared for each local learning data
    generation model: four-layer structured neural network
    repetition number of times of machine learning of identification model and generation model: 5000 times The generation model includes a 200-dimensional input layer, a 128-dimensional all-connected layer, a 128-dimensional all-connected layer, and a two-dimensional all-connected layer. The identification model includes a two-dimensional input layer, a 128-dimensional all-connected layer, a 128-dimensional all-connected layer, and a one-dimensional all-connected layer.

Figure 14:
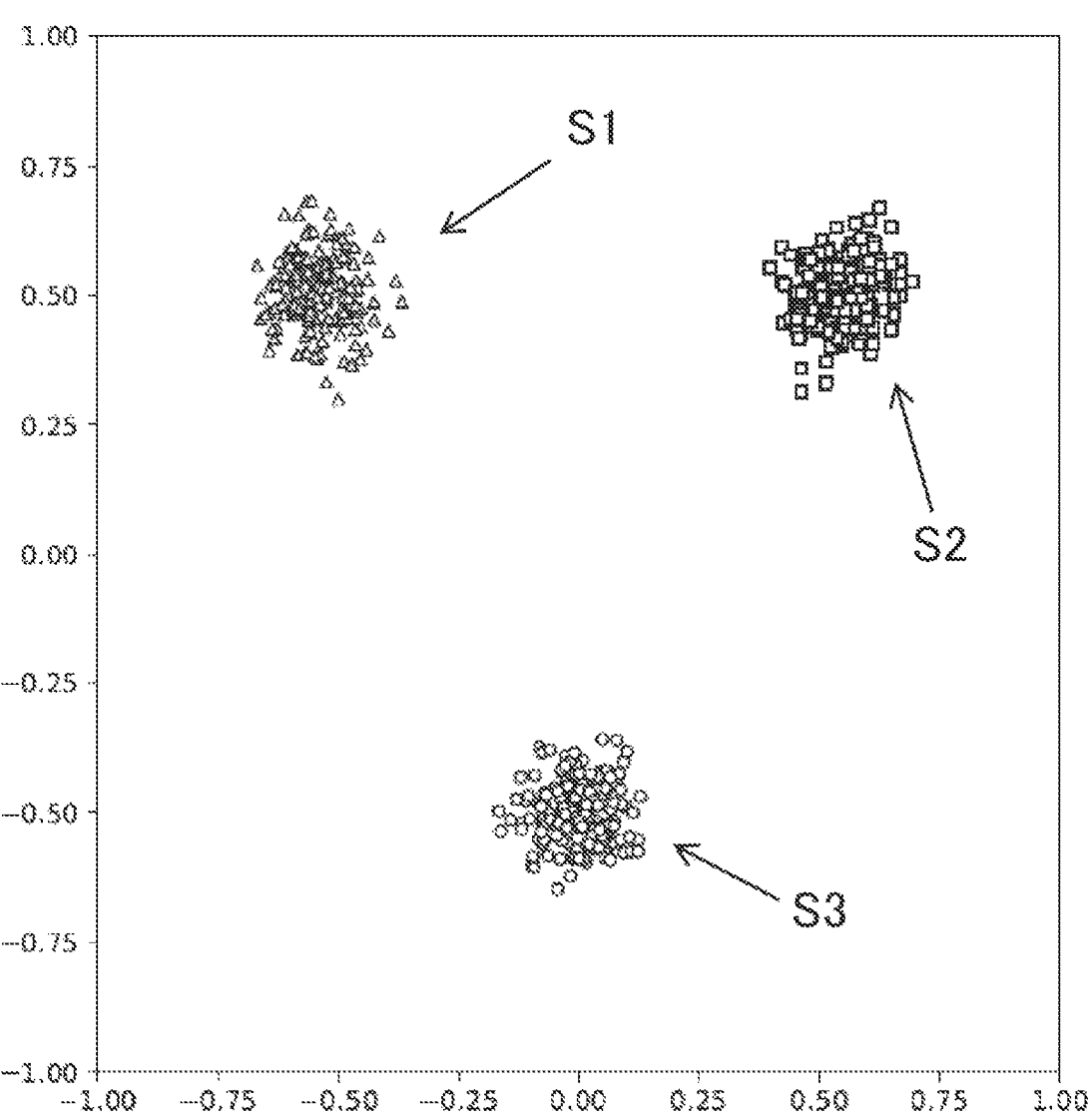
FIG. 14 is a diagram illustrating local learning data that is given for generating an identification model and a generation model.

FIG. 14 shows the local learning data S1 to S3. Three identification models were prepared in correspondence with the three sets of local learning data S1 to S3. The first identification model was trained to identify whether given data originates from the first local learning data S1 or from the generation model. The second identification model has been trained to identify whether given data originates from the second local learning data S2 or from the generation model. The third identification model was trained to identify whether given data originates from the third local learning data S3 or from the generation model.

In the working example, the generation model was trained to generate data that causes the identification performance of at least one of the three identification models to be degraded, as explained in the processing procedure of the embodiment described above. In the comparative example, errors were calculated by mean square errors, and the generation model was trained to generate data that causes the identification performance of all of the three identification models to be degraded. Apart from the learning method, the processing procedure of the comparative example was set to be the same as that of the working example, Then, two-dimensional numerical data was generated by adding noise extracted from a Gaussian distribution to each of the generation models respectively generated in the working example and the comparative example.

Figure 15A:
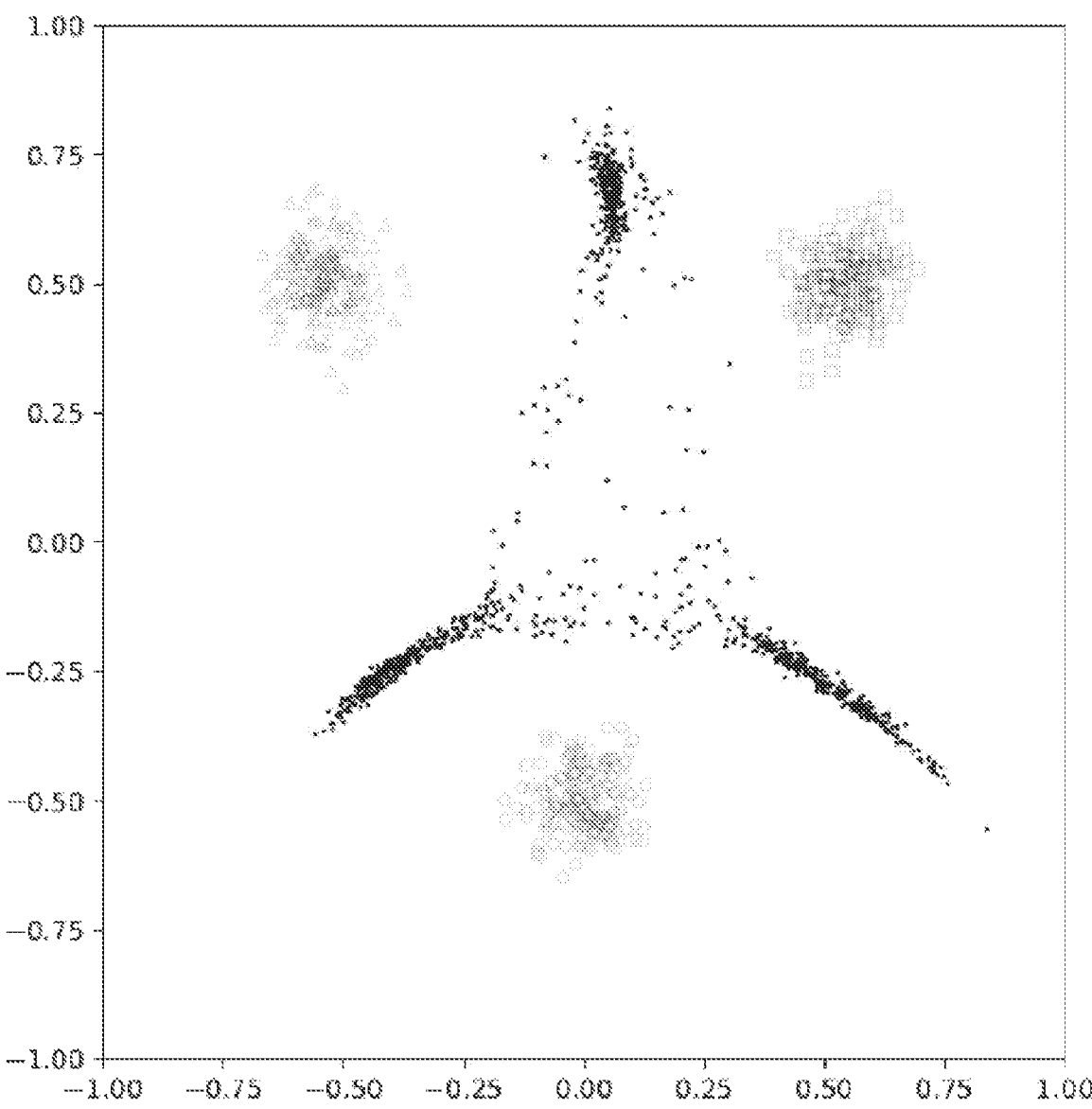
FIG. 15A is a diagram illustrating a result of generating data using a trained generation model generated using a method of a comparative example.
Figure 15B:
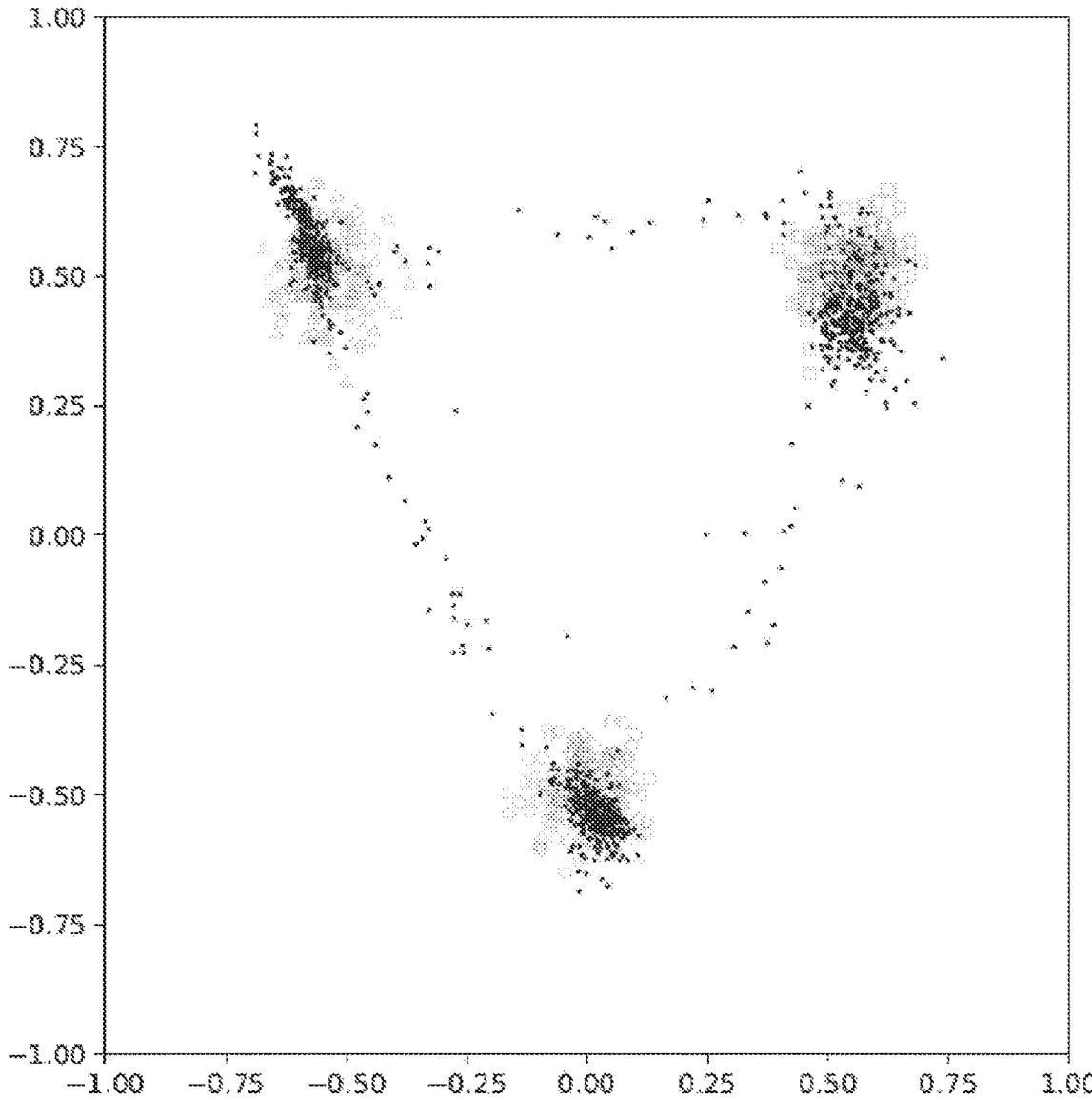
FIG. 15B is a diagram illustrating a result of generating data using a trained generation model generated with a method according to one or more embodiments.

FIG. 15A shows the numerical data generated by the generation model obtained by the learning method of the comparative example. FIG. 15B shows numerical data generated by the generation model obtained by the learning method of the working example. In FIG. 15A and FIG. 15B, squares indicate numerical data constituting the local learning data S1 to S3, and black circles indicate the generated numerical data. Three sets of local learning data S1 to S3 were prepared such that the distributions of their numerical data does not overlap, as with the conditions described above. As a result, as shown in FIG. 15A, with the learning method of the comparative example, the generation model was trained to generate numerical data that does not belong to any of the local learning data S1 to S3. On the other hand, as shown in FIG. 15B, with the learning method of the working example, the generation model was trained to generate numerical data that may belong to the local learning data S1 to S3.

From the verification result described above, it is understood that, when the generation model is trained to generate data that causes the identification performance of all of the identification model to be degraded, the data that can be generated by the trained generation model to be constructed is extremely limited. In particular, it is understood that, in a case where the distributions of the local learning data do not overlap, the generation model is constructed to generate data that is not included in any of the distributions, and with the constructed generation model, data that may be included in the distributions of the local learning data cannot be generated. That is, it is understood that, with the learning method of the comparative example, intended data cannot be generated, and useful data cannot be obtained. On the other hand, according to the learning method of the present embodiment, it is understood that, even in a case where the sets of local learning data are not uniform, and the distributions of the local learning data do not overlap, the generation model can learn the capability of generating data in accordance with the distribution of a logical sum of the sets of local learning data. Therefore, it is understood that, according to the present embodiment, a generation model that can generate various data that may be included in the distributions of the local learning data can be constructed. That is, it is verified that, according to the present embodiment, useful data can be obtained with the constructed generation model.

4. Modifications

Although the embodiment of the present invention has been described above in detail, the above descriptions are merely examples of the present invention in all aspects. Needless to say, various improvements and modifications can be made without departing from the scope of the present invention. For example, the following modifications are possible. Note that, in the following description, the same constituent elements as the constituent elements described in the above embodiment are assigned the same reference numerals, and descriptions of the same points as the points described in the above embodiment are omitted as appropriate. The following modifications may be combined as appropriate.

<4.1>

The model generation apparatus 1 according to the embodiment described above is applied to a scenario in which a feature included in sensing data obtained by the sensor S is inferred. However, the application range of the embodiment described above is not limited to this example. The model generation apparatus 1 according to the embodiment described above can be applied to any scenario in which predetermined data is generated, in particular, data that can be used for learning a predetermined inference. In the following, five modifications in which the application scenario is limited will be illustrated.

(A) Scenario of Visual Inspection

Figure 16:
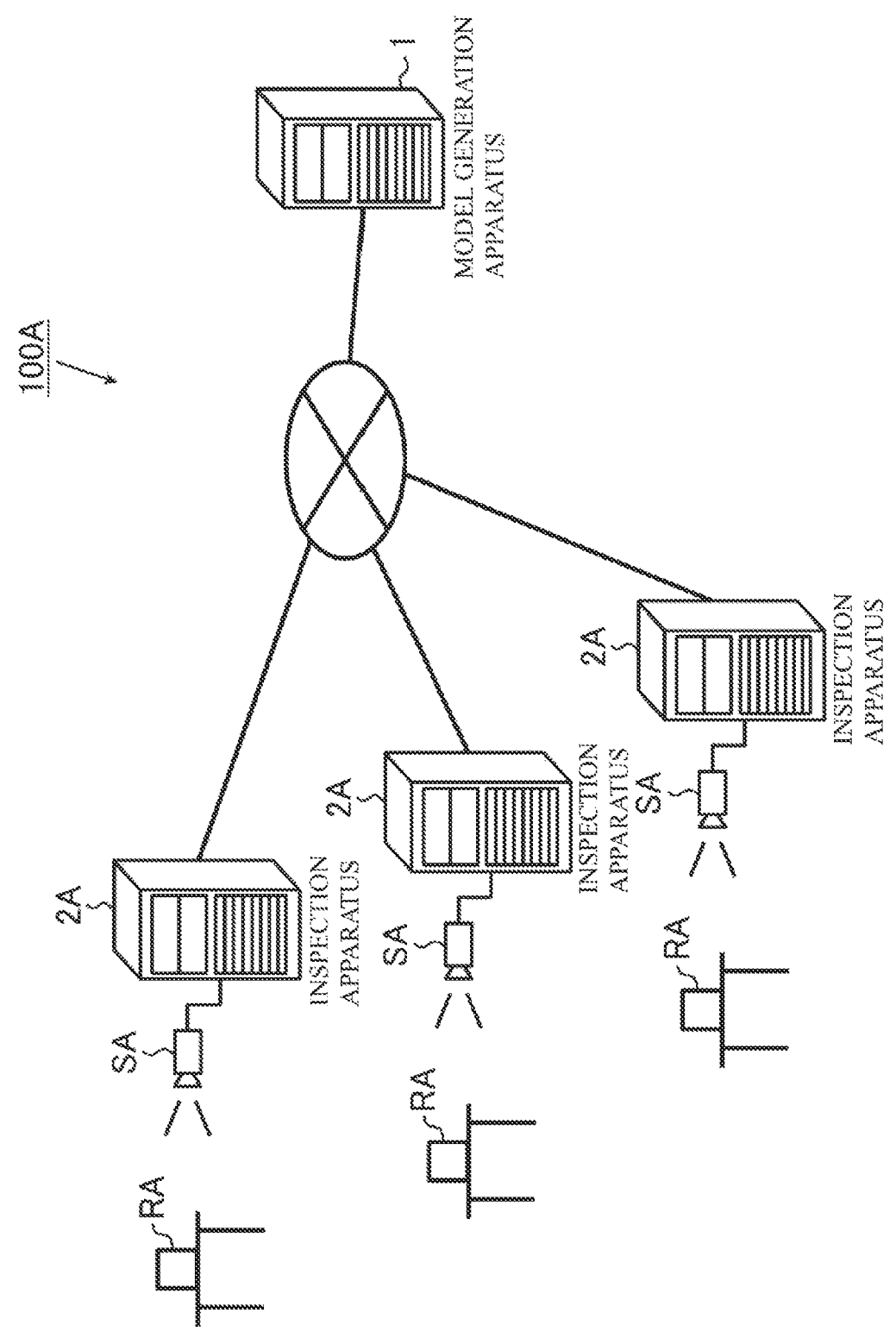
FIG. 16 is a schematic diagram illustrating an example of another scenario to which one or more embodiments from the present invention disclosure is applied.

FIG. 16 schematically illustrates an example of an application scenario of an inspection system 100A according to a first modification. This modification is an example in which the model generation apparatus 1 according to the embodiment described above is applied to a scenario in which data is generated that can be used to estimate the state of a product RA that is produced in a production line. As shown in FIG. 16, the inspection system 100A according to the modification includes the model generation apparatus 1 and a plurality of inspection apparatuses 2A. Similarly to the embodiment described above, the model generation apparatus 1 and the inspection apparatuses 2A may be connected to each other via a network.

The inspection apparatuses 2A correspond to the learning apparatus 2 described above. The inspection apparatuses 2A may be configured similarly to the above-described learning apparatus 2, except that the data that they handle is different. In this modification, the inspection apparatuses 2A are each connected to a camera SA. Each inspection apparatus 2A acquires image data of a product RA by shooting the product RA with the camera SA. The type of the camera SA is not limited in particular. The camera SA may be a common digital camera configured to acquire an RGB image, a depth camera configured to acquire a depth image, an infrared camera configured to image an infrared amount, or the like. Each inspection apparatus 2A inspects the state of a product RA (that is, determines the quality of a product RA) based on the obtained image data.

Note that, in this modification, the image data of images of products is adopted as the data used for estimating the states of products RA. However, the data that can be used to estimate the states of products RA (quality determination) is not limited to image data. For example, sound data obtained by a microphone or measurement data obtained by an encoder may be used to estimate the state, along with or instead of the image data.

<Hardware Configuration of Inspection Apparatus>

Figure 17:
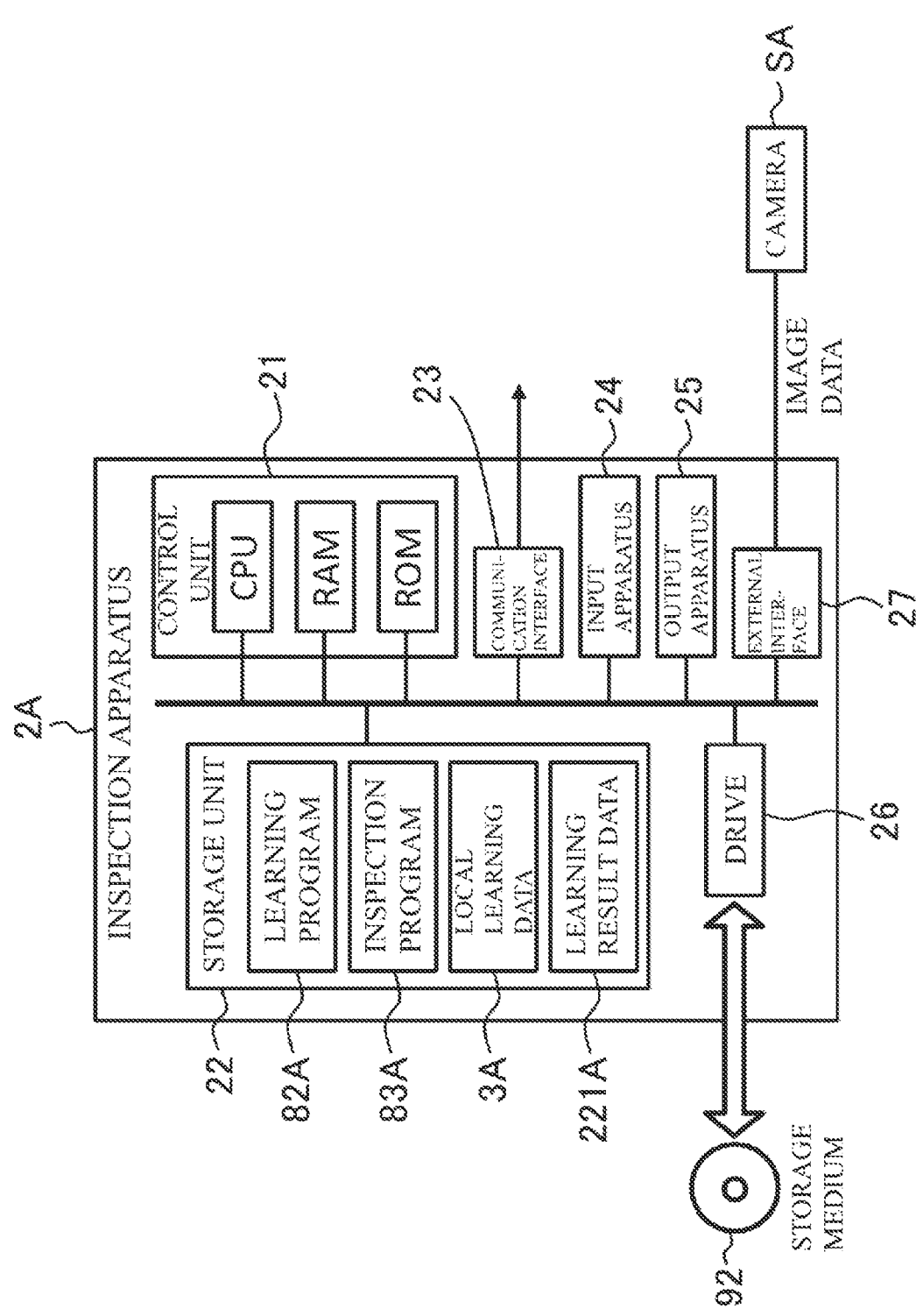
FIG. 17 is a schematic diagram illustrating an example of a hardware configuration of an inspection apparatus according to another mode.

FIG. 17 schematically illustrates an example of the hardware configuration of the inspection apparatuses 2A according to this modification. As shown in FIG. 17, each inspection apparatus 2A according to this modification is a computer in which a control unit 21, a storage unit 22, a communication interface 23, an input apparatus 24, an output apparatus 25, a drive 26, and an external interface 27 are electrically connected, similarly to the above-described learning apparatus 2. Each inspection apparatus 2A is connected to the camera SA via an external interface 27. Note that the hardware configuration of the inspection apparatuses 2A is not limited to this example. As far as the specific hardware configuration of the inspection apparatuses 2A is concerned, constituent elements can be omitted, replaced, or added as appropriate depending on the embodiment. The inspection apparatuses 2A may not only be general-purpose server apparatuses, general-purpose PCs, PLCs (programmable logic controllers), or the like, but also information processing apparatuses that are specifically designed for the service to be provided.

The storage unit 22 of the inspection apparatuses 2A according to this modification stores various types of information such as a learning program 82A, an inspection program 83A, local learning data 3A, and learning result data 221A. The learning program 82A, the inspection program 83A, the local learning data 3A, and the learning result data 221A respectively correspond to the learning program 82, the inference program 83, the local learning data 3, and the learning result data 221 according to the embodiment described above. At least one of the learning program 82A, the inspection program 83A, and the local learning data 3A may also be stored in a storage medium 92. Also, the inspection apparatuses 2A may also acquire at least one of the learning program 82A, the inspection program 83A, and the local learning data 3A from the storage medium 92.

<Learning Processing>

Figure 18A:
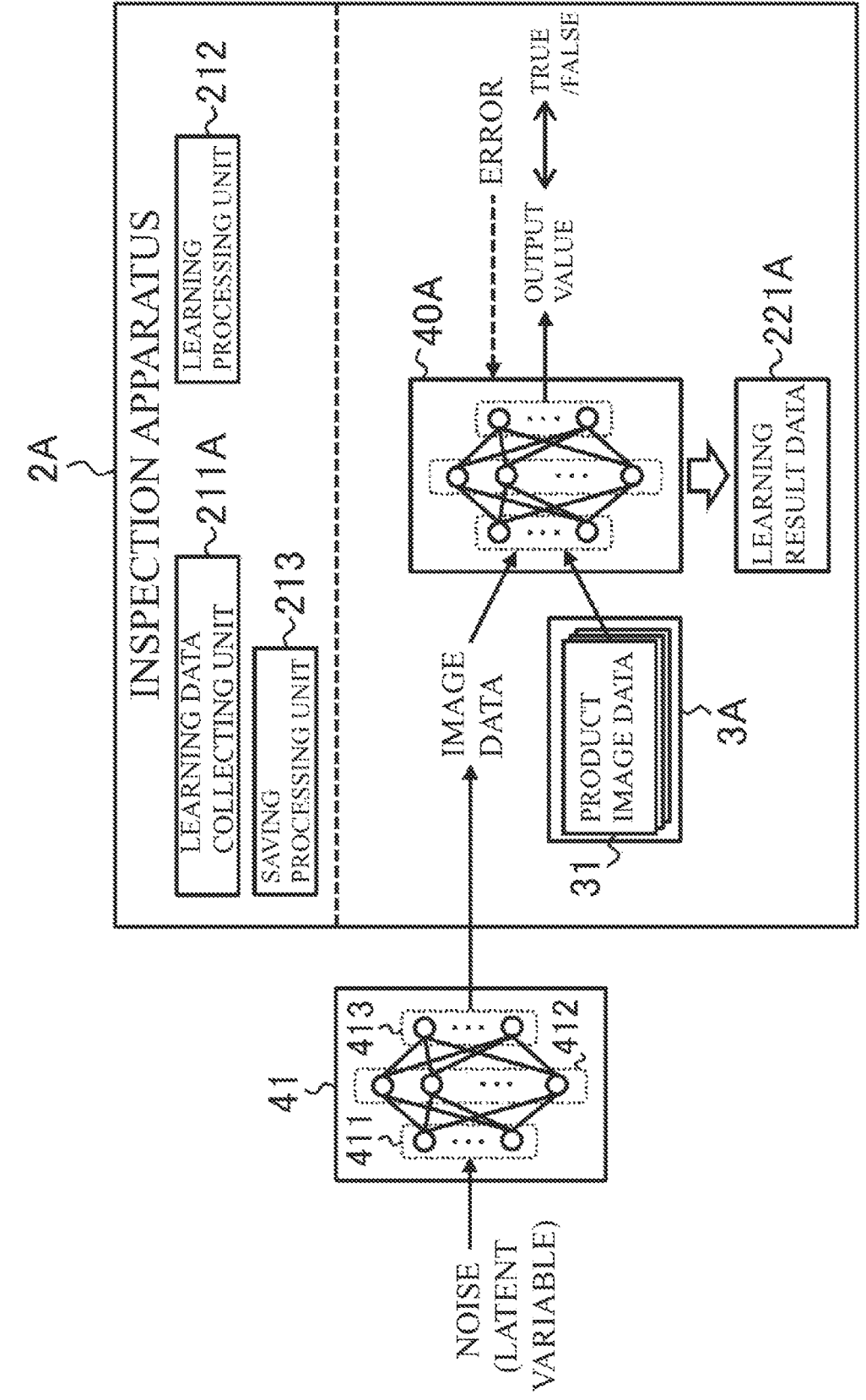
FIG. 18A is a schematic diagram illustrating an example of a software configuration for machine learning of an inspection apparatus according to another mode.

FIG. 18A schematically illustrates an example of the software configuration for learning processing of the inspection apparatuses 2A according to this modification. Similarly to the embodiment described above, the software configuration for the learning processing of the inspection apparatuses 2A is realized by the control unit 21 executing the learning program 82A. As shown in FIG. 18A, the software configuration for the learning processing of the inspection apparatuses 2A is similar to the software configuration for the learning processing of the learning apparatuses 2 described above, except for the fact that the data to be handled is changed from sensing data to image data. With this, each inspection apparatus 2A executes a series of processing for machine learning, similarly to the learning apparatuses 2 described above.

That is, in step S101, the control unit 21 of each inspection apparatus 2A operates as a learning data collecting unit 211A, and collects local learning data 3A to be used for machine learning of an identification model 40A. In this modification, the identification model 40A is constituted by a neural network, similarly to the identification model 40 according to the embodiment described above. The local learning data 3A is constituted by product image data 31 of images of products. The product image data 31 corresponds to the data 2251.

The method of generating the local learning data 3A may be selected as appropriate depending on the embodiment, similarly to the embodiment described above. In this modification, the local learning data 3A may be used to estimate the state of a product RA in an image of the image data obtained by the camera SA. Therefore, the product image data 31 constituting the local learning data 3A may be obtained by shooting, with a camera, products RA that include or do not include a defect such as a stain, a smudge, and a flaw, under various conditions, for example. With this, the local learning data 3A may be generated.

In step S102, the control unit 21 operates as the learning processing unit 212, and acquires data generated by the generation model 41. In this modification, the generation model 41 is configured to generate image data of images that may be shot of a product. The control unit 11 of the model generation apparatus 1 extracts noise from a predetermined probability distribution, and executes computation processing of the generation model 41 by inputting the extracted noise to the generation model 41. With this, the control unit 11 acquires image data as the output from the generation model. The control unit 21 acquires the image data generated by the generation model 41, in this way.

In step S103, the control unit 21 operates as the learning processing unit 212, and constructs a trained identification model 40A that has acquired the capability of identifying whether or not the given image data is product image data 31 that is included in the local learning data 3A, by performing machine learning using the local learning data 3A. In this modification, the control unit 21 trains the identification model 40A to identify whether given image data originates from the local learning data 3A or from the generation model 41 using the local learning data 3A and image data generated by the generation model 41. In step S104, the control unit 21 operates as the saving processing unit 213, and generates information indicating the structure and computation parameters of the trained identification model 40A that is constructed by the machine learning in step S103, as the learning result data 221A. Also, the control unit 21 saves the generated learning result data 221A in a predetermined storage area.

<Inspection Processing>

Figure 18B:
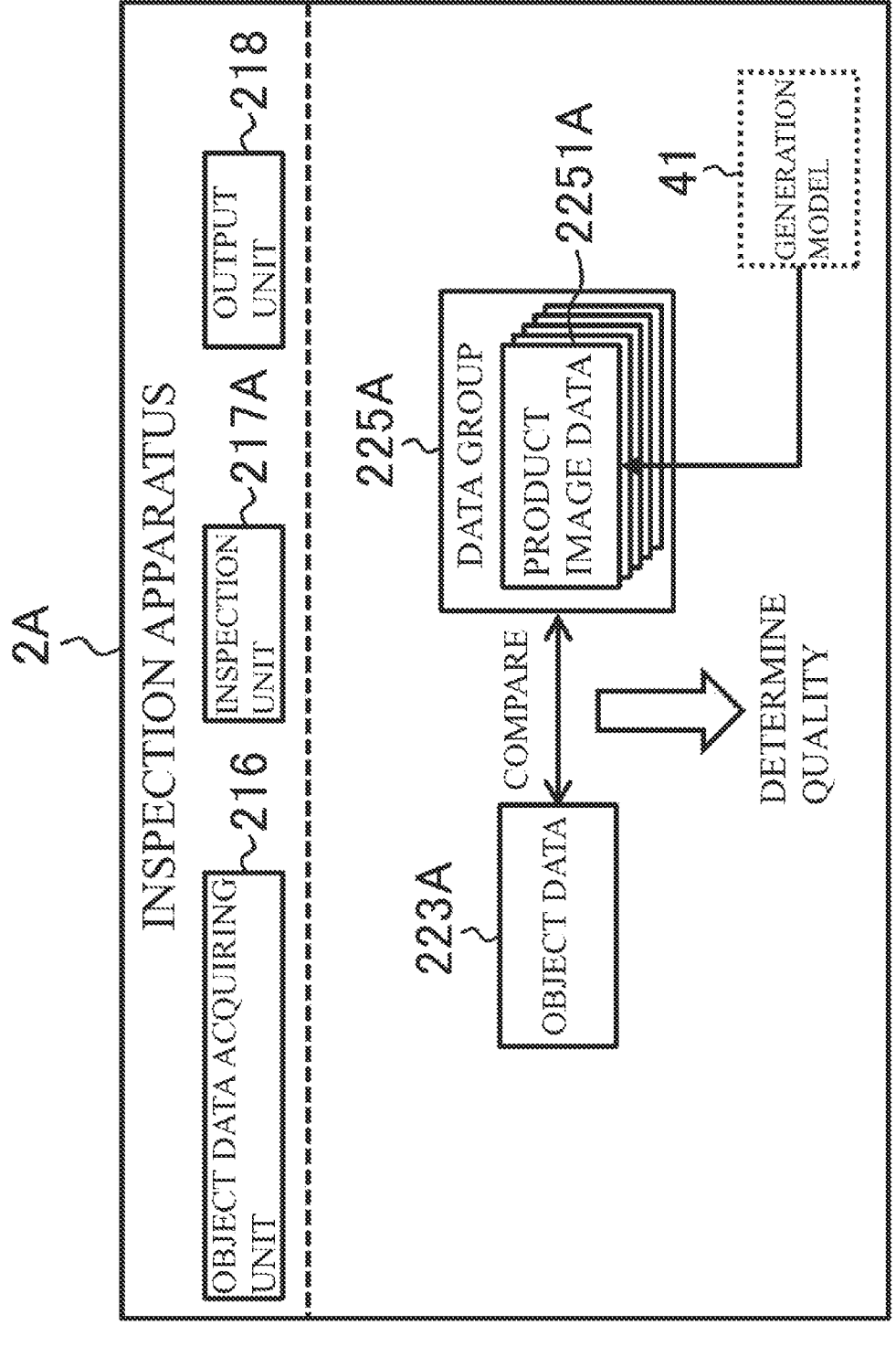
FIG. 18B is a schematic diagram illustrating an example of a software configuration for inspection processing of an inspection apparatus according to another mode.

FIG. 18B schematically illustrates an example of the software configuration for inspection processing of the inspection apparatuses 2A according to this modification. Similarly to the embodiment described above, the software configuration for the inspection processing of the inspection apparatuses 2A is realized by the control unit 21 executing the inspection program 83A. As shown in FIG. 18B, the software configuration for the inspection processing of the inspection apparatuses 2A is similar to the software configuration for the inference processing of the learning apparatuses 2 described above, except for the fact that the data to be handled is changed from sensing data to image data. With this, each inspection apparatus 2A executes a series of processing regarding the inspection processing, similarly to the learning apparatuses 2 described above.

That is, in step S301, the control unit 21 of each inspection apparatus 2A operates as the object data acquiring unit 216, and acquires object image data 223A of images of the product RA on which visual inspection is performed from the camera SA.

In step S302, the control unit 21 operates as an inspection unit 217A, and acquires a data group 225A collected as inference learning data for determining the state of a product RA. In this modification, the data group 225A is constituted by a plurality of pieces of product image data 2251A. Each piece of product image data 2251A may be image data of an image of the product including or not including a defect. The data group 225A may be constituted by one of an image data group of images of the product including a defect and an image data group of images of the product not including a defect, or may also be constituted by both such image data groups. Also, similarly to the embodiment described above, each piece of product image data 2251A included in the data group 225A may be product image data 31 included in the local learning data 3A, image data generated by the generation model 41 in this modification, or the like. The control unit 21 may also acquire data generated using the trained generation model 41 as the product image data 2251A. The generation of data by the trained generation model 41 may be executed by the inspection apparatuses 2A, or may also be executed by another computer. With this, the control unit 21 may also acquire the data group 225A including data generated using the trained generation model 41.

Next, the control unit 21 determines the state (quality) of the product RA in an image of the object image data 223A based on a comparison between the data group 225A and the object image data 223A. The control unit 21 can estimate the state of the product RA in an image of the object image data 223A, that is, can determine whether or not the product RA includes a defect, by comparing the product image data 2251A constituting the data group 225A with the object image data 223A, with a method similar to that of the embodiment described above.

Note that, when the number of pieces of product image data 2251A included in the data group 225A is not sufficient, the control unit 21 may designate the product image data 2251A as local learning data 3A as appropriate, and request the model generation apparatus 1 to construct a generation model 41 with respect to this designated local learning data 3A. Also, the control unit 21 may generate new image data of images that may include the product RA using the trained generation model 41 that has been constructed in this way, and may add the generated new image data to the data group 225A as the product image data 2251A. With this, the control unit 21 may increase the number of pieces of product image data 2251A included in the data group 225A.

In step S303, the control unit 21 operates as the output unit 218, and outputs information regarding the result of estimating the state of the product RA. The output destination and output information may be determined as appropriate depending on the embodiment, similarly to the embodiment described above. For example, the control unit 21 may output the result of determining the state of a product RA to the output apparatus 25 as is. Also, the control unit 21 may output, if the product RA includes a defect, a warning for notifying this fact to the output apparatus 25. Also, when the inspection apparatuses 2A are connected to a conveyor apparatus (not illustrated) for conveying the products RA, the conveyor apparatus may be controlled such that products RA including no defect and products RA including a defect are conveyed on different lines based on the result of determining the states of the products RA, for example.

<Model Generation>

In this modification, the model generation apparatus 1 executes processing in steps S201 to S205 described above using the identification models 40A constructed as described above, similarly to the embodiment described above.

That is, in step S201, the control unit 11 of the model generation apparatus 1 generates image data using the generation model 41. In step S202, the control unit 11 transmits the generated image data to the identification models 40A, and causes the identification models 40A to perform an identification with respect to the generated image data. In step S203, the control unit 11 receives the result of the identification performed by the identification models 40A with respect to the transmitted image data. In this modification, the control unit 11 causes the identification models 40A to execute identification with respect to image data by transmitting the image data to the inspection apparatuses 2A. Also, the control unit 11 acquires the result of the identification by the identification model 40A from the inspection apparatuses 2A.

In step S204, the control unit 11 trains the generation model 41 to generate image data that causes the identification performance of at least one of the plurality of identification models 40A to be degraded, by performing machine learning using the received results of identification. In step S205, the control unit 11 generates information indicating the structure and computation parameters of the trained generation model 41 that is constructed by the machine learning in step S204, as the learning result data 121. Also, the control unit 11 saves the generated learning result data 121 in a predetermined storage area.

According to this modification, in a scenario for inspecting the states of products RA to be produced in a production line, a generation model 41 that can be used for the inspection and can generate a wide variety of image data can be constructed. As a result of using this generation model 41, the number of pieces of product image data 2251A that constitute the data group 225A to be used for inspection can be increased. In this modification, product image data that is difficult to collect by an individual inspection apparatus 2A but may be obtained by another inspection apparatus 2A can be generated by this generation model 41. Accordingly, not only the number of pieces of product image data 2251A included in the data group 225A is increased, but also the variation of the product image data 2251A can be increased. That is, assume that a defect that has not yet been experienced at a certain site has occurred at another site. In this case, if the local learning data 3A obtained at the other site is reflected in the machine learning of the generation model 41, image data of images of products RA including the defect can be generated by this generation model 41. Therefore, as a result of adding this image data to the data group 225A, the variation of the product image data 2251A can be increased. Therefore, according to this modification, the accuracy of inspection in step S302 can be improved. For example, it is possible to detect a defect that has not yet been experienced at the site.

(B) Scenario of Monitoring Cultivation Condition

Figure 19:
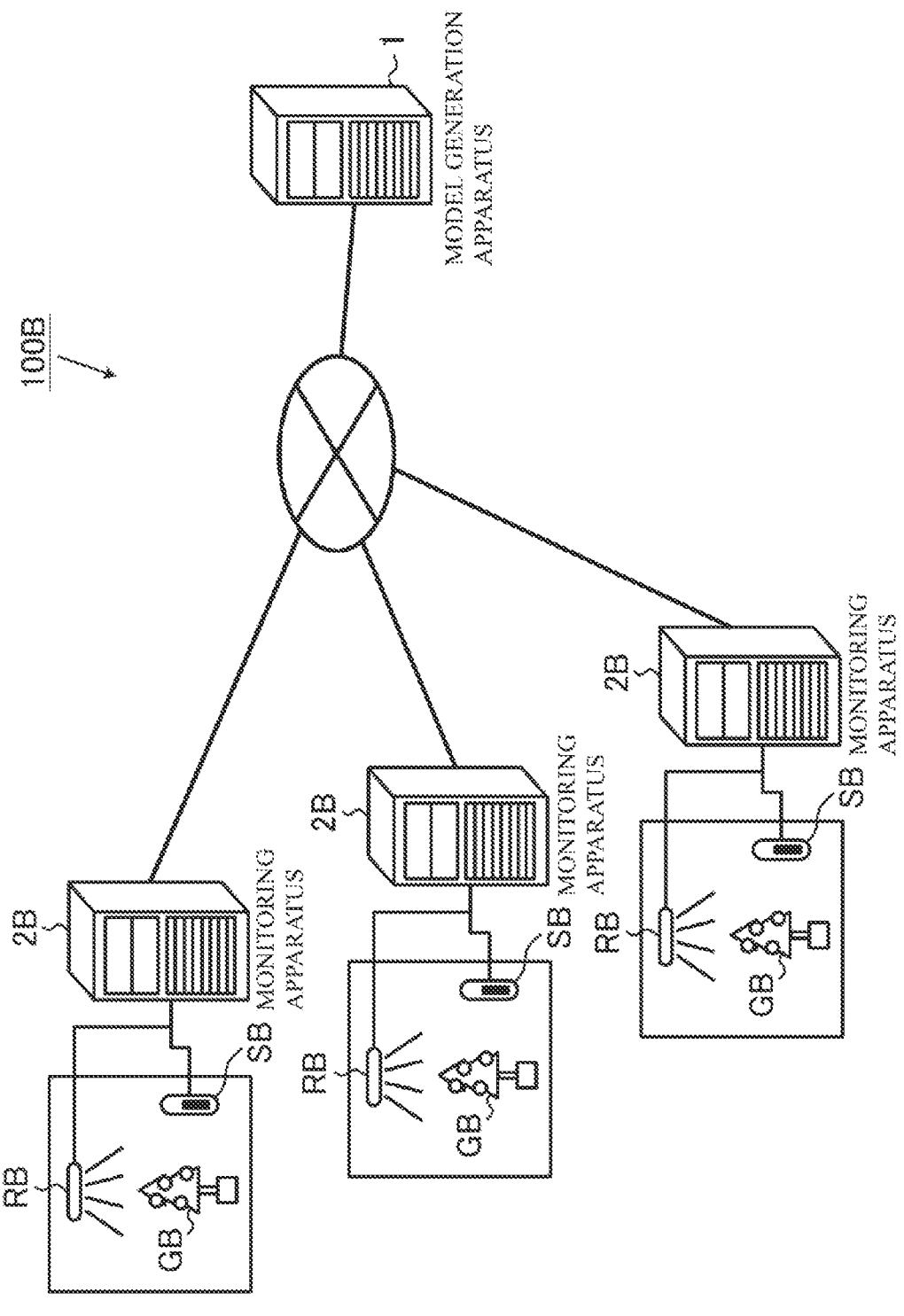
FIG. 19 is a schematic diagram illustrating an example of another scenario to which one or more embodiments from the present invention disclosure is applied.

FIG. 19 schematically illustrates an example of an application scenario of a monitoring system 100B according to a second modification. This modification shows an example in which the model generation apparatus 1 according to the embodiment is applied to a scenario in which data is generated that can be used for estimating the cultivation conditions of a plant GB. As shown in FIG. 19, a monitoring system 100B according to this modification includes the model generation apparatus 1 and a plurality of monitoring apparatuses 2B. Similarly to the embodiment described above, the model generation apparatus 1 and the monitoring apparatuses 2B may be connected to each other via a network.

The monitoring apparatuses 2B correspond to the learning apparatuses 2 described above. The monitoring apparatuses 2B may be configured similarly to the above-described learning apparatuses 2, except that the data that they handle is different. In this modification, the monitoring apparatuses 2B are each connected to a sensor SB, and are each configured to monitor the cultivation conditions of the plant GB. Also, in this modification, the monitoring apparatuses 2B are each connected to a cultivation apparatus RB, and are each configured to control the operation of the cultivation apparatus RB according to the cultivation conditions of the plant GB.

The cultivation apparatus RB is configured to cultivate the plant GB by controlling the growth environment of the plant GB. The type of the cultivation apparatus RB is not limited in particular, as long as it is able to control the growth environment of the plant GB, and may be selected as appropriate depending on the embodiment. The growth environment relates to the conditions of growing the plant GB, and includes the time for irradiating the plant GB with light, the temperature around the plant GB, the amount of water to the plant GB, and the like. The cultivation apparatus RB may be a curtain apparatus, an illumination apparatus, air conditioning equipment, a water sprinkling apparatus, or the like. The curtain apparatus is configured to open and close a curtain attached to a window of a building. The illumination apparatus is LED (light emitting diode) illumination, a fluorescent light, or the like. The air conditioning equipment is an air conditioner or the like. The water sprinkling apparatus is a sprinkler or the like. The curtain apparatus and the illumination apparatus are used to control the time for irradiating the plant GB with light. The air conditioning equipment is used for controlling the temperature around the plant GB. The water sprinkling apparatus is used to control the amount of water supplied to the plant GB.

Each monitoring apparatus 2B acquires sensing data from its sensor SB as the condition data regarding the cultivation conditions of the plant GB, by the sensor SB sensing the cultivation conditions of the plant GB. The cultivation conditions relate to any element for cultivating the plant GB, and may be specified by the growth environment until the time of cultivation, the growth state, or the like. The growth state may be specified by the growth degree of the plant GB or the like. The type of the sensor SB is not limited in particular, as long as it is able to sense the cultivation conditions of the plant GB, and may be selected as appropriate depending on the embodiment. The sensor SB may be a photometer, a thermometer, a hygrometer, a camera, or the like. The camera may be an ordinary camera, a depth camera, an infrared camera, or the like. The monitoring apparatuses 2B estimate the cultivation conditions of the plant GB based on the obtained condition data, and control the operation of the cultivation apparatus RB so as to realize a growth environment that is suitable for the estimated cultivation condition. Note that the configuration of the monitoring apparatuses 2B is not limited to this example. It is also possible that the monitoring apparatuses 2B are not connected to the cultivation apparatus RB, and are not configured to control the operation of the cultivation apparatus RB.

<Hardware Configuration of Monitoring Apparatus>

Figure 20:
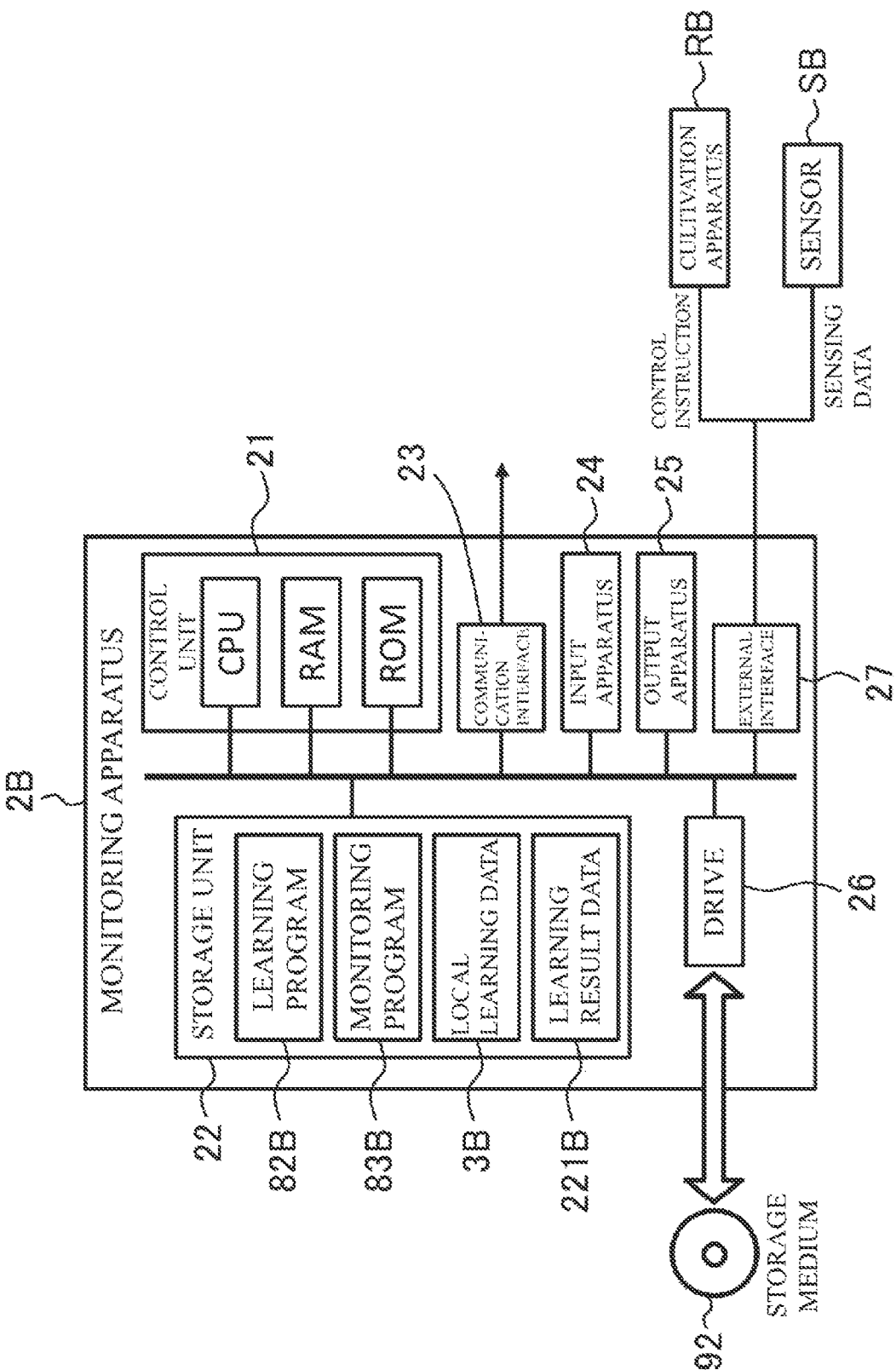
FIG. 20 is a schematic diagram illustrating an example of a hardware configuration of a monitoring apparatus according to another mode.

FIG. 20 schematically illustrates an example of the hardware configuration of the monitoring apparatuses 2B according to this modification. As shown in FIG. 20, each monitoring apparatus 2B according to this modification is a computer in which a control unit 21, a storage unit 22, a communication interface 23, an input apparatus 24, an output apparatus 25, a drive 26, and an external interface 27 are electrically connected, similarly to the above-described learning apparatus 2. Each monitoring apparatus 2B is connected to the cultivation apparatus RB and the sensor SB via the external interface 27. Note that the hardware configuration of the monitoring apparatuses 2B is not limited to this example. As far as the specific hardware configuration of the monitoring apparatuses 2B is concerned, constituent elements can be omitted, replaced, or added as appropriate depending on the embodiment. The monitoring apparatuses 2B may not only be general-purpose server apparatuses, general-purpose PCs, PLCs, or the like, but also information processing apparatuses that are specifically designed for the service to be provided.

The storage unit 22 of the monitoring apparatuses 2B according to this modification stores various types of information such as a learning program 82B, a monitoring program 83B, local learning data 3B, and learning result data 221B. The learning program 82B, the monitoring program 83B, the local learning data 3B, and the learning result data 221B respectively correspond to the learning program 82, the inference program 83, the local learning data 3, and the learning result data 221 according to the embodiment described above. At least one of the learning program 82B, the monitoring program 83B, and the local learning data 3B may also be stored in a storage medium 92. Also, the monitoring apparatuses 2B may also acquire at least one of the learning program 82B, the monitoring program 83B, and the local learning data 3B from the storage medium 92.

<Learning Processing>

Figure 21A:
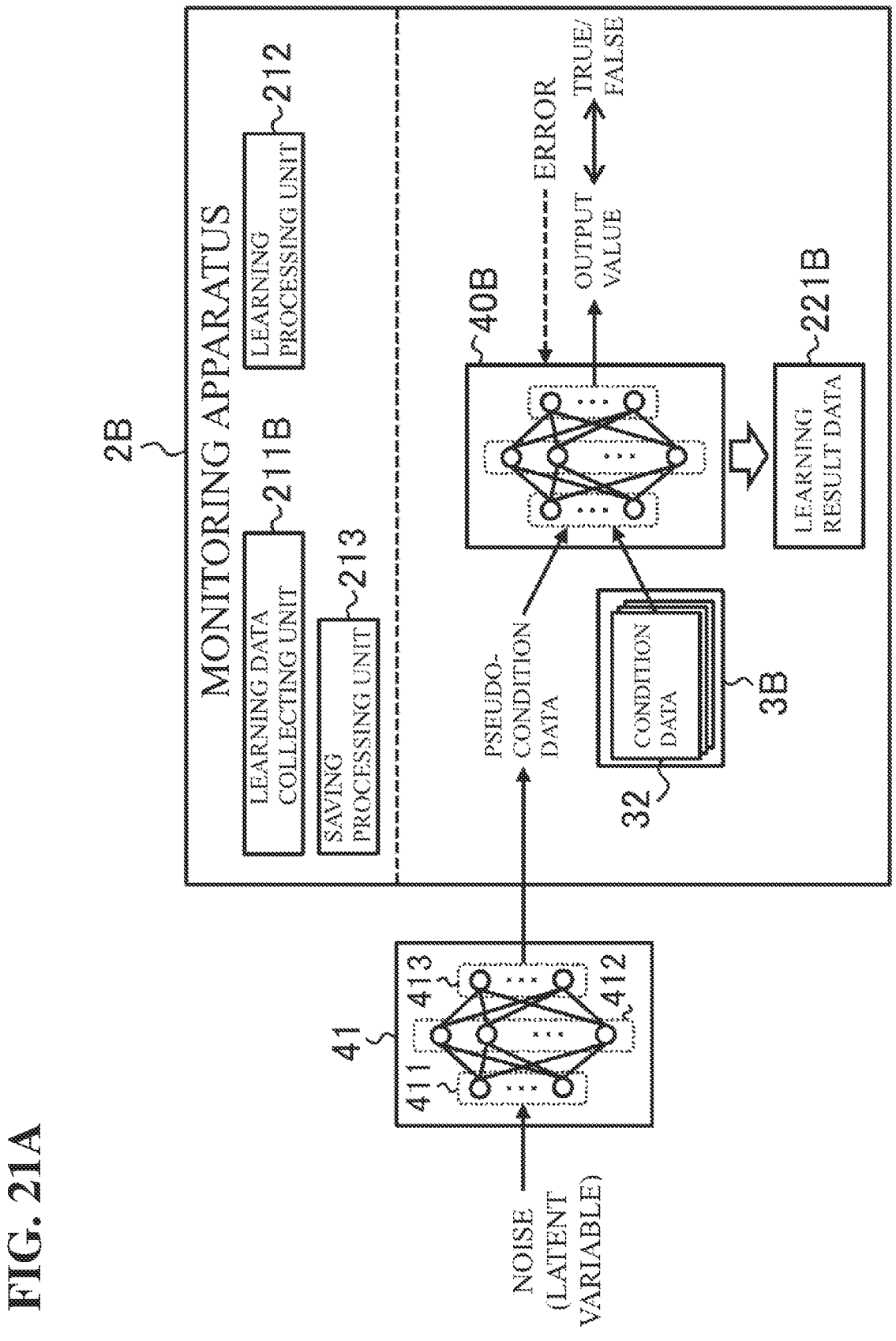
FIG. 21A is a schematic diagram illustrating an example of a software configuration for machine learning of a monitoring apparatus according to another mode.

FIG. 21A schematically illustrates an example of the software configuration for learning processing of the monitoring apparatuses 2B according to this modification. Similarly to the embodiment described above, the software configuration for the learning processing of the monitoring apparatuses 2B is realized by the control unit 21 executing the learning program 82B. As shown in FIG. 21A, the software configuration for the learning processing of the monitoring apparatuses 2B is similar to the software configuration for the learning processing of the learning apparatuses 2 described above, except for the fact that the data to be handled is changed from sensing data to condition data regarding the cultivation conditions of the plant GB. With this, each monitoring apparatus 2B executes a series of processing for machine learning, similarly to the learning apparatuses 2 described above.

That is, in step S101, the control unit 21 of each monitoring apparatus 2B operates as an inference learning data collecting unit 211B, and collects the local learning data 3B to be used for machine learning of an identification model 40B. In this modification, the identification model 40B is constituted by a neural network, similarly to the identification model 40 according to the embodiment described above. Also, the local learning data 3B is constituted by condition data 32 regarding the cultivation conditions of the plant GB. The condition data 32 corresponds to the data 2251.

The method of generating the local learning data 3B may be selected as appropriate depending on the embodiment, similarly to the embodiment described above. In this modification, the local learning data 3B may be used to estimate the cultivation conditions of the plant GB. Therefore, the condition data 32 constituting the local learning data 3B may be obtained by sensors sensing the cultivation conditions of the plant GB under various conditions. With this, the local learning data 3B may be generated.

In step S102, the control unit 21 operates as the learning processing unit 212, and acquires data generated by the generation model 41. In this modification, the generation model 41 is configured to generate pseudo-condition data regarding the cultivation conditions of the plant GB (hereinafter, also referred to as "pseudo-condition data"). The control unit 11 of the model generation apparatus 1 extracts noise from a predetermined probability distribution, and executes computation processing of the generation model 41 by inputting the extracted noise to the generation model 41. With this, the control unit 11 acquires pseudo-condition data as the output from the generation model. The control unit 21 acquires the pseudo-condition data generated by the generation model 41, in this way.

In step S103, the control unit 21 operates as the learning processing unit 212, and constructs a trained identification model 40B that has acquired the capability of identifying whether or not given data is condition data 32 included in the local learning data 3B by performing machine learning using the local learning data 3B. In this modification, the control unit 21 trains the identification model 40B to identify whether given data originates from the local learning data 3B or from the generation model 41 using the local learning data 3B and pseudo-condition data generated by the generation model 41. In step S104, the control unit 21 operates as the saving processing unit 213, and generates information indicating the structure and computation parameters of the trained identification model 40B that is constructed by the machine learning in step S103, as the learning result data 221B. Also, the control unit 21 saves the generated learning result data 221B in a predetermined storage area.

<Monitoring Processing>

FIG. 21B schematically illustrates an example of the software configuration for monitoring processing of the monitoring apparatuses 2B according to this modification. Similarly to the embodiment described above, the software configuration for the monitoring processing of the monitoring apparatuses 2B is realized by the control unit 21 executing the monitoring program 83B. As shown in FIG. 21B, the software configuration for the monitoring processing of each monitoring apparatus 2B is similar to the software configuration for the inference processing of the learning apparatuses 2 described above, except for the fact that the data to be handled is changed from sensing data to condition data. With this, each monitoring apparatus 2B executes a series of processing regarding the monitoring processing, similarly to the learning apparatuses 2 described above.

That is, in step S301, the control unit 21 of each monitoring apparatus 2B operates as the object data acquiring unit 216, and acquires object condition data 223B regarding the cultivation conditions of the plant GB whose cultivation conditions are to be monitored with the sensor SB.

In step S302, the control unit 21 operates as a monitoring unit 217B, and acquires a data group 225B collected as inference learning data for estimating the cultivation conditions. In this modification, the data group 225B is constituted by a plurality of pieces of condition data 2251B. Each piece of condition data 2251B may be data regarding specific cultivation conditions of the plant GB. Also, similarly to the embodiment described above, each piece of condition data 2251B included in the data group 225B may be condition data 32 included in the local learning data 3B, condition data generated by the generation model 41 in this modification, or the like. The control unit 21 may also acquire data generated using the trained generation model 41 as the condition data 2251B. The generation of data by the trained generation model 41 may be executed by the monitoring apparatuses 2B, or may also be executed by another computer. With this, the control unit 21 may also acquire the data group 225B including data generated using the trained generation model 41.

Next, the control unit 21 estimates the cultivation conditions of the plant GB from the object condition data 223B based on a comparison between the data group 225B and the object condition data 223B. The control unit 21 estimates the cultivation conditions of the plant GB from the object condition data 223B by comparing the condition data 2251B constituting the data group 225B with the object condition data 223B, with a method similar to that of the embodiment described above.

Note that, when the number of pieces of condition data 2251B included in the data group 225B is not sufficient, the control unit 21 may designate the condition data 2251B as local learning data 3B as appropriate, and request the model generation apparatus 1 to construct a generation model 41 with respect to this designated local learning data 3B. Also, the control unit 21 may generate new condition data that may be data regarding the cultivation conditions of the plant GB using the trained generation model 41 that has been constructed in this way, and may add the generated new condition data to the data group 225B as the condition data 2251B. With this, the control unit 21 may increase the number of pieces of condition data 2251B included in the data group 225B.

In step S303, the control unit 21 operates as the output unit 218, and outputs information regarding the result of estimating the cultivation conditions of the plant GB. The output destination and output information may be determined as appropriate depending on the embodiment, similarly to the embodiment described above. For example, the control unit 21 may output the result of estimating the cultivation conditions of the plant GB to the output apparatus 25 as is. Also, the control unit 21 may also determine the control instruction to be given to the cultivation apparatus RB according to the estimated cultivation conditions, for example. The correspondence relationship between the cultivation conditions and the control instruction may be given by reference information in a table format or the like. This reference information may be stored in the storage unit 22, a storage medium 92, an external storage apparatus, or the like, and the control unit 21 may determine the control instruction according to the estimated cultivation conditions by referring to this reference information. Also, the control unit 21 may also control the operation of the cultivation apparatus RB by giving the determined control instruction to the cultivation apparatus RB. Also, the control unit 21 may prompt a manager of the plant GB to control the operation of the cultivation apparatus RB by outputting information indicating the determined control instruction to the output apparatus 25, for example.

<Model Generation>

In this modification, the model generation apparatus 1 executes the processing in steps S201 to S205 described above using the identification models 40B constructed as described above, similarly to the embodiment described above.

That is, in step S201, the control unit 11 of the model generation apparatus 1 generates pseudo-condition data using the generation model 41. In step S202, the control unit 11 transmits the generated pseudo-condition data to the identification models 40B, and causes the identification models 40B to perform an identification with respect to the generated pseudo-condition data. In step S203, the control unit 11 receives the result of the identification performed by the identification models 40B with respect to the transmitted pseudo-condition data. In this modification, the control unit 11 causes the identification models 40B to execute identification with respect to pseudo-condition data by transmitting the pseudo-condition data to each monitoring apparatus 2B. Also, the control unit 11 acquires the result of the identification by the identification model 40B from each monitoring apparatus 2B.

In step S204, the control unit 11 trains the generation model 41 to generate condition data that causes the identification performance of at least one of the plurality of identification models 40B to be degraded, by performing machine learning using the received results of identification. In step S205, the control unit 11 generates information indicating the structure and computation parameters of the trained generation model 41 that is constructed by the machine learning in step S204, as the learning result data 121. Also, the control unit 11 saves the generated learning result data 121 in a predetermined storage area.

According to this modification, in a scenario in which the cultivation conditions of the plant GB are monitored, a generation model 41 that can be used for the monitoring and can generate various types of condition data can be constructed. As a result of using this generation model 41, the number of pieces of condition data 2251B that constitute the data group 225B to be used for monitoring can be increased. With this modification, condition data that is difficult to collect by individual monitoring apparatus 2B but may be obtained by other monitoring apparatuses 2B can be generated by this generation model 41. Accordingly, not only the number of pieces of condition data 2251B included in the data group 225B is increased, but also the variation of the condition data 2251B can be increased.

For example, assume that a monitoring apparatus 2B for monitoring the cultivation conditions of the plant GB in a warm climate area and another monitoring apparatus 2B for monitoring the cultivation conditions of the plant GB in a cold climate area are present. In this scenario, it is envisioned that the monitoring apparatus 2B in the warm climate area has hardly ever experienced a cultivation condition that is likely to occur in the cold climate area. Therefore, it is difficult to obtain condition data regarding such experience by separate monitoring apparatuses 2B, and therefore if cultivation conditions that are likely to occur in the cold climate area are given in the warm climate area due to abnormal weather, it is possible that the monitoring apparatus 2B cannot appropriately estimate the cultivation conditions. In contrast, according to this modification, if another monitoring apparatus 2B has experienced such cultivation conditions, and the local learning data 3B obtained by this experience is reflected in the machine learning of the generation model 41, the condition data regarding such cultivation conditions can be generated by this generation model 41. Accordingly, as a result of adding this condition data to the data group 225B, the variation of the condition data 2251B can be increased. Therefore, according to this modification, the accuracy of estimating the cultivation conditions in step S302 can be increased. For example, cultivation conditions that have not yet been experienced at the site can be estimated. Accordingly, when the operation of the cultivation apparatus RB is controlled according to the estimated cultivation condition, the accuracy of controlling the operation of the cultivation apparatus RB such that it is appropriate for the cultivation conditions can be improved.

(C) Scenario of Driver Monitoring

Figure 22:
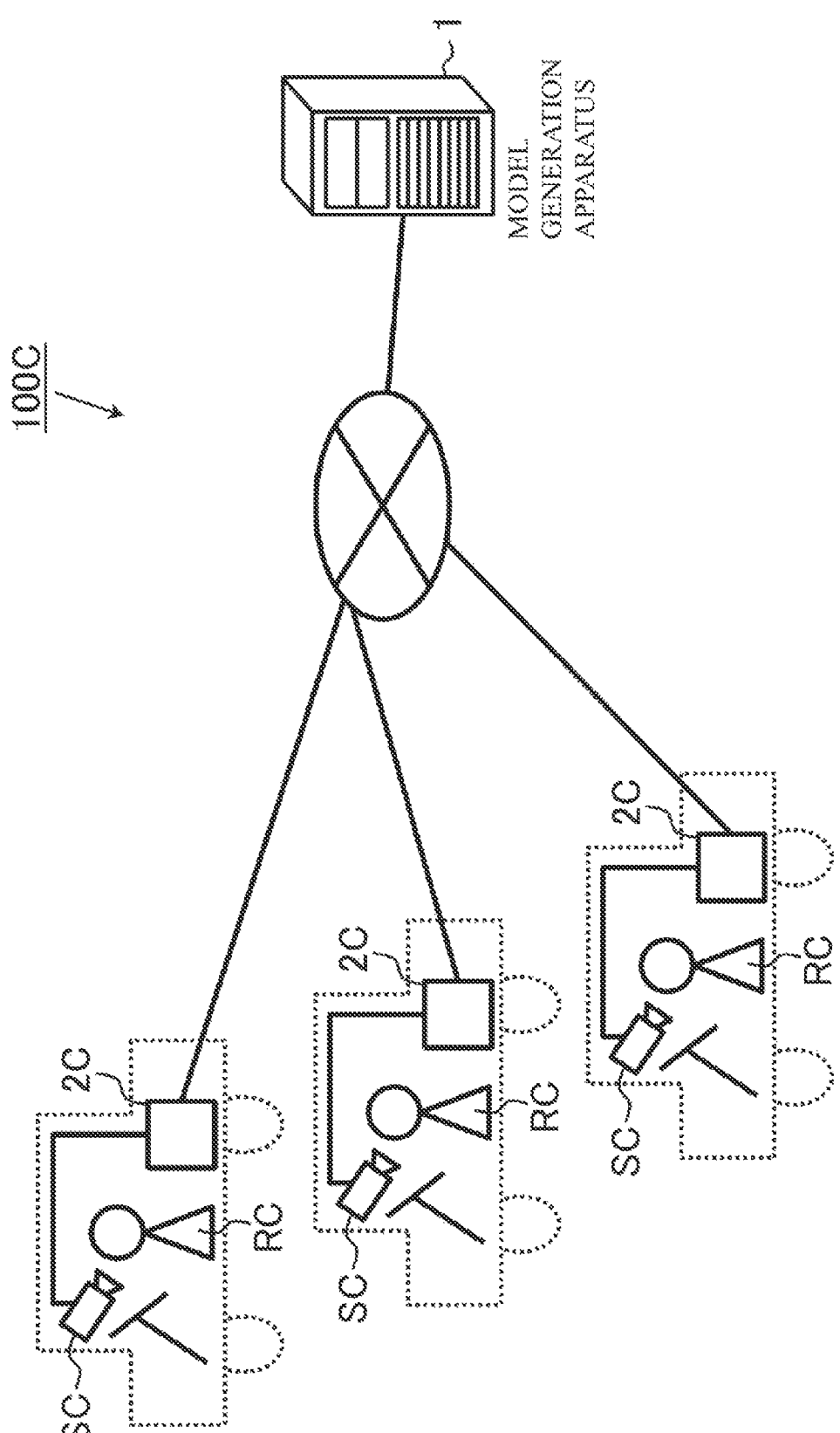
FIG. 22 is a schematic diagram illustrating an example of another scenario to which one or more embodiments from the disclosure is applied.

FIG. 22 schematically illustrates an example of an application scenario of a monitoring system 100C according to a third modification. This modification is an example in which the model generation apparatus 1 according to the embodiment described above is applied to a scenario in which data is generated that can be used to estimate the state of a driver RC that drives a vehicle. As shown in FIG. 22, the monitoring system 100C according to this modification includes the model generation apparatus 1 and a plurality of monitoring apparatuses 2C. Similarly to the embodiment described above, the model generation apparatus 1 and the monitoring apparatuses 2C may be connected to each other via a network.

The monitoring apparatuses 2C correspond to the learning apparatuses 2 described above. The monitoring apparatuses 2C may be configured similarly to the above-described learning apparatuses 2, except that the data that they handle is different. Each monitoring apparatus 2C estimates the state of a driver RC based on the data obtained by observing the driver RC. The data to be used for this estimation is not limited in particular, as long as the data relates to the state of the driver RC, and may be selected as appropriate depending on the embodiment. The data to be used for this estimation may be vital data of the driver RC, image data of images that may include the driver RC, or the like. In this modification, the monitoring apparatuses 2C are each connected to a camera SC that is arranged so as to be able to shoot (take images of) the driver RC. The camera SC may be an ordinary camera, a depth camera, an infrared camera, or the like. Each monitoring apparatus 2C estimates the state of the driver RC based on image data obtained from the camera SC. The state of the driver RC to be estimated may be determined as appropriate depending on the embodiment. The state of the driver RC to be estimated may be determined as appropriate depending on the embodiment, and may include a sleepiness degree that indicates the degree of sleepiness of the driver RC, a fatigue degree indicating the degree of fatigue, or a margin of capability indicating the margin of capability of the driver RC regarding driving, or a combination of these, for example.

<Hardware Configuration of Monitoring Apparatus>

Figure 23:
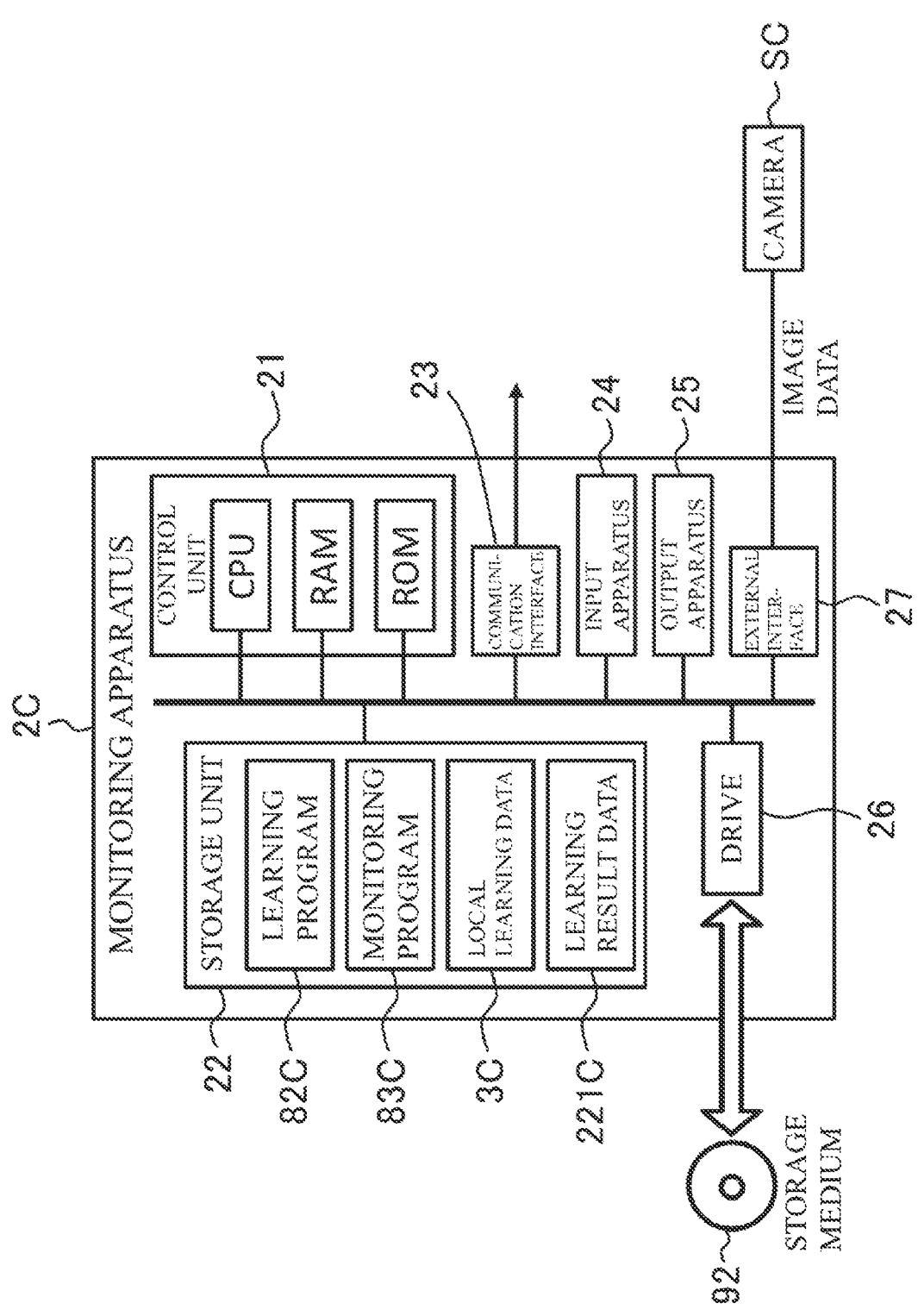
FIG. 23 is a schematic diagram illustrating an example of a hardware configuration of a monitoring apparatus according to another mode.

FIG. 23 schematically illustrates an example of the hardware configuration of the monitoring apparatuses 2C according to this modification. As shown in FIG. 23, each monitoring apparatus 2C according to this modification is a computer in which a control unit 21, a storage unit 22, a communication interface 23, an input apparatus 24, an output apparatus 25, a drive 26, and an external interface 27 are electrically connected, similarly to the above-described learning apparatus 2. The monitoring apparatuses 2C are each connected to the camera SC via the external interface 27. Note that the hardware configuration of the monitoring apparatuses 2C is not limited to this example. As far as the specific hardware configuration of the monitoring apparatuses 2C is concerned, constituent elements can be omitted, replaced, or added as appropriate depending on the embodiment. Each monitoring apparatus 2C may not only be a general-purpose computer, a mobile phone including a smartphone, in-vehicle apparatus, or the like, but also an information processing apparatus that is specifically designed for the service to be provided.

The storage unit 22 of the monitoring apparatuses 2C according to this modification stores various types of information such as a learning program 82C, a monitoring program 83C, local learning data 3C, and learning result data 221C. The learning program 82C, the monitoring program 83C, the local learning data 3C, and the learning result data 221C respectively correspond to the learning program 82, the inference program 83, the local learning data 3, and the learning result data 221 according to the embodiment described above. At least one of the learning program 82C, the monitoring program 83C, and the local learning data 3C may also be stored in a storage medium 92. Also, the monitoring apparatuses 2C may also acquire at least one of the learning program 82C, the monitoring program 83C, and the local learning data 3C from the storage medium 92.

<Learning Processing>

Figure 24A:
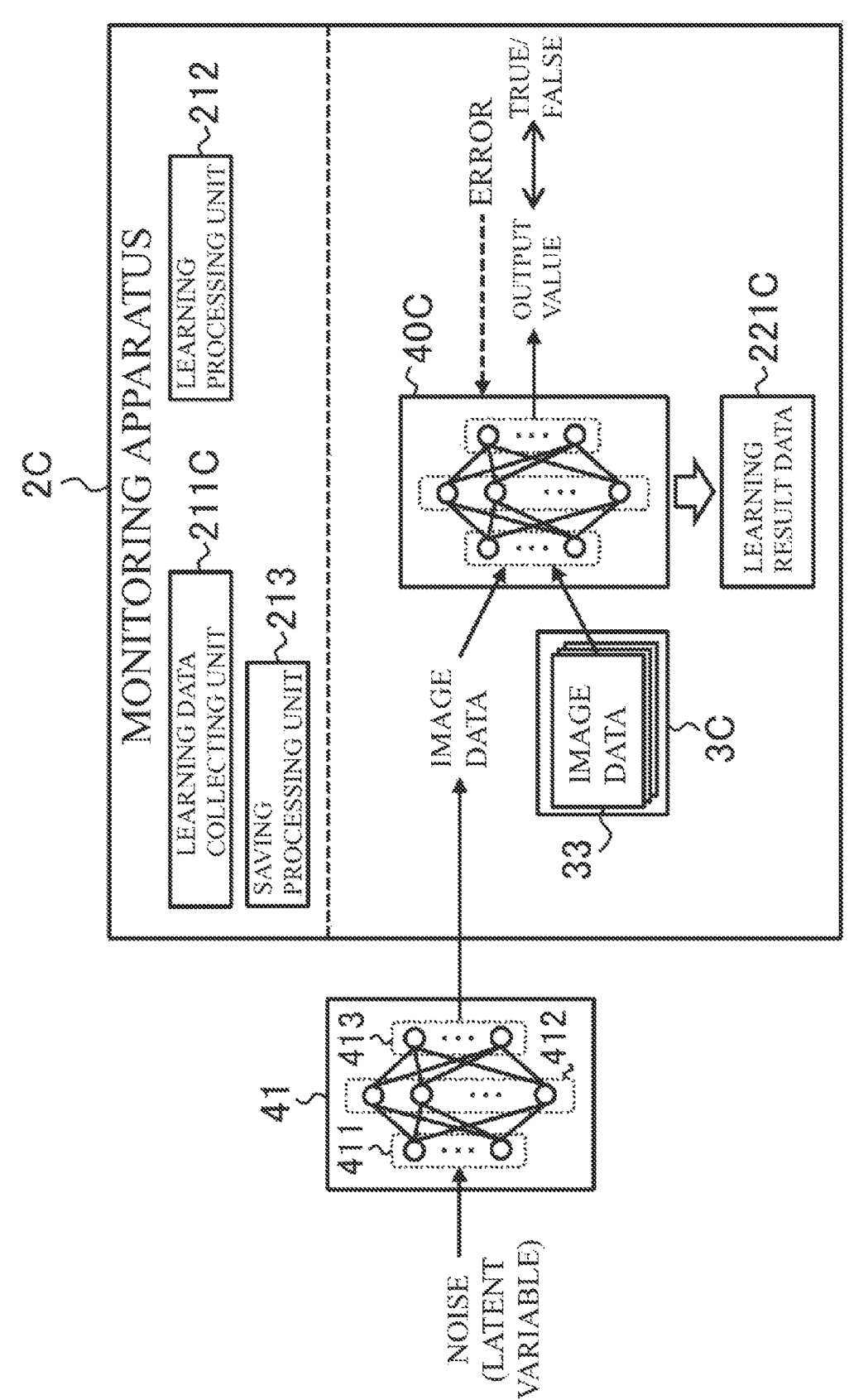
FIG. 24A is a schematic diagram illustrating an example of a software configuration for machine learning of a monitoring apparatus according to another mode.

FIG. 24A schematically illustrates an example of the software configuration for learning processing of the monitoring apparatuses 2C according to this modification. Similarly to the embodiment described above, the software configuration for the learning processing of the monitoring apparatuses 2C is realized by the control unit 21 executing the learning program 82C. As shown in FIG. 24A, the software configuration for the learning processing of the monitoring apparatuses 2C is similar to the software configuration for the learning processing of the learning apparatuses 2 described above, except for the fact that the data to be handled is changed from sensing data to image data of images that may include the driver RC. With this, each monitoring apparatus 2C executes a series of processing for machine learning, similarly to the learning apparatuses 2 described above.

That is, in step S101, the control unit 21 of each monitoring apparatus 2C operates as a learning data collecting unit 211C, and collects the local learning data 3C to be used for machine learning of an identification model 40C. In this modification, the identification model 40C is constituted by a neural network, similarly to the identification model 40 according to the embodiment described above. Also, the local learning data 3C is constituted by image data 33 of images of a driver. The image data 33 corresponds to the data 2251.

The method of generating the local learning data 3C may be selected as appropriate depending on the embodiment, similarly to the embodiment described above. In this modification, the local learning data 3C may be used to estimate the state of the driver RC. Therefore, the image data 33 constituting the local learning data 3C may also be obtained by shooting an examinee (driver) that drives a vehicle by a camera in various situations. With this, the local learning data 3C may be generated.

In step S102, the control unit 21 operates as the learning processing unit 212, and acquires data generated by the generation model 41. In this modification, the generation model 41 is configured to generate image data of images of a driver. The control unit 11 of the model generation apparatus 1 extracts noise from a predetermined probability distribution, and executes computation processing of the generation model 41 by inputting the extracted noise to the generation model 41. With this, the control unit 11 acquires image data as the output from the generation model. The control unit 21 acquires the image data generated by the generation model 41, in this way.

In step S103, the control unit 21 operates as the learning processing unit 212, and constructs a trained identification model 40C that has acquired the capability of identifying whether or not given data is image data 33 included in the local learning data 3C, by performing machine learning using the local learning data 3C. In this modification, the control unit 21 trains the identification model 40C to identify whether given image data originates from the local learning data 3C or from the generation model 41 using the local learning data 3C and image data generated by the generation model 41. In step S104, the control unit 21 operates as the saving processing unit 213, and generates information indicating the structure and computation parameters of the trained identification model 40C that is constructed by the machine learning in step S103, as the learning result data 221C. Also, the control unit 21 saves the generated learning result data 221C in a predetermined storage area.

<Monitoring Processing>

FIG. 24B schematically illustrates an example of the software configuration for monitoring processing of the monitoring apparatuses 2C according to this modification. Similarly to the embodiment described above, the software configuration for the monitoring processing of the monitoring apparatuses 2C is realized by the control unit 21 executing the monitoring program 83C. As shown in FIG. 24B, the software configuration for the monitoring processing of the monitoring apparatuses 2C is similar to the software configuration for the inference processing of the learning apparatuses 2 described above, except for the fact that the data to be handled is changed from sensing data to image data. With this, each monitoring apparatus 2C executes a series of processing regarding the monitoring processing, similarly to the learning apparatuses 2 described above.

That is, in step S301, the control unit 21 of each monitoring apparatus 2C operates as the object data acquiring unit 216, and acquires the object image data 223C of images that may include the driver RC from the camera SC.

In step S302, the control unit 21 operates as a monitoring unit 217C, and acquires a data group 225C collected as inference learning data for estimating the state of a driver. In this modification, the data group 225C is constituted by a plurality of pieces of image data 2251C. Each piece of image data 2251C may be data regarding a specific state of a driver. Also, similarly to the embodiment described above, each piece of image data 2251C included in the data group 225C may be image data 33 included in the local learning data 3C, image data generated by the generation model 41 in this modification, or the like. The control unit 21 may also acquire data generated using the trained generation model 41 as the image data 2251C. The generation of data by the trained generation model 41 may be executed by the monitoring apparatuses 2C, or may also be executed by another computer. With this, the control unit 21 may also acquire the data group 225C including data generated using the trained generation model 41.

Next, the control unit 21 estimates the state of a driver RC that is included in the image of the object image data 223C based on a comparison between the data group 225C and the object image data 223C. The control unit 21 estimates the state of the driver RC in the image of the object image data 223C by comparing the image data 2251C constituting the data group 225C with the object image data 223C, with a method similar to that of the embodiment described above.

Note that, when the number of pieces of image data 2251C included in the data group 225C is not sufficient, the control unit 21 may designate the image data 2251C as local learning data 3C as appropriate, and request the model generation apparatus 1 to construct a generation model 41 with respect to this designated local learning data 3C. Also, the control unit 21 may generate new image data of images that may include a driver using the trained generation model 41 that has been constructed in this way, and may add the generated new image data to the data group 225C as the image data 2251C. With this, the control unit 21 may also increase the number of pieces of image data 2251C included in the data group 225C.

In step 303, the control unit 21 operates as the output unit 218, and outputs information regarding the result of estimating the state of the driver RC. The output destination and output information may be determined as appropriate depending on the embodiment, similarly to the embodiment described above. For example, the control unit 21 may output the result of estimating the state of the driver RC to the output apparatus 25 as is.

Also, for example, the control unit 21 may also output a specific message such as a warning to the output apparatus 25, depending on the state of the driver RC. For example, when at least one of the sleepiness degree and the fatigue degree is estimated as the state of the driver RC, the control unit 21 may determine whether or not at least one of the sleepiness degree and the fatigue degree exceeds a threshold value. The threshold value may be set as appropriate. And if at least one of the sleepiness degree and the fatigue degree exceeds the threshold value, the control unit 21 may output a warning prompting the driver RC to park in a parking area or the like and take a rest, to the output apparatus 25.

Also, when the vehicle is configured to perform autonomous driving, the control unit 21 may also control the operation of the autonomous driving of the vehicle based on the result of estimating the state of the driver RC, for example. Assume that the vehicle is configured to be switchable between an autonomous driving mode in which the movement of the vehicle is controlled by a system and manual driving mode in which the movement of the vehicle is controlled by steering performed by the driver RC, for example.

In this case, when the control unit 21 has received an instruction to switch from the autonomous driving mode to the manual driving mode from the driver RC or the system while the vehicle is driving in the autonomous driving mode, the control unit 21 may determine whether or not the estimated margin of capability of the driver RC exceeds a threshold value. Then, if the margin of capability of the driver RC exceeds the threshold value, the control unit 21 may permit switching from the autonomous driving mode to the manual driving mode. On the other hand, if the margin of capability of the driver RC is the threshold value or less, the control unit 21 may not permit switching from the autonomous driving mode to the manual driving mode, and keep moving in the autonomous driving mode.

Also, when the vehicle is driving in the manual driving mode, the control unit 21 may also determine whether or not at least one of the sleepiness degree and the fatigue degree exceeds a threshold value. Then, if at least one of the sleepiness degree and the fatigue degree exceeds the threshold value, the control unit 21 may also transmit an instruction for instructing to switch from the manual driving mode to the autonomous driving mode and stop at a safe location such as a parking area to the system of the vehicle. On the other hand, if not, the control unit 21 may also keep driving the vehicle in the manual driving mode.

Also, when the vehicle is driving in the manual driving mode, the control unit 21 may also determine whether or not the margin of capability is a threshold value or less. Then, if the margin of capability is the threshold value or less, the control unit 21 may also transmit an instruction for deceleration to the system of the vehicle. On the other hand, if not, the control unit 21 may also keep driving the vehicle by the operation of the driver RC.

<Model Generation>

In this modification, the model generation apparatus 1 executes processing in steps S201 to S205 described above using the identification models 40C constructed as described above, similarly to the embodiment described above.

That is, in step S201, the control unit 11 of the model generation apparatus 1 generates image data using the generation model 41. In step S202, the control unit 11 transmits the generated image data to the identification models 40C, and causes the identification model 40C to perform an identification with respect to the generated image data. In step S203, the control unit 11 receives the result of the identification performed by the identification models 40C with respect to the transmitted image data. In this modification, the control unit 11 causes the identification models 40C to execute identification with respect to image data by transmitting the image data to each monitoring apparatus 2C. Also, the control unit 11 acquires the result of the identification by the identification models 40C from each monitoring apparatus 2C.

In step S204, the control unit 11 trains the generation model 41 to generate image data that causes the identification performance of at least one of the plurality of identification models 40C to be degraded, by performing machine learning using the received results of identification. In step S205, the control unit 11 generates information indicating the structure and computation parameters of the trained generation model 41 that is constructed by the machine learning in step S204, as the learning result data 121. Also, the control unit 11 saves the generated learning result data 121 in a predetermined storage area.

According to this modification, in a scenario in which the state of a driver RC is monitored, a generation model 41 that can generate a wide variety of image data to be used for the monitoring can be constructed. As a result of using this generation model 41, the number of pieces of image data 2251C that constitute the data group 225C to be used for monitoring can be increased. In this modification, image data in which an attribute and driving environment of a specific driver RC appear and that is difficult to collect by each monitoring apparatus 2C separately, but may be obtained by another monitoring apparatus 2C can be generated by this generation model 41. Accordingly, not only the number of pieces of image data 2251C included in the data group 225C is increased, but also the variation of the image data 2251C can be increased. Therefore, according to this modification, the accuracy of estimating the state of the driver RC in step S303 can be improved.

(D) Scenario of Estimating Power Generation Amount

Figure 25:
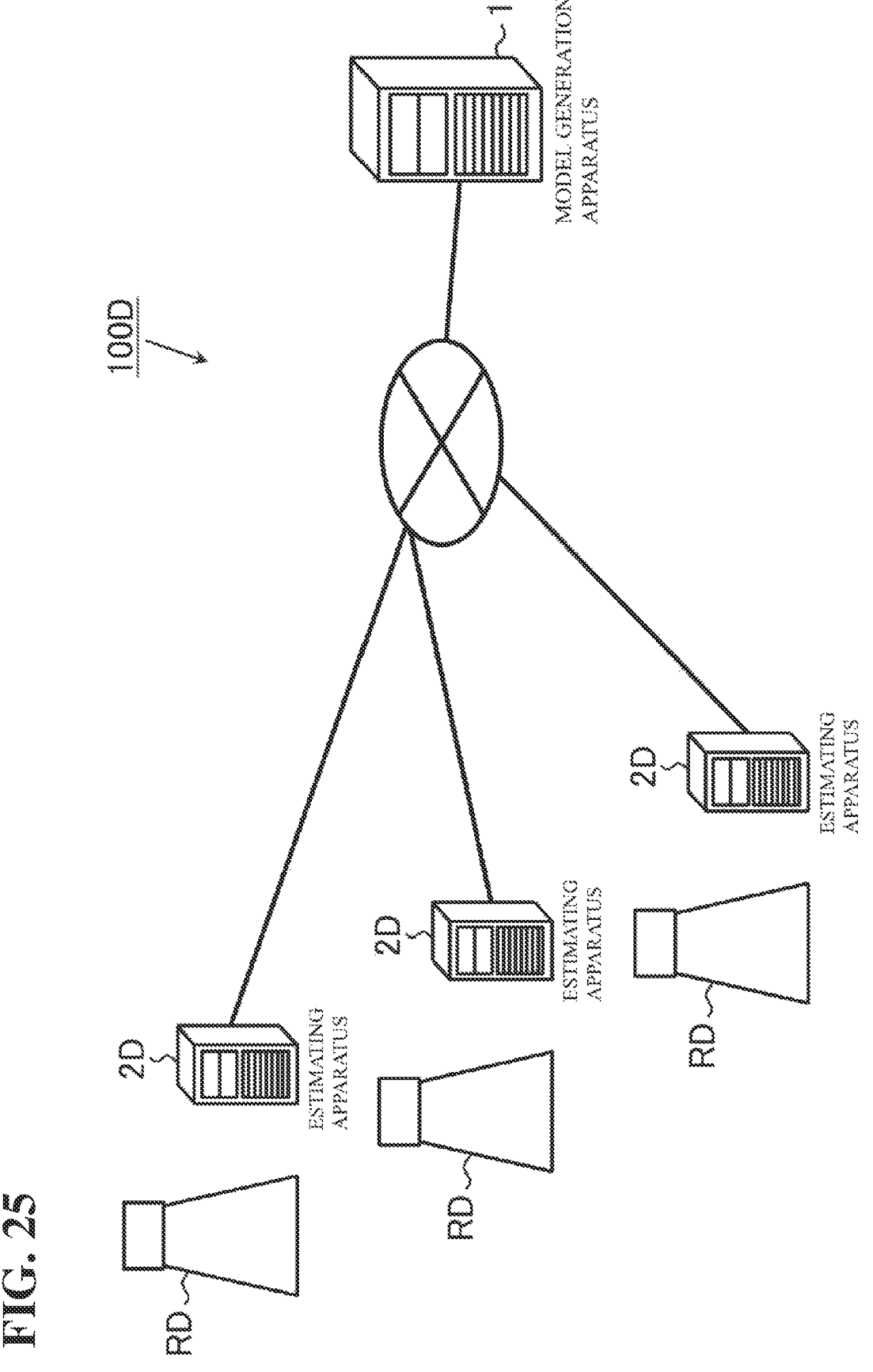
FIG. 25 is a schematic diagram illustrating an example of another scenario to which one or more embodiments from the disclosure is applied.

FIG. 25 schematically illustrates an example of an application scenario of an estimating system 100D according to a fourth modification. This modification is an example in which the model generation apparatus 1 according to the embodiment described above is applied to a scenario in which data is generated that can be used to estimate the power generation amount in a power generating facility RD. As shown in FIG. 25, the estimating system 100D according to this modification includes the model generation apparatus 1 and a plurality of estimating apparatuses 2D. Similarly to the embodiment described above, the model generation apparatus 1 and the estimating apparatuses 2D may be connected to each other via a network.

The estimating apparatuses 2D correspond to the learning apparatuses 2 described above. The estimating apparatuses 2D may be configured similarly to the above-described learning apparatuses 2, except that the data that they handle is different. Each estimating apparatus 2D estimates a power generation amount in a power generating facility RD based on data regarding power generation of the power generating facility RD. The type of the power generating facility RD is not limited in particular, and may be a solar power generating facility, for example. The data that is used to estimate the power generation amount is not limited in particular, as long as that data relates to the power generation in the power generating facility RD, and may be selected as appropriate depending on the embodiment. In this modification, the power generating facility RD is a solar power generating facility, and each estimating apparatus 2D estimates the power generation amount of the corresponding power generating facility RD based on weather data.

<Hardware Configuration of Estimating Apparatus>

Figure 26:
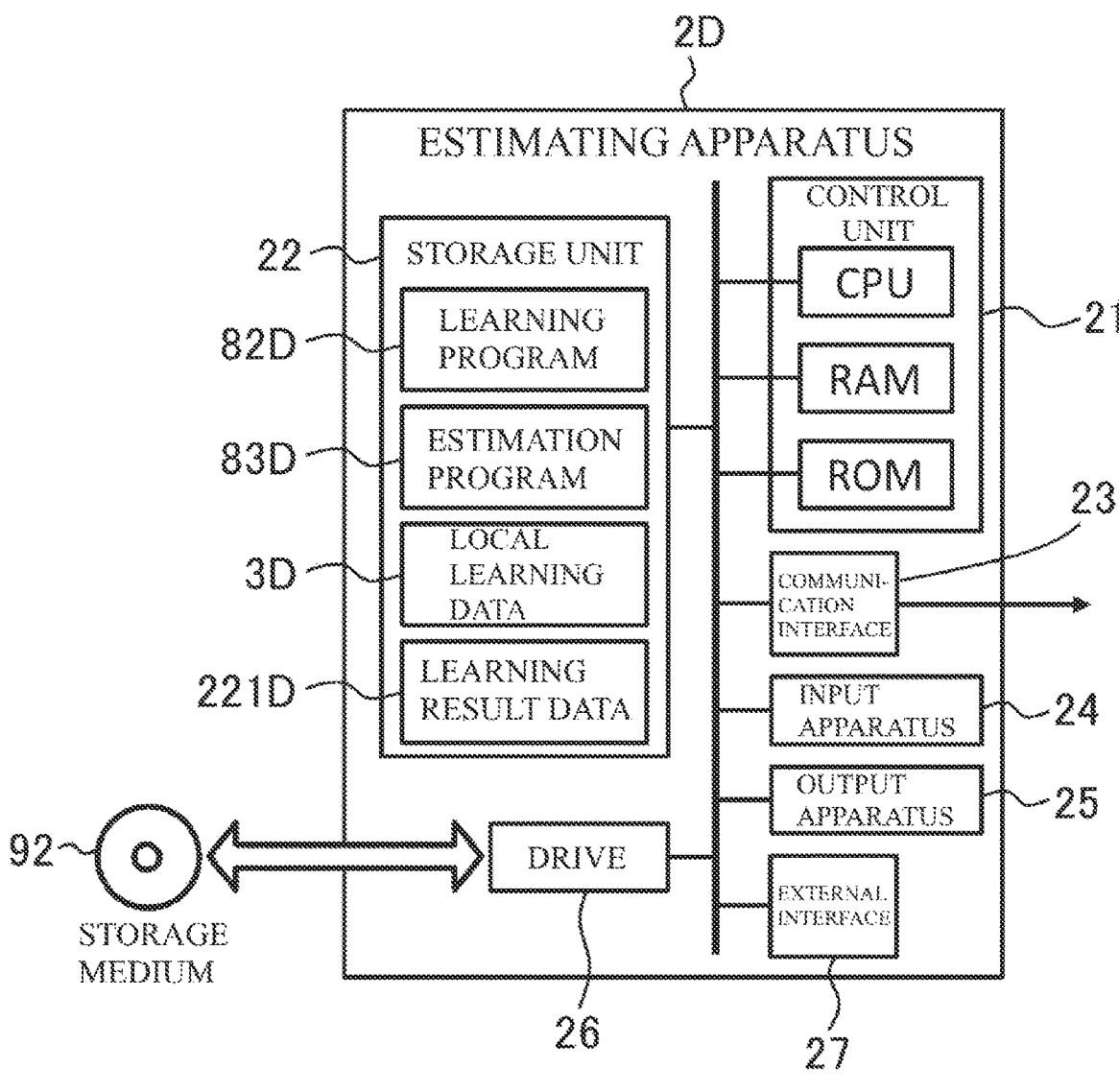
FIG. 26 is a schematic diagram illustrating an example of a hardware configuration of an estimating apparatus according to another mode.

FIG. 26 schematically illustrates an example of the hardware configuration of the estimating apparatuses 2D according to this modification. As shown in FIG. 26, each estimating apparatus 2D according to this modification is a computer in which a control unit 21, a storage unit 22, a communication interface 23, an input apparatus 24, an output apparatus 25, a drive 26, and an external interface 27 are electrically connected, similarly to the above-described learning apparatus 2. Note that the hardware configuration of the estimating apparatuses 2D is not limited to this example. As far as the specific hardware configuration of the estimating apparatuses 2D is concerned, constituent elements can be omitted, replaced, or added as appropriate depending on the embodiment. The estimating apparatuses 2D may not only be general-purpose server apparatuses, general-purpose PCs, or the like, but also information processing apparatuses that are specifically designed for the service to be provided.

The storage unit 22 of the estimating apparatuses 2D according to this modification stores various types of information such as a learning program 82D, an estimation program 83D, local learning data 3D, and learning result data 221D. The learning program 82D, the estimation program 83D, the local learning data 3D, and the learning result data 221D respectively correspond to the learning program 82, the inference program 83, the local learning data 3, and the learning result data 221 according to the embodiment described above. At least one of the learning program 82D, the estimation program 83D, and the local learning data 3D may also be stored in a storage medium 92. Also, the estimating apparatuses 2D may also acquire at least one of the learning program 82D, the estimation program 83D, and the local learning data 3D from the storage medium 92.

<Learning Processing>

Figure 27A:
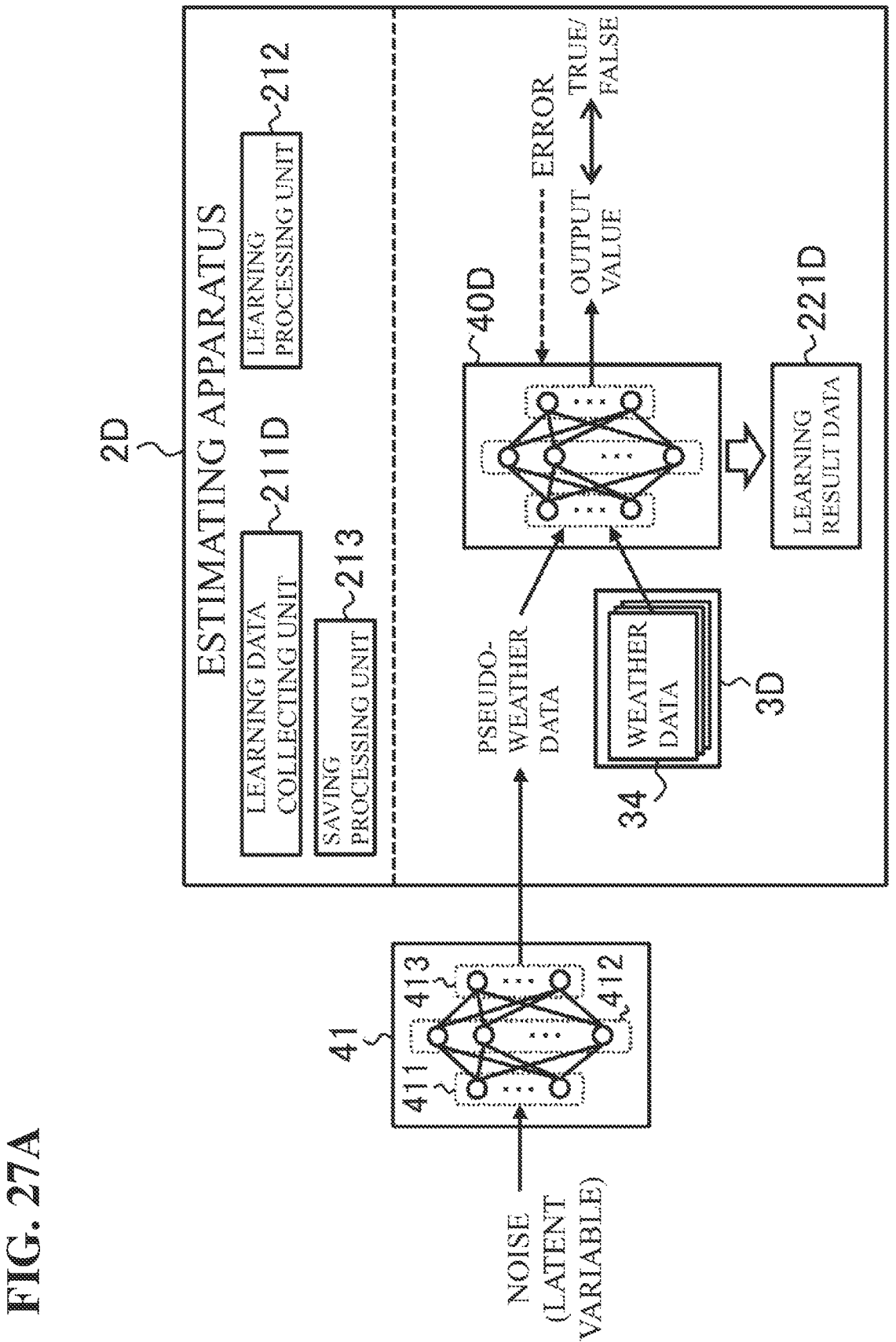
FIG. 27A is a schematic diagram illustrating an example of a software configuration for machine learning of an estimating apparatus according to another mode.

FIG. 27A schematically illustrates an example of the software configuration for learning processing of the estimating apparatuses 2D according to this modification. Similarly to the embodiment described above, the software configuration for the learning processing of the estimating apparatuses 2D is realized by the control unit 21 executing the learning program 82D. As shown in FIG. 27A, the software configuration for the learning processing of the estimating apparatuses 2D is similar to the software configuration for the learning processing of the learning apparatuses 2 described above, except for the fact that the data to be handled is changed from sensing data to weather data. With this, each estimating apparatus 2D executes a series of processing for machine learning, similarly to the learning apparatuses 2 described above.

That is, in step S101, the control unit 21 of each estimating apparatus 2D operates as a learning data collecting unit 211D, and collects the local learning data 3D to be used for machine learning of an identification model 40D. In this modification, the identification model 40D is constituted by a neural network, similarly to the identification model 40 according to the embodiment described above. Also, the local learning data 3D is constituted by weather data 34. The weather data 34 corresponds to the data 2251. The weather data 34 may include data indicating weather, temperature, a precipitation amount, humidity, an air volume, or the like.

The method of generating the local learning data 3D may be selected as appropriate depending on the embodiment, similarly to the embodiment described above. In this modification, the local learning data 3D may be used to estimate the power generation amount. Therefore, the weather data 34 constituting the local learning data 3D may be obtained in various weather conditions along with the power generation amount of the power generating facility RD. The power generation amount may be given by a sensor of the power generating facility RD, an input made by an operator, or the like. With this, the local learning data 3D may be generated.

In step S102, the control unit 21 operates as the learning processing unit 212, and acquires data generated by the generation model 41. In this modification, the generation model 41 is configured to generate pseudo weather data (hereinafter, may also be described as "pseudo-weather data". The control unit 11 of the model generation apparatus 1 extracts noise from a predetermined probability distribution, and executes computation processing of the generation model 41 by inputting the extracted noise to the generation model 41. With this, the control unit 11 acquires pseudo-weather data as the output from the generation model. The control unit 21 acquires the pseudo-weather data generated by the generation model 41, in this way.

In step S103, the control unit 21 operates as the learning processing unit 212, and constructs a trained identification model 40D that has acquired the capability of identifying whether or not the given weather data is the weather data 34 included in the local learning data 3D, by performing machine learning using the local learning data 3D. In this modification, the control unit 21 trains the identification model 40D to identify whether given weather data originates from the local learning data 3D or from the generation model 41 using the local learning data 3D and pseudo-weather data generated by the generation model 41. In step S104, the control unit 21 operates as the saving processing unit 213, and generates information indicating the structure and computation parameters of the trained identification model 40D that is constructed by the machine learning in step S103, as the learning result data 221D. Also, the control unit 21 saves the generated learning result data 221D in a predetermined storage area.

<Estimating Processing>

FIG. 27B schematically illustrates an example of the software configuration for estimating processing of the estimating apparatuses 2D according to this modification. Similarly to the embodiment described above, the software configuration for the estimating processing of each estimating apparatus 2D is realized by the control unit 21 executing the estimation program 83D. As shown in FIG. 27B, the software configuration for the estimating processing of the estimating apparatuses 2D is similar to the software configuration for the inference processing of the learning apparatuses 2 described above, except for the fact that the data to be handled is changed from sensing data to weather data. With this, each estimating apparatus 2D executes a series of processing regarding the estimating processing, similarly to the learning apparatuses 2 described above.

That is, in step S301, the control unit 21 of each estimating apparatus 2D operates as the object data acquiring unit 216, and acquires the object weather data 223D regarding the weather condition in the power generating facility RD regarding which the power generation amount is to be estimated. The source of the object weather data 223D is not limited in particular, and may be selected as appropriate depending on the embodiment. For example, the control unit 21 may also acquire the object weather data 223D from a known weather data server. Also, when each estimating apparatus 2D is connected to a sensor for observing the weather condition in the vicinity of the power generating facility RD, the control unit 21 may also acquire the object weather data 223D from the sensor.

In step S302, the control unit 21 operates as an estimating unit 217D, and acquires a data group 225D collected as inference learning data for estimating the power generation amount. In this modification, the data group 225D is constituted by a plurality of pieces of weather data 2251D. Each weather data 2251D may be acquired with respect to a specific power generation amount. Each piece of weather data 2251D included in the data group 225D may be the weather data 34 included in the local learning data 3D, weather data generated by the generation model 41 in this modification, or the like. The control unit 21 may also acquire data generated using the trained generation model 41 as the weather data 2251D. The generation of data by the trained generation model 41 may be executed by the estimating apparatuses 3D, or may also be executed by another computer. With this, the control unit 21 may acquire the data group 225D including data generated using the trained generation model 41.

Next, the control unit 21 estimates the power generation amount from the object weather data 223D based on a comparison between the data group 225D and the object weather data 223D. The control unit 21 estimates the power generation amount from the object weather data 223D by comparing the weather data 2251D constituting the data group 225D with the object weather data 223D, with a method similar to that of the embodiment described above.

Note that, when the number of pieces of weather data 2251D included in the data group 225D is not sufficient, the control unit 21 may designate the weather data 2251D as local learning data 3D as appropriate, and request the model generation apparatus 1 to construct a generation model 41 with respect to this designated local learning data 3D. Also, the control unit 21 may generate new weather data that may be data with respect to a specific power generation amount using the trained generation model 41 that has been constructed in this way, and may add the generated new weather data to the data group 225D as the weather data 2251D. With this, the control unit 21 may also increase the number of pieces of weather data 2251D included in the data group 225D.

In step 303, the control unit 21 operates as the output unit 218, and outputs information regarding the result of estimating the power generation amount of the power generating facility RD. The output destination and output information may be determined as appropriate depending on the embodiment, similarly to the embodiment described above. For example, the control unit 21 may also output the result of estimating the power generation amount of the power generating facility RD to the output apparatus 25 as is. Also, for example, the control unit 21 compares the power generation amount of the power generating facility RD with a threshold value, and if the power generation amount of the power generating facility RD is the threshold value or less, may output a message for prompting to perform power generation by another power generating facility to the output apparatus 25. The threshold value may be set as appropriate.

<Model Generation>

In this modification, the model generation apparatus 1 executes processing in steps S201 to S205 described above using the identification models 40D constructed as described above, similarly to the embodiment described above.

That is, in step S201, the control unit 11 of the model generation apparatus 1 generates pseudo-weather data using the generation model 41. In step S202, the control unit 11 transmits the generated pseudo-weather data to the identification models 40D, and causes the identification models 40D to perform an identification with respect to the generated pseudo-weather data. In step S203, the control unit 11 receives the result of the identification performed by the identification models 40D with respect to the transmitted pseudo-weather data. In this modification, the control unit 11 causes the identification models 40D to execute identification with respect to pseudo-weather data by transmitting the pseudo-weather data to each estimating apparatus 2D. Also, the control unit 11 acquires the result of the identification by the identification model 40D from each estimating apparatus 2D.

In step S204, the control unit 11 trains the generation model 41 to generate weather data that causes the identification performance of at least one of the plurality of identification models 40D to be degraded, by performing machine learning using the received results of identification. In step S205, the control unit 11 generates information indicating the structure and computation parameters of the trained generation model 41 that is constructed by the machine learning in step S204, as the learning result data 121. Also, the control unit 11 saves the generated learning result data 121 in a predetermined storage area.

According to this modification, in a scenario in which the power generation amount of the power generating facility RD is estimated, a generation model 41 that can generate various types of weather data to be used for the estimation can be constructed. As a result of using this generation model 41, the number of pieces of weather data 2251D that constitute the data group 225D to be used for estimating can be increased. In this modification, weather data that corresponds to the power generation amount of a power generating facility RD in a specific weather condition and that is difficult to collect by an individual estimating apparatus 2D, but may be obtained by another estimating apparatus 2D can be generated by this generation model 41. Accordingly, not only the number of pieces of weather data 2251D included in the data group 225D is increased, but also the variation of the weather data 2251D can be increased. Therefore, according to this modification, the accuracy of estimating the power generation amount in step S303 can be improved.

(E) Scenario of Diagnosing Health Status

Figure 28:
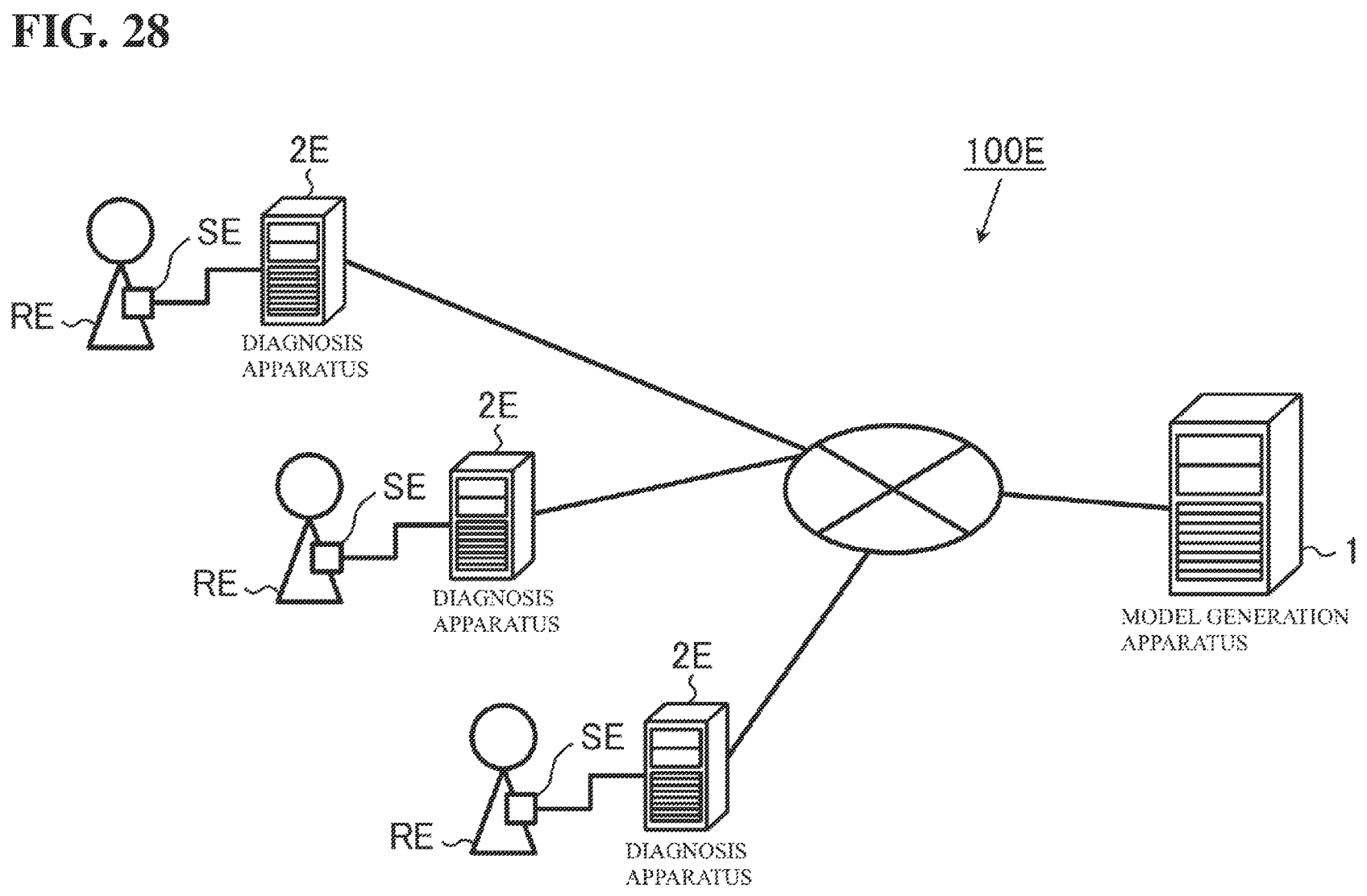

FIG. 28 schematically illustrates an example of an application scenario of a diagnosing system 100E according to a fifth modification. This modification is an example in which the model generation apparatus 1 according to the embodiment described above is applied to a scenario in which data is generated that can be used to estimate (diagnose) the health status of a subject RE. As shown in FIG. 28, the diagnosing system 100E according to this modification includes the model generation apparatus 1 and a plurality of diagnosis apparatuses 2E. Similarly to the embodiment described above, the model generation apparatus 1 and the diagnosis apparatuses 2E may be connected to each other via a network.

The diagnosis apparatuses 2E correspond to the learning apparatuses 2 described above. The diagnosis apparatuses 2E may be configured similarly to the above-described learning apparatuses 2, except that the data that they handle is different. Each diagnosis apparatus 2E diagnoses the health status of a subject RE based on data regarding the health status of the subject RE. The data that is used for diagnosis is not limited in particular, as long as the data relates to the health status of the subject RE, and may be selected as appropriate depending on the embodiment. The data to be used for diagnosis may be image data, vital data, or the like. The vital data is data regarding vital signs, and may be data indicating the result of measurement of body temperature, blood pressure, pulse, or the like. In this modification, the diagnosis apparatuses 2E are each connected to a vital sensor SE. Each diagnosis apparatus 2E diagnoses the health status of the subject RE based on the vital data obtained from the vital sensor SE. The health status to be estimated may be determined as appropriate depending on the embodiment, and may include an item indicating healthy or not, a sign of falling ill, and the like.

<Hardware Configuration of Diagnosis Apparatus>

Figure 29:
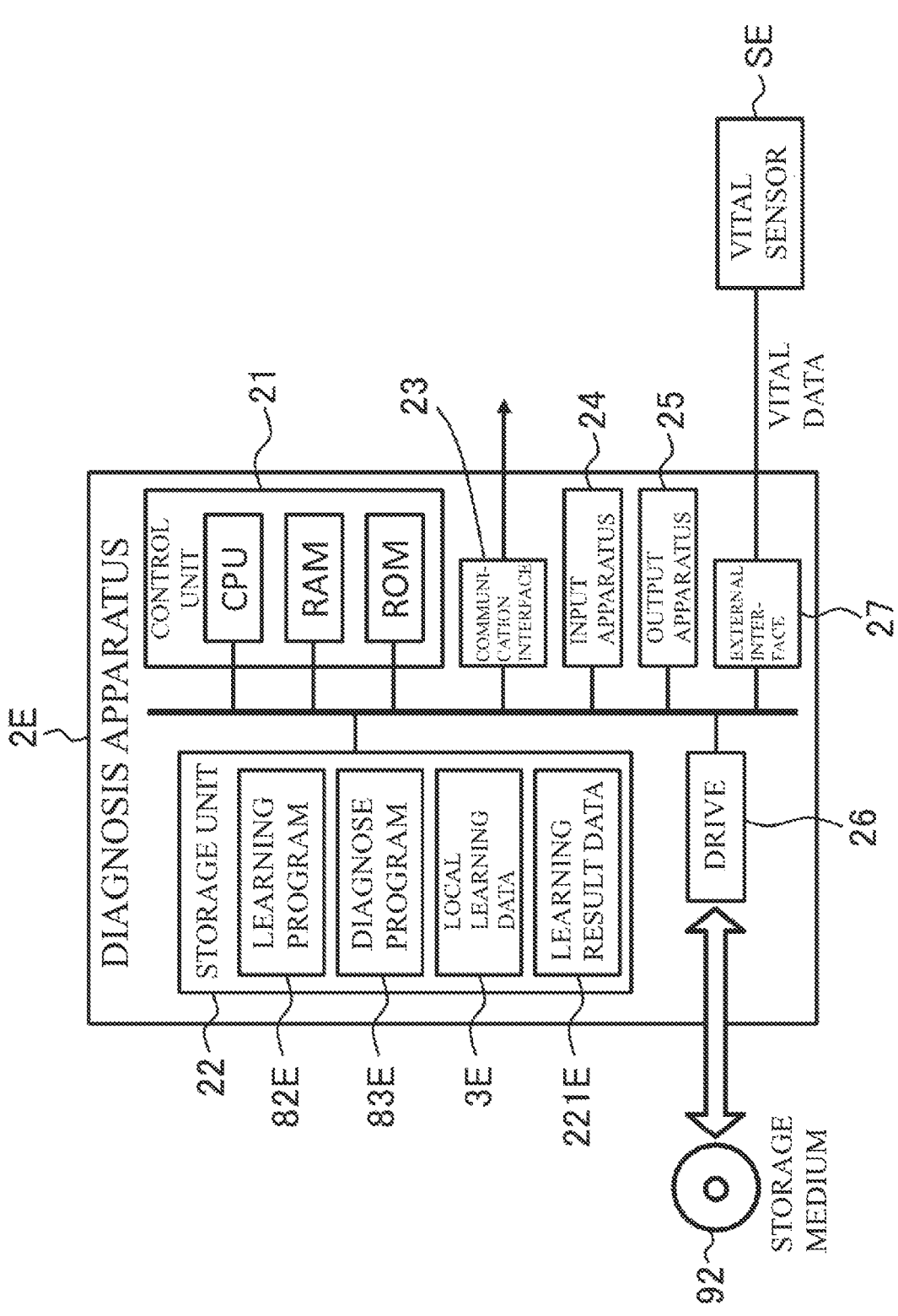
FIG. 29 is a schematic diagram illustrating an example of a hardware configuration of a diagnosis apparatus according to another mode.

FIG. 29 schematically illustrates an example of the hardware configuration of the diagnosis apparatuses 2E according to this modification. As shown in FIG. 29, each diagnosis apparatus 2E according to this modification is a computer in which a control unit 21, a storage unit 22, a communication interface 23, an input apparatus 24, an output apparatus 25, a drive 26, and an external interface 27 are electrically connected, similarly to the above-described learning apparatus 2. Each diagnosis apparatus 2E is connected to the vital sensor SE via the external interface 27. The vital sensor SE is a clinical thermometer, a blood pressure meter, a pulsimeter, or the like. Note that the hardware configuration of the diagnosis apparatuses 2E is not limited to this example. As far as the specific hardware configuration of the diagnosis apparatuses 2E is concerned, constituent elements can be omitted, replaced, or added as appropriate depending on the embodiment. The diagnosis apparatuses 2E may not only be general-purpose server apparatuses, general-purpose PCs, or the like, but also information processing apparatuses that are specifically designed for the service to be provided.

The storage unit 22 of the diagnosis apparatuses 2E according to this modification stores various types of information such as a learning program 82E, a diagnose program 83E, local learning data 3E, and learning result data 221E. The learning program 82E, the diagnose program 83E, the local learning data 3E, and the learning result data 221E, respectively correspond to the learning program 82, the inference program 83, the local learning data 3, and the learning result data 221 according to the embodiment described above. At least one of the learning program 82E, the diagnose program 83E, and the local learning data 3E may also be stored in a storage medium 92. Also, the diagnosis apparatuses 2E may also acquire at least one of the learning program 82E, the diagnose program 83E, and the local learning data 3E from the storage medium 92.

<Learning Processing>

Figure 30A:
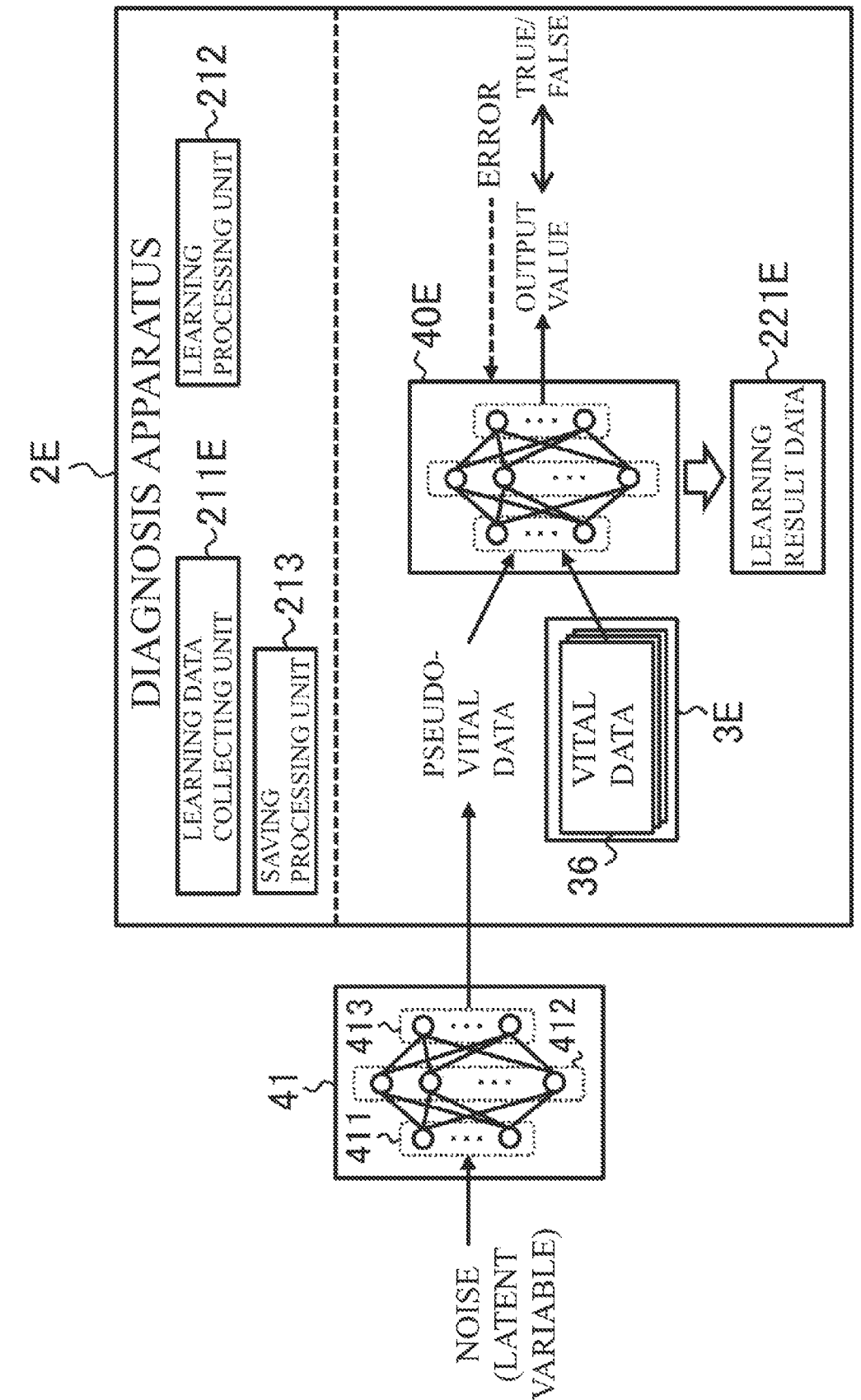
FIG. 30A is a schematic diagram illustrating an example of a software configuration for machine learning of a diagnosis apparatus according to another mode.

FIG. 30A schematically illustrates an example of the software configuration for learning processing of the diagnosis apparatuses 2E according to this modification. Similarly to the embodiment described above, the software configuration for the learning processing of the diagnosis apparatuses 2E is realized by the control unit 21 executing the learning program 82E. As shown in FIG. 30A, the software configuration for the learning processing of the diagnosis apparatuses 2E is similar to the software configuration for the learning processing of the learning apparatuses 2 described above, except for the fact that the data to be handled is changed from sensing data to vital data. With this, each diagnosis apparatus 2E executes a series of processing for machine learning, similarly to the learning apparatuses 2 described above.

That is, in step S101, the control unit 21 of each diagnosis apparatus 2E operates as a learning data collecting unit 211E, and collects the local learning data 3E to be used for machine learning of an identification model 40E. In this modification, the identification model 40E is constituted by a neural network, similarly to the identification model 40 according to the embodiment described above. Also, the local learning data 3E is constituted by vital data 36.

The method of generating the local learning data 3E may be selected as appropriate depending on the embodiment, similarly to the embodiment described above. In this modification, the local learning data 3E may be used to estimate the health status of a subject. Therefore, the vital data 36 constituting the local learning data 3E may be obtained by measuring the vital signs of an examinee in various health statuses by vital sensors. With this, the local learning data 3E may be generated.

In step S102, the control unit 21 operates as the learning processing unit 212, and acquires data generated by the generation model 41. In this modification, the generation model 41 is configured to generate pseudo vital data (hereinafter, may also be described as "pseudo-vital data"). The control unit 11 of the model generation apparatus 1 extracts noise from a predetermined probability distribution, and executes computation processing of the generation model 41 by inputting the extracted noise to the generation model 41. With this, the control unit 11 acquires pseudo-vital data as the output from the generation model. The control unit 21 acquires the pseudo-vital data generated by the generation model 41, in this way.

In step S103, the control unit 21 operates as the learning processing unit 212, and constructs a trained identification model 40E that has acquired the capability of identifying whether or not the given vital data is the vital data 36 included in the local learning data 3E, by performing machine learning using the local learning data 3E. In this modification, the control unit 21 trains the identification model 40E to identify whether the given vital data originates from the local learning data 3E or from the generation model 41 using the local learning data 3E and pseudo-vital data generated by the generation model 41. In step S104, the control unit 21 operates as the saving processing unit 213, and generates information indicating the structure and computation parameters of the trained identification model 40E that is constructed by the machine learning in step S103, as the learning result data 221E. Also, the control unit 21 saves the generated learning result data 221E in a predetermined storage area.

<Diagnosis Processing>

Figure 30B:
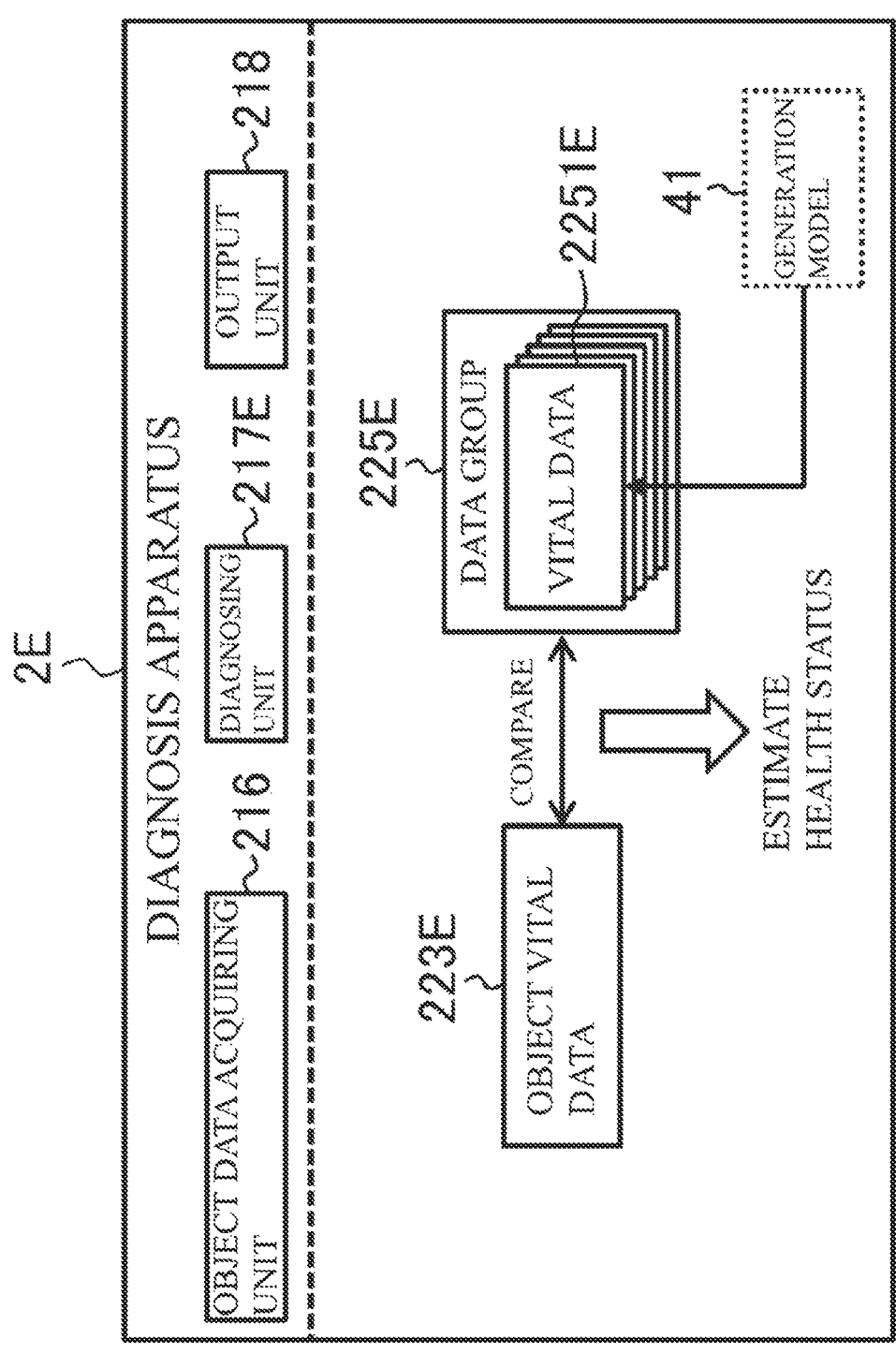
FIG. 30B is a schematic diagram illustrating an example of a software configuration for diagnosis processing of a diagnosis apparatus according to another mode.

FIG. 30B schematically illustrates an example of the software configuration for diagnosis processing of the diagnosis apparatuses 2E according to this modification. Similarly to the embodiment described above, the software configuration for the diagnosis processing of each diagnosis apparatus 2E is realized by the control unit 21 executing the diagnose program 83E. As shown in FIG. 30B, the software configuration for the diagnosis processing of the diagnosis apparatuses 2E is similar to the software configuration for the inference processing of the learning apparatuses 2 described above, except for the fact that the data to be handled is changed from sensing data to vital data. With this, each diagnosis apparatus 2E executes a series of processing regarding the diagnosis processing, similarly to the learning apparatuses 2 described above.

That is, in step S301, the control unit 21 of each diagnosis apparatus 2E operates as the object data acquiring unit 216, and acquires object vital data 223E indicating the result of measurement of vital data of the subject RE from the vital sensor SE.

In step S302, the control unit 21 operates as a diagnosing unit 217E, and acquires a data group 225E collected as inference learning data for diagnosing the health status of the subject RE. In this modification, the data group 225E is constituted by a plurality of pieces of vital data 2251E. Each vital data 2251E may be acquired with respect to a specific health status. Similarly to the embodiment described above, each piece of vital data 2251E included in the data group 225E may be the vital data 36 included in the local learning data 3E, vital data generated by the generation model 41 in this modification, or the like. The control unit 21 may also acquire data generated using the trained generation model 41 as the vital data 2251E. The generation of data by the trained generation model 41 may be executed by the diagnosis apparatuses 2E, or may also be executed by another computer. With this, the control unit 21 may acquire the data group 225E including data generated using the trained generation model 41.

Next, the control unit 21 diagnoses the health status of the subject RE based on a comparison between the data group 225E and the object vital data 223E. The control unit 21 diagnoses the health status of the subject RE by comparing the vital data 2251E constituting the data group 225E with the object vital data 223E, with a method similar to that of the embodiment described above.

Note that, when the number of pieces of vital data 2251E included in the data group 225E is not sufficient, the control unit 21 may designate the vital data 2251E as local learning data 3E as appropriate, and request the model generation apparatus 1 to construct a generation model 41 with respect to this designated local learning data 3E. Also, the control unit 21 may generate new vital data that may correspond to a specific health status using the trained generation model 41 that has been constructed in this way, and may add the generated new vital data to the data group 225E as the vital data 2251E. With this, the control unit 21 may also increase the number of pieces of vital data 2251E included in the data group 225E.

In step 303, the control unit 21 operates as the output unit 218, and outputs information regarding the result of diagnosing the health status of the subject RE. The output destination and output information may be determined as appropriate depending on the embodiment, similarly to the embodiment described above. For example, the control unit 21 may also output the result of diagnosing the health status of the subject RE to the output apparatus 25 as is. Also, when the diagnosed health status of the subject RE indicates a sign of a predetermined illness, the control unit 21 may also output a message prompting to receive examination at a hospital to the output apparatus 25.

<Model Generation>

In this modification, the model generation apparatus 1 executes processing in steps S201 to S205 described above using the identification models 40E constructed as described above, similarly to the embodiment described above.

That is, in step S201, the control unit 11 of the model generation apparatus 1 generates pseudo-vital data using the generation model 41. In step S202, the control unit 11 transmits the generated pseudo-vital data to the identification models 40E, and causes the identification models 40E to perform an identification with respect to the generated pseudo-vital data. In step S203, the control unit 11 receives the result of the identification performed by the identification models 40E with respect to the transmitted pseudo-vital data. In this modification, the control unit 11 causes the identification models 40E to execute identification with respect to pseudo-vital data by transmitting the pseudo-vital data to each diagnosis apparatus 2E. Also, the control unit 11 acquires the result of the identification by the identification model 40E from each diagnosis apparatus 2E.

In step S204, the control unit 11 trains the generation model 41 to generate pseudo-vital data that causes the identification performance of at least one of the plurality of identification models 40E to be degraded, by performing machine learning using the received results of identification. In step S205, the control unit 11 generates information indicating the structure and computation parameters of the trained generation model 41 that is constructed by the machine learning in step S204, as the learning result data 121. Also, the control unit 11 saves the generated learning result data 121 in a predetermined storage area.

According to this modification, in a scenario in which the health status of a subject RE is diagnosed, a generation model 41 that can generate various types of vital data to be used for the diagnosis can be constructed. As a result of using this generation model 41, the number of pieces of vital data 2251E that constitute the data group 225E to be used for diagnosis can be increased. In this modification, vital data that corresponds to the attribute and the health status of a specific subject and that is difficult to collect by an individual diagnosis apparatus 2E but may be obtained by another diagnosis apparatus 2E can be generated by this generation model 41. Accordingly, not only the number of pieces of vital data 2251E included in the data group 225E is increased, but also the variation of the vital data 2251E can be increased. Therefore, according to this modification, the accuracy of estimating the health status of the subject RE in step S303 can be improved.

<4.2>

In the embodiments described above, the data generated by the generation model 41 can be used as data that constitutes the data group 225 to be used for inferring a feature appearing in the object data 223 obtained by the sensor S. Also, each learning apparatus 2 infers the feature appearing in the object data 223 based on a comparison between the data group 225 and the object data 223 in the aforementioned step S302. However, the data to be generated by the generation model 41 and the method of inference processing are not limited to this example. For example, the data to be generated by the generation model 41 may be used for machine learning for causing an estimator to acquire the capability of performing a predetermined inference. Also, the learning apparatuses 2 may infer the feature appearing in the object data 223 using the trained estimator constructed by the machine learning.

Figure 31:
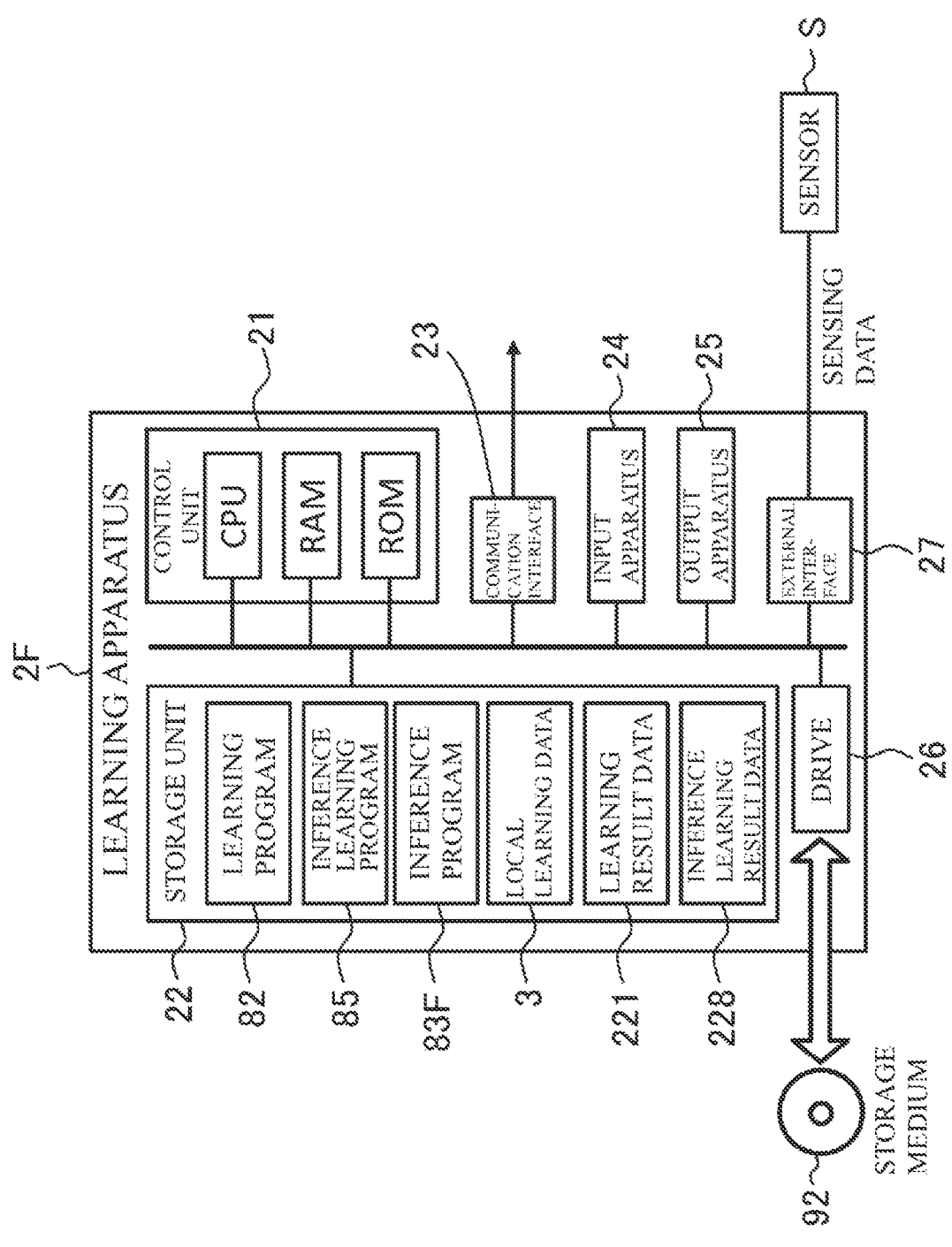
FIG. 31 is a schematic diagram illustrating an example of a hardware configuration of a learning apparatus according to a modification.

FIG. 31 schematically illustrates an example of the hardware configuration of a learning apparatus 2F according to this modification. The learning apparatus 2F according to this modification is configured similarly to the learning apparatuses 2 according to the embodiment except for the fact that machine learning for causing an estimator to acquire the capability of performing predetermined inference is further executed, and the predetermined inference is performed using the trained estimator constructed by the machine learning. Specifically, the learning apparatus 2F according to this modification is a computer in which a control unit 21, a storage unit 22, a communication interface 23, an input apparatus 24, an output apparatus 25, a drive 26, and an external interface 27 are electrically connected, similarly to the above-described learning apparatus 2. Note that the hardware configuration of the learning apparatus 2F is not limited to this example. As far as the specific hardware configuration of the learning apparatus 2F is concerned, constituent elements can be omitted, replaced, or added as appropriate depending on the embodiment. The learning apparatus 2F may not only be a general-purpose server apparatus, a general-purpose PC, or the like, but also an information processing apparatus that is specifically designed for the service to be provided.

The storage unit 22 of the learning apparatus 2F according to this modification further includes an inference learning program 85 and an inference learning result data 228 in addition to those in the embodiment described above. The inference learning program 85 is a program for the learning apparatus 2F to execute later-described information processing (FIG. 32B) regarding the machine learning of the estimator (later-described estimator 45). The inference learning program 85 includes a series of commands for this information processing. The inference learning program 85 may also be stored in a storage medium 92. Also, the learning apparatus 2F may also acquire the inference learning program 85 from the storage medium 92. The inference learning result data 228 indicates the information regarding the trained estimator. The inference learning result data 228 is obtained as a result of executing the inference learning program 85. Note that the inference program 83F corresponds to the inference program 83 according to the above-described embodiments. The inference program 83F includes commands similar to those in the inference program 83 according to the embodiment described above except for the fact that the inference processing is executed using the trained estimator.

In this modification, the learning apparatus 2F collects local inference learning data (later-described local inference learning data 227) to be used for acquiring the capability of inferring a feature by machine learning. Here, the learning apparatus 2F may also acquire data generated by the trained generation model 41. The generation of data by the trained generation model 41 may be executed by the learning apparatus 2F, or may be executed by another computer, similarly to the embodiment described above. When the generation of data by the trained generation model 41 is executed by the learning apparatus 2F, the learning apparatus 2F includes the trained generation model 41 by retaining the learning result data 121. With this, the learning apparatus 2F may collect the local inference learning data including data generated by the trained generation model 41. Next, the learning apparatus 2F constructs a trained estimator that has acquired the capability of inferring a feature appearing in data, by performing machine learning using the collected local inference learning data. On the other hand, in the inference processing, the learning apparatus 2F acquires object data 223. Next, the learning apparatus 2F estimates the feature that appears in the object data using the trained estimator. Also, the learning apparatus 2F outputs information regarding the result of estimating the feature.

<the Process for Learning Inference>

Figure 32A:
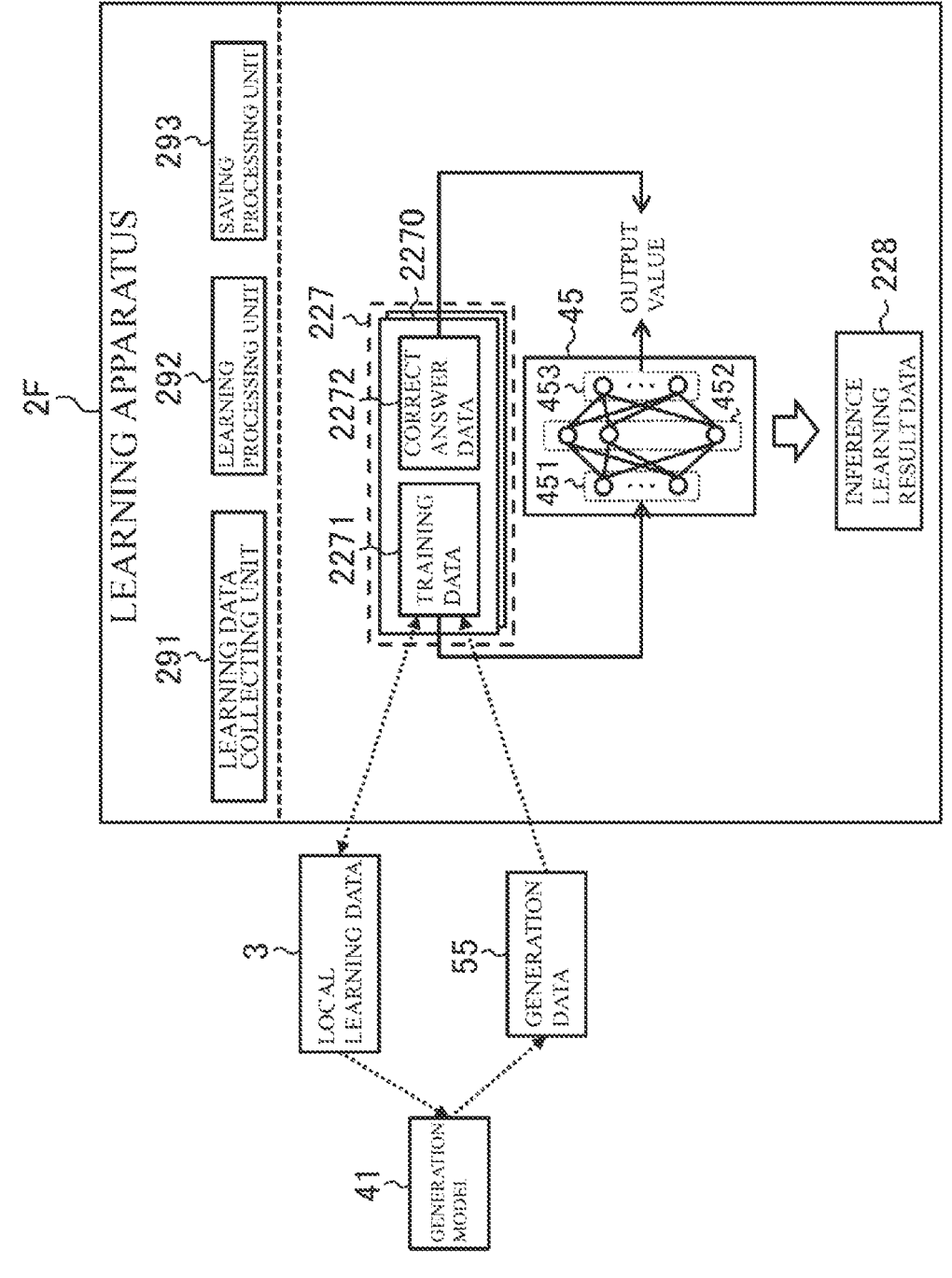
FIG. 32A is a schematic diagram illustrating an example of a software configuration for further machine learning of a learning apparatus according to a modification.

FIG. 32A schematically illustrates an example of the software configuration for the inference learning processing of the learning apparatus 2F according to this modification. The control unit 21 of the learning apparatus 2F executes the inference learning program 85 similarly to the aforementioned learning program 82, for example. With this, the learning apparatus 2F operates as a computer including a learning data collecting unit 291, a learning processing unit 292, and a saving processing unit 293 as software modules. That is, in this modification, the software modules of the learning apparatus 2F for the inference learning processing are realized by the control unit 21 (CPU).

Note that the software configuration for the inference learning processing is not limited to this example. Some of or all of the aforementioned software modules may also be realized by at least one dedicated processor. As far as the software configuration for the inference learning processing of the learning apparatus 2F is concerned, software modules can be omitted, replaced, or added as appropriate depending on the embodiment. Note that when the software modules of this modification is to be distinguished from those of the embodiments described above, this distinction may be made by denoting the learning data collecting unit 211 and the learning processing unit 212 as "first learning data collecting unit" and "first learning processing unit", respectively, and denoting the learning data collecting unit 291 and the learning processing unit 292 as "second learning data collecting unit" and "second learning processing unit", respectively.

The learning apparatus 2F according to this modification executes the machine learning of the estimator 45 by including these software modules. The estimator 45 is a learning model that can acquire a predetermined capability by machine learning, similarly to the aforementioned identification model 40 and generation model 41, and there is no particular limitation to its type, which may be selected as appropriate depending on the embodiment. As shown in FIG. 32A, the estimator 45 according to this modification is constituted by a neural network having a three-layer structure, similarly to the identification model 40 and the generation model 41. The estimator 45 includes an input layer 451, an intermediate (hidden) layer 452, and an output layer 453, in this order from the input side. Note that the structure of the estimator 45 is not limited to this example, and may be determined as appropriate depending on the embodiment. For example, the number of intermediate layers included in the estimator 45 is not limited to one, but may be two or more.

The numbers of neurons (nodes) included in the respective layers 451 to 453 of the estimator 45 may be selected as appropriate depending on the embodiment, similarly to the identification model 40 and the generation model 41. In the example in FIG. 32A, each neuron in one layer is connected to all neurons in the adjacent layer. However, the connections of neurons are not limited to this example, but may be set as appropriate depending on the embodiment. The weights of the connections between neurons included in the layers 451 to 453 and the threshold value of each neuron are examples of the computation parameters of the estimator 45 to be used in computation processing.

Figure 32B:
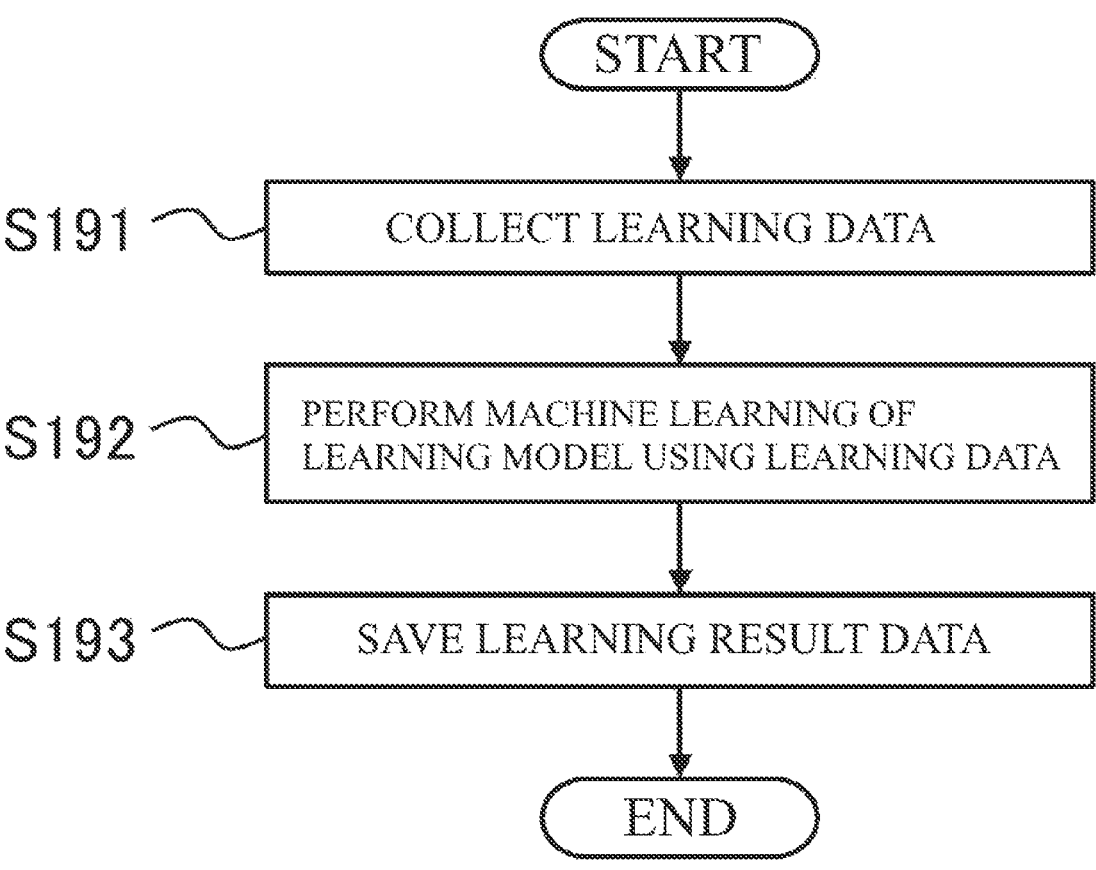
FIG. 32B is a diagram illustrating an example of a processing procedure of further machine learning by a learning apparatus according to a modification.

Next, an exemplary operation for machine learning an inference of the learning apparatus 2F according to this modification will be described, with further reference to FIG. 32B. FIG. 32B is a flowchart illustrating an example of the processing procedure regarding the machine learning of the estimator 45 by the learning apparatus 2F according to this modification. Note that the processing procedure described below is merely an example, and the processing may be modified to the extent possible. Also, in the processing procedure described below, steps may also be omitted, replaced, or added as appropriate depending on the embodiment.

(Step S191)

In step S191, the control unit 21 operates as the learning data collecting unit 291, and collects the local inference learning data 227 to be used for the machine learning of the estimator 45. In this modification, since the estimator 45 is constituted by a neural network, the control unit 21 collects the local inference learning data 227 constituted by a plurality of learning data sets 2270 that each include a combination of training data 2271 and correct answer data 2272.

The training data 2271 (input data) is data regarding which a predetermined capability is to be exerted. In this modification, the training data 2271 may be data of the same type as the sensing data obtained by the sensor S, and may be data constituting the local learning data 3. The correct answer data 2272 (supervisor data) is data indicating the result (correct answer) of exerting the predetermined capability regarding the training data 2271. The aforementioned label may be used as the correct answer data 2272.

The method of acquiring the learning data sets 2270 is not limited in particular, and may be selected as appropriate depending on the embodiment. For example, a sensor of the same type as the sensor S is prepared, and measurements are performed under various conditions by the prepared sensor, and with this, the training data 2271 can be acquired. Also, correct answer data 2272 indicating the feature appearing in the training data 2271 is associated with the acquired training data 2271. With this, the learning data sets 2270 can be generated.

The learning data sets 2270 may be automatically generated by the operation of a computer, or may be manually generated by an operator's manipulation. Also, the learning data sets 2270 may be generated by the learning apparatus 2F, or may be generated by a computer other than the learning apparatus 2F. When the learning data sets 2270 are generated by the learning apparatus 2F, the control unit 21 collects the local inference learning data 227 constituted by the plurality of learning data sets 2270 by executing the series of processing described above automatically, or manually by an operator's manipulation via the input apparatus 24. On the other hand, when the learning data sets 2270 are generated by another computer, the control unit 21 collects the local inference learning data 227 constituted by the plurality of learning data sets 2270 generated by the other computer via a network, a storage medium 92, or the like.

Also, the local learning data 3 may also be used as at least some of the local inference learning data 227. In this case, the learning data sets 2270 can be generated by assigning the correct answer data 2272 to the data constituting the local learning data 3 as appropriate.

Moreover, the data generated by the generation model 41 may be used as at least some of the local inference learning data 227. The generation of data by the trained generation model 41 may be executed by the learning apparatuses 2, or may also be executed by another computer. When the generation of data by the trained generation model 41 is executed by the learning apparatus 2F, the control unit 21 includes the trained generation model 41 by retaining the learning result data 121. The control unit 21 may also acquire the learning result data 121 generated by the aforementioned learning processing via a network, a storage medium 92, or the like. In this case, the control unit 21 sets the trained generation model 41 by referring to the learning result data 121. Also, the control unit 21 extracts a plurality of noises from a predetermined probability distribution such as a Gaussian distribution. Then, the control unit 21 inputs the extracted noises to the input layer 411 of the generation model 41, and determines, sequentially from the input side, how each of the neurons included in the layers 411 to 413 fires. With this, the control unit 21 acquires generated data corresponding to each noise from the output layer 413. The control unit 21 can acquire the local inference learning data 227 including the data generated by the trained generation model 41 by adding the acquired data to the local inference learning data 227 as the training data 2271. Alternatively, the control unit 21 may also acquire data generated by another computer using the trained generation model 41 via a network, a storage medium 92, or the like.

Also, the control unit 21 may also request the model generation apparatus 1 to construct the generation model 41 with respect to the local learning data 3 constituted by the training data 2271 included in the local inference learning data 227 and/or the local learning data 3 separately prepared from the local inference learning data 227. Also, the control unit 21 may also generate generation data 55 of the same type as the sensing data obtained by the sensor S using the trained generation model 41 constructed in this way, and use the generated generation data 55 as the training data 2271.

The correct answer data 2272 may be given to the generation data 55 as appropriate. With this, the control unit 21 may also increase the number of learning data sets 2270 included in the local inference learning data 227.

The number of learning data sets 2270 to be collected is not limited in particular, and may be selected as appropriate depending on the embodiment. Upon collecting the local inference learning data 227, the control unit 21, advances the processing to the next step S192.
(Step S192)

In step S192, the control unit 21 operates as the learning processing unit 292, and executes the machine learning of the estimator 45 using the collected local inference learning data 227. In this machine learning, the control unit 21 trains the estimator 45 such that, with respect to each learning data set 2270, when the training data 2271 is input to the input layer 451, an output value that matches the correct answer data 2272 is output from the output layer 453. With this, the control unit 21 constructs a trained estimator 45 that has acquired the capability of inferring the feature appearing in the data obtained by the sensor S.

Specifically, the control unit 21 prepares an estimator 45 regarding which the processing of machine learning is to be performed. The structure of the estimator 45 to be prepared, the initial values of weights of the connections between neurons, and the initial values of threshold values of the neurons may be given by a template, or may also be given by an operator's input. Also, when relearning is performed, the control unit 21 may also prepare the estimator 45 based on learning result data obtained by performing machine learning in the past.

Next, the control unit 21 executes the learning processing of the estimator 45 using the training data 2271 and the correct answer data 2272 included in each learning data set 2270 acquired in step S191.

For example, in the first step, with respect to each learning data set 2270, the control unit 21 inputs the training data 2271 to the input layer 451, and determines how each neuron included in the layers 451 to 453 first, sequentially from the input side. With this, the control unit 21 acquires an output value corresponding to the result of inferring the feature appearing in the training data 2271 from the output layer 453. In the second step, the control unit 21 calculates the error between the acquired output value and the value of the corresponding correct answer data 2272. In the third step, the control unit 21 calculates errors of the weights of the connections between neurons and the threshold values of the neurons, using the calculated error of the output value, by back propagation. In the fourth step, the control unit 21 updates the values of the weights of the connections between the neurons and the threshold values of the neurons based on the calculated errors.

The control unit 21 adjusts the values of the computation parameters of the estimator 45 such that, with respect to each learning data set 2270, when the training data 2271 is input, an output value that matches the corresponding correct answer data 2272 is output from the output layer 453, by repeating the first to fourth steps. For example, the control unit 21 repeats the first to fourth steps until, with respect to the learning data sets 2270, the sum of errors between the output values obtained from the output layer 453 and the values of the corresponding correct answer data 2272 is reduced to a threshold value or less. That the value of the correct answer data 2272 matches the output value of the output layer 453 may include a case where an error of the threshold value occurs between the value of the correct answer data 2272 and the output value of the output layer

453. The threshold value may be set as appropriate depending on the embodiment. With this, the control unit 21 can construct a trained estimator 45 that has been trained to output, when the training data 2271 is input, an output value that matches the corresponding correct answer data 2272. That is, the control unit 21 can construct a trained estimator 45 that has acquired the capability of inferring the feature appearing in the data obtained by the sensor S. The trained estimator 45 may also be referred to as "discriminator". Upon completing the machine learning of the estimator 45, the control unit 21, advances the processing to the next step S193.

(Step S193)

In step S193, the control unit 21 operates as the saving processing unit 293, and saves the information regarding the trained estimator 45 that has been constructed by machine learning in a predetermined storage area. In this modification, the control unit 21 generates information indicating the structure and the computation parameters of the trained estimator 45 constructed by machine learning in step S192, as the inference learning result data 228. Also, the control unit 21 saves the generated learning result data 228 in a predetermined storage area. The predetermined storage area may be the RAM in the control unit 21, the storage unit 22, an external storage apparatus, or a storage medium, or a combination of these, for example.

<Inference Processing>

Figure 33:
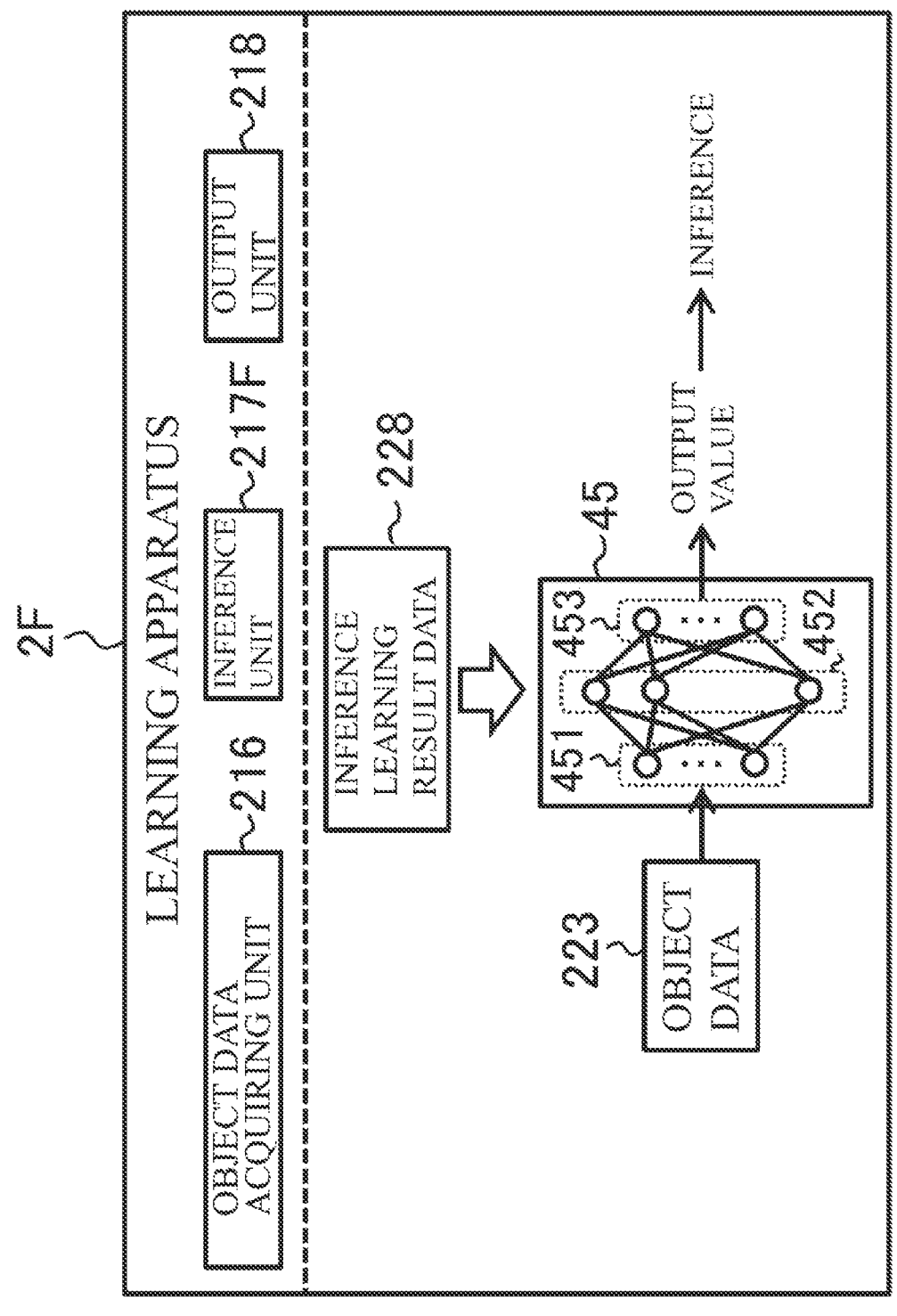
FIG. 33 is a schematic diagram illustrating an example of a software configuration for inference processing of the learning apparatus according to a modification.

FIG. 33 schematically illustrates an example of the software configuration for the inference processing of the learning apparatus 2F according to this modification. Similarly to the embodiment described above, the software configuration for the inference processing of the learning apparatus 2F is realized by the control unit 21 executing the inference program 83F. As shown in FIG. 32B, the software configuration for the inference processing of the learning apparatus 2F is similar to the software configuration for the inference processing of the learning apparatuses 2 described above except that the inference method is different. Accordingly, the learning apparatus 2F executes the series of processing regarding the inference processing similarly to the above-described learning apparatuses 2.

That is, the control unit 21 of the learning apparatus 2F executes the processing in steps S301 and S303 similarly to the embodiment described above. On the other hand, in step S302, the control unit 21 of the learning apparatus 2F operates as an inference unit 217F, and infers the feature appearing in the object data 223 using the trained estimator 45. In the present embodiment, the inference unit 217F includes the trained estimator 45 by retaining the inference learning result data 228.

Specifically, the control unit 21 configures the setting of the trained estimator 45 by referring to the inference learning result data 228. Next, the control unit 21 inputs the acquired object data 223 to a trained estimator 45, and executes the computation processing of the trained estimator 45. That is, the control unit 21 inputs the object data 223 to the input layer 451 of the trained estimator 45, and determines how each neuron included in the layers 451 to 453 first, sequentially from the input side. With this, the control unit 21 acquires an output value corresponding to the result of inferring the feature included in the object data 223 from the output layer 453 of the trained estimator 45.

In this modification, the learning apparatus 2F is configured to infer a feature appearing in the object data 223 using the trained estimator 45. In this case, the number of pieces of the local inference learning data 227 to be used for machine learning of the estimator 45 can be increased by the data (generation data 55) generated by the trained generation model 41. In particular, with the generation model 41, data that is difficult to collect by an individual learning apparatus 2F, but that may be obtained by another learning apparatus 2F can be generated. Therefore, the variation of the training data 2271 included in the local inference learning data 227 can be increased, and with this, the performance of the trained estimator 45 to be constructed by machine learning can be improved. That is, in step S302, the feature that appears in the object data 223 can be accurately inferred.

Note that the learning apparatuses regarding which the generation model 41 is generated by the model generation apparatus 1 may include both of a learning apparatus that executes inference processing with a method similar to that of the learning apparatus 2 according to the embodiment described above and a learning apparatus that executes inference processing with a method similar to that of the learning apparatus 2F according to this modification, in a mixed manner. Also, the inspection apparatus 2A, monitoring apparatus 2B, monitoring apparatus 2C, estimating apparatus 2D, and diagnosis apparatus 2E according to the modifications described above may also be configured to execute inference by a trained estimator, similarly to this modification.

<4.3>

In the embodiment described above, each learning apparatus 2 is constituted by a computer that executes both of the learning processing and the inference processing. However, the configuration of the learning apparatuses 2 is not limited to this example. At least one of the plurality of learning apparatuses 2 may also be constituted by a plurality of computers. In this case, the learning apparatus 2 may be configured such that the learning processing and inference processing are executed by different computers.

Figure 34:
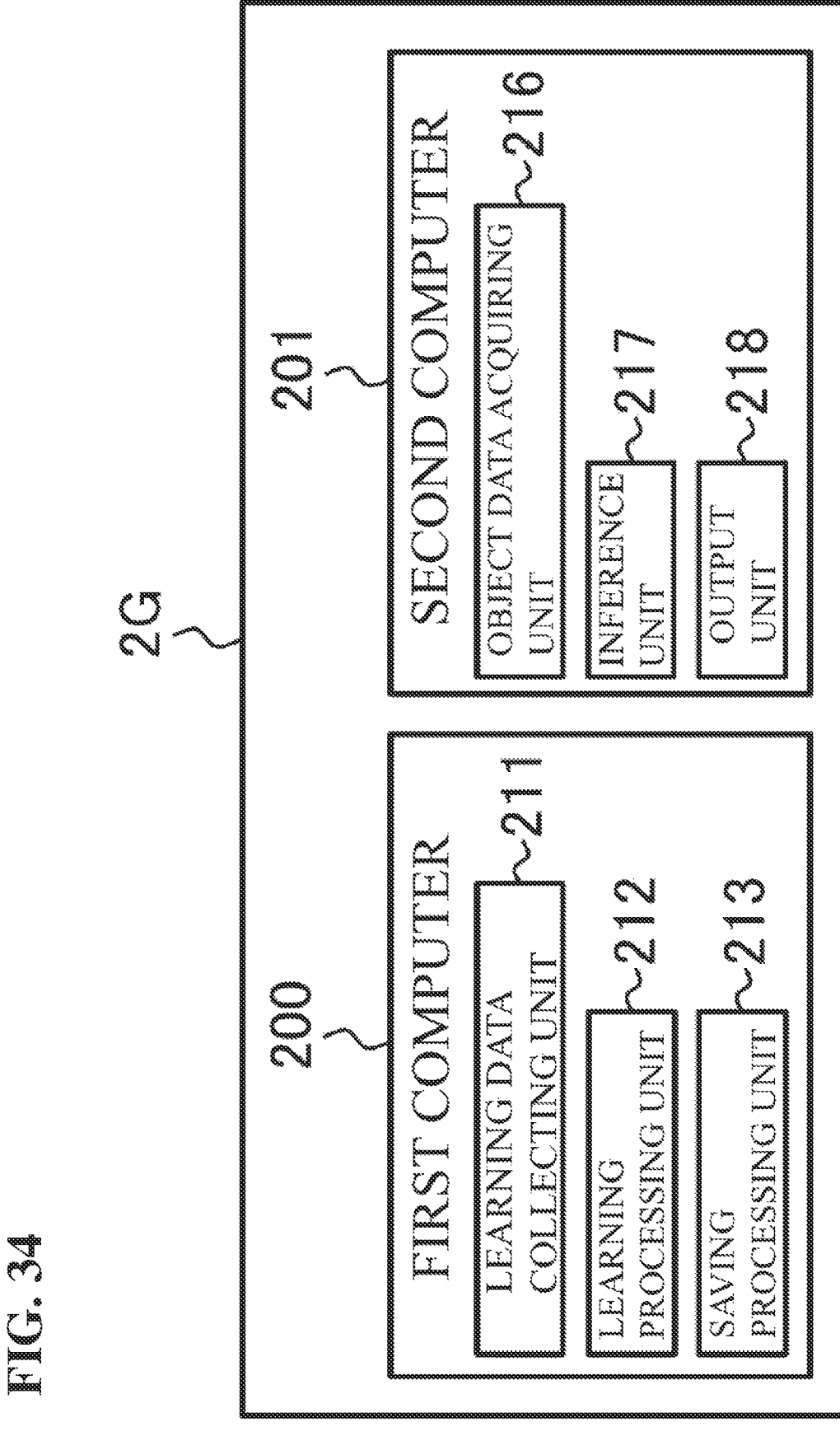
FIG. 34 is a schematic diagram illustrating an example of a configuration of a learning apparatus according to a modification.

FIG. 34 schematically illustrates an example of a learning apparatus 2G according to this modification. In this modification, the learning apparatus 2G includes a first computer 200 configured to execute the aforementioned learning processing and a second computer 201 configured to execute the aforementioned inference processing. The hardware configuration of the first computer 200 and second computer 201 may be similar to the hardware configuration of the learning apparatuses 2 according to the embodiment described above. The first computer 200 operates as a computer that includes the learning data collecting unit 211, the learning processing unit 212, and the saving processing unit 213 as software modules, by executing the learning program 82. The second computer 201 operates as a computer that includes the object data acquiring unit 216, the inference unit 217, and the output unit 218 as software modules, by executing the inference program 83. In this case, the first computer 200 may be treated as a "learning apparatus". Note that the same applies to the inspection apparatus 2A, monitoring apparatus 2B, monitoring apparatus 2C, estimating apparatus 2D, and diagnosis apparatus 2E according to the modifications described above. Also, when the learning apparatus 2G is configured to execute the inference processing with a method similar to that of the learning apparatus 2F according to the modification described above, the learning apparatus 2G may also further include a third computer (not illustrated). The third computer may operate as a computer including the learning data collecting unit 291, learning processing unit 292, and saving processing unit 293 described above as software modules, by executing the inference learning program 85.

<4.4>

In the embodiment described above, in the process of deriving the result 51 of the identification performed by the identification models 40, each learning apparatus 2 integrates, in the calculation of Formulas 3 and 4, the computation results using the computation results of the other learning apparatuses 2, that is, calculates the total sum. Also, the model generation apparatus 1 integrates, in the calculation of Formula 7, the computation results of the respective learning apparatuses 2, using the computation results. These computation results are related to the local learning data 3, and therefore, if these computation results are disclosed, the local learning data 3 retained by the learning apparatuses 2 can be estimated. Therefore, in order to further improve the confidentiality of the local learning data 3 retained by the learning apparatuses 2, the results 51 of the identification by the respective identification models 40 may be integrated by a secret calculation. The method of secret calculation is not limited in particular, and may be selected as appropriate depending on the embodiment. In this modification, a method of using one of secret sharing and homomorphic encryption may be adopted.

(A) Method of Using Secret Sharing

Figure 35A:
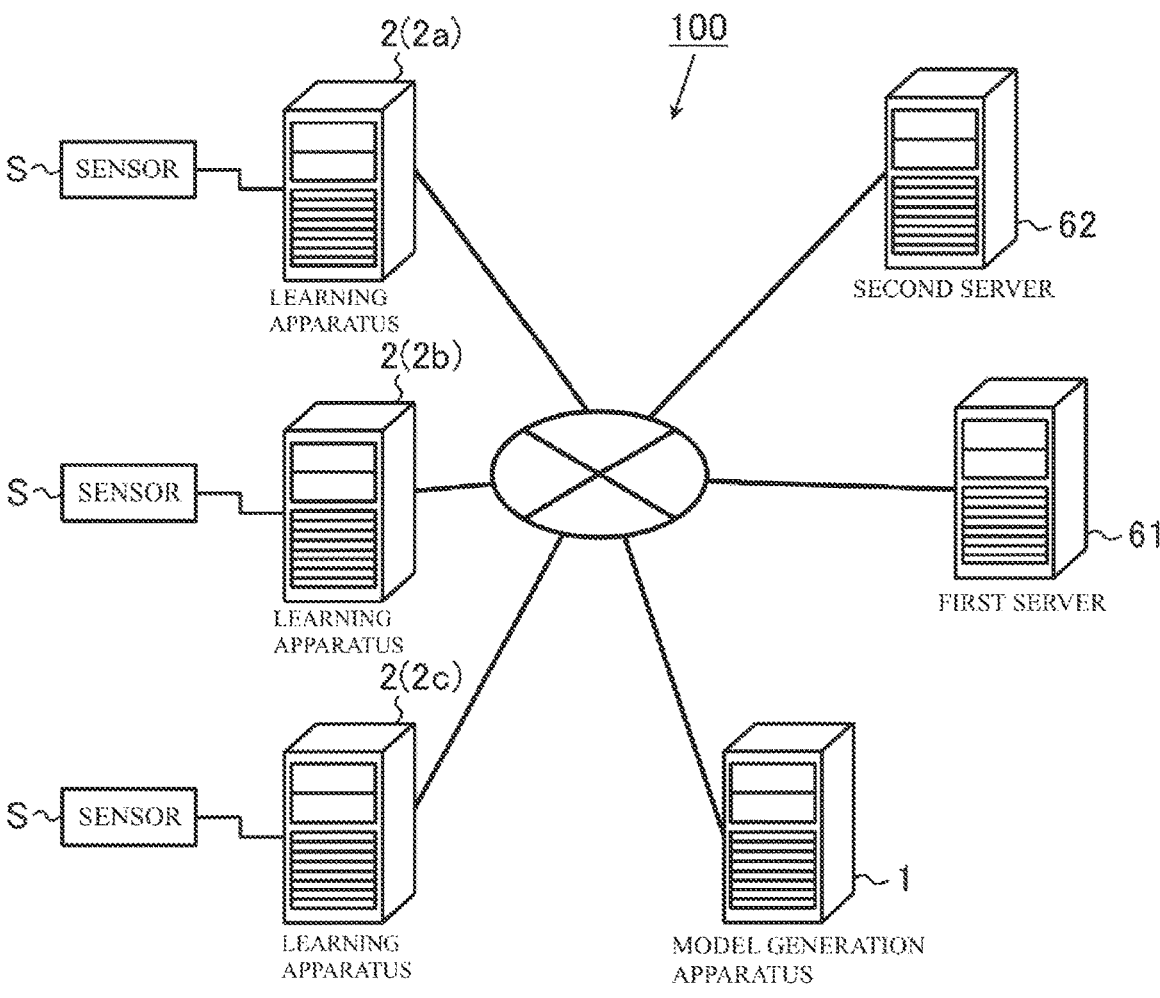
FIG. 35A is a schematic diagram illustrating an example of a scenario for performing a secret calculation with a modification.

FIG. 35A schematically illustrates an example of a scenario in which integration processing using secret sharing is executed. In the method of using the secret sharing, a first server 61 and a second server 62 are installed in a network, as reliable third party apparatuses. The first server 61 and the second server 62 are each a computer including a hardware processor and a memory, similarly to the model generation apparatus 1 or the like.

In this method, first, the control unit 21 of each learning apparatus 2 generates a random number when transmitting its computation result to other computers. The scenario of transmitting its computation result to other computers includes a scenario of transmitting $\exp(ly_i)$ in Formula 3 to the other learning apparatuses 2, a scenario of transmitting $y_iS(ly_i)$ in Formula 4 to the other learning apparatuses 2, and a scenario of transmitting $V_i$ in Formula 6 to the model generation apparatus 1 for the calculation of Formula 7, in the embodiment described above. In the scenarios of Formulas 3 and 4, the other computers are the other learning apparatuses 2. Also, in the scenario of Formula 7, the other computer is the model generation apparatus 1. The method of generating the random number may be selected as appropriate depending on the embodiment. Next, the control unit 21 calculates the difference between the value of the computation result and the generated random number. Then, the control unit 21 transmits the generated random number to the second server 62 while transmitting the calculated difference to the first server 61.

In response thereto, the first server 61 calculates the total sum of differences received from the respective learning apparatuses 2, as in the following Formula 8. On the other hand, the second server 62 calculates the total sum of the random numbers received from the respective learning apparatuses 2, as in the following Formula 9.

[Math. 8]

$$\Sigma_i(Y_i\text{-}r_i) \tag{Formula 8}$$

[Math. 9]

$$\Sigma_i r_i \tag{Formula 9}$$

Note that $Y_i$ represents the value of result of computation by the $i^{th}$ learning apparatus 2. That is, $Y_i$ is $\exp(ly_i)$ in the scenario of Formula 3, $Y_i$ is $y_iS(ly_i)$ in the scenario of Formula 4, and $Y_i$ is $V_i$ in the scenario of Formula 7. $r_i$ represents the random number generated by the $i^{th}$ learning apparatus 2.

The first server 61 and the second server 62 respectively transmit the calculation results of total sum to another computer. The other computer adds the total sums received from the first server 61 and the second server 62. With this, another computer can integrate the computation results of the respective learning apparatuses 2 regarding the results 51 of the identification (that is, calculate the total sum) while the other computer is prevented from specifying the computation result retained by each learning apparatus 2.

Note that the method of secret sharing is not limited in particular, and may be selected as appropriate depending on the embodiment. The international standard method (ISO/IEC 19592-2:2017) or the like may be used as the secret sharing. Also, if the model generation apparatus 1 is a reliable server, the model generation apparatus 1 may also operate as one of the first server 61 and the second server 62.

(B) Method of Using Homomorphic Encryption

Figure 35B:
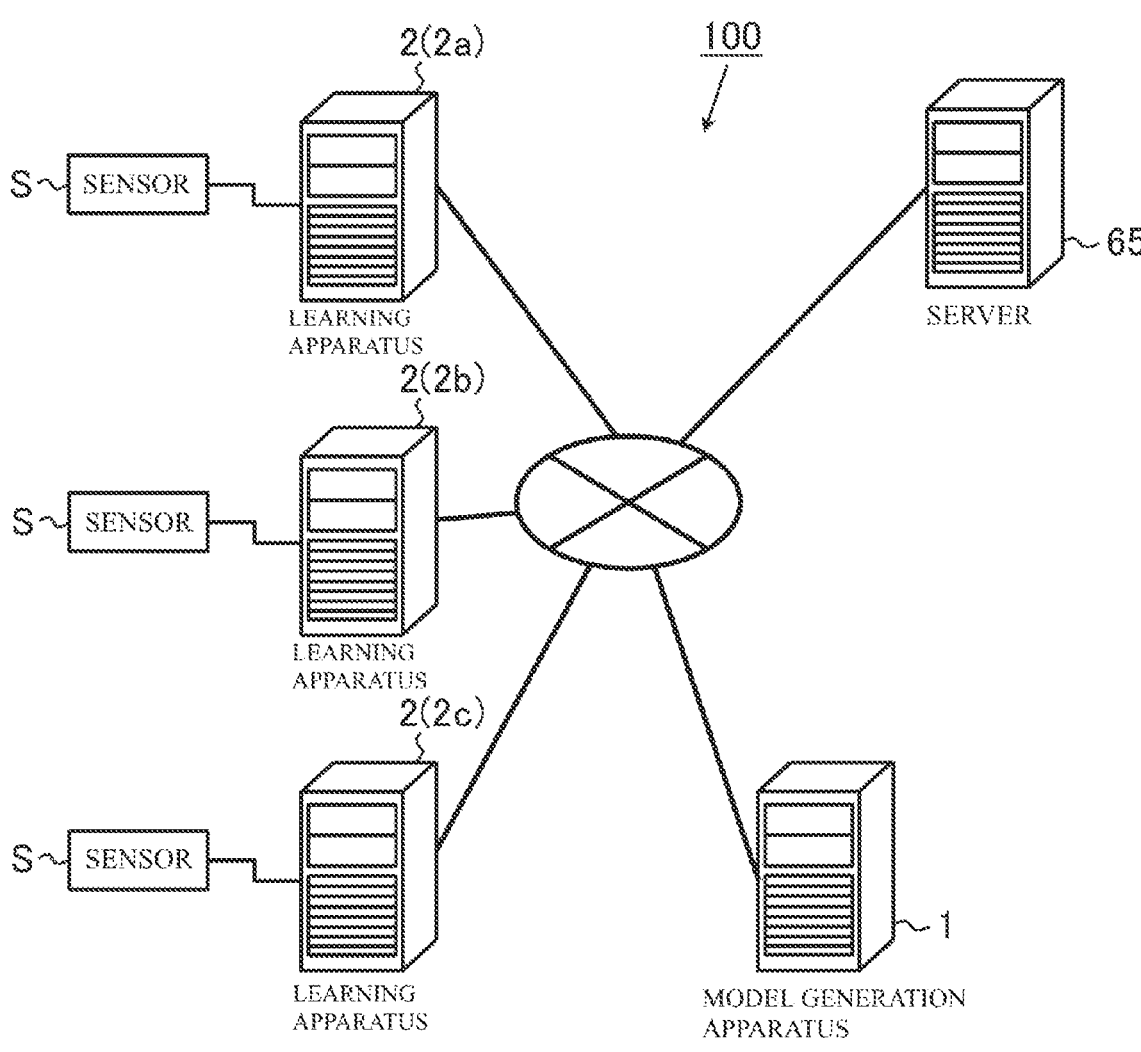
FIG. 35B is a schematic diagram illustrating an example of the scenario for performing a secret calculation with a modification.

FIG. 35B schematically illustrates an example of a scenario in which integration processing using homomorphic encryption is executed. In the method of using homomorphic encryption, a server 65 is installed in a network, as a reliable third party apparatus. The server 65 is a computer including a hardware processor and a memory, similarly to the model generation apparatus 1, for example.

In this method, first, the server 65 issues a public key and a private key. The public key is generated with homomorphism. That is, the public key is generated such that, when two encoded texts that have been encrypted by the public key are given, the two encoded texts can be added directly in an encrypted state. The server 65 distributes the public key, of the issued public key and private key, to each learning apparatus 2.

The control unit 21 of each learning apparatus 2 encrypts its own computation result with the received public key. Then, the control unit 21 transmits the encrypted computation result to another computer. The other computer calculates the total sum of the values of the computation results received from the respective learning apparatuses 2 directly in an encrypted state, as in the following Formula 10.

[Math. 10]

$$P(\Sigma_i Y_i) \tag{Formula 10}$$

Note that P represents encryption by a public key.

The other computer transmits the encrypted total sum to the server 65. The server 65 decrypts the encrypted total sum received from the other computer with the private key. Also, the server 65 returns the decrypted total sum of computation results to the other computer. With this, the other computer can integrate the computation results regarding the results 51 of the identification of the respective learning apparatuses 2 while the other computer is prevented from specifying the computation results retained by the respective learning apparatuses 2.

Note that the method of homomorphic encryption is not limited in particular, and may be selected as appropriate depending on the embodiment. Modified-ElGamal encryption, Paillier encryption, or the like may be used as the homomorphic encryption method. Also, if the model generation apparatus 1 is a reliable server, the model generation apparatus 1 may also operate as the server 65.

As described above, according to this modification, with one of the methods described above, results 51 of the identification of the respective identification models 40 can be integrated using the secret calculation. Accordingly, the confidentiality of the local learning data 3 retained by each learning apparatus 2 can further be improved.

<4.5>

In the embodiment and modifications described above, the identification model 40, the generation model 41, and the estimator 45 are each constituted by a fully connected neural network having a three-layer structure. However, the structure and the type of the neural networks that constitute the identification model 40, the generation model 41, and the estimator 45 are not limited to this example, may be and selected as appropriate depending on the embodiment. For example, the identification model 40, the generation model 41, and the estimator 45 may each be constituted by a convolutional neural network including a convolutional layer, a pooling layer, and a fully connected layer. Also, when time series data is used, the identification model 40, the generation model 41, and the estimator 45 may each be constituted by a recurrent neural network, for example. The types of the identification model 40, the generation model 41, and the estimator 45 may be selected as appropriate depending on the embodiment.

Note that, in the machine learning described above, as a result of using data to which an additional condition (e.g., label) is given as the local learning data 3, a conditional generation model that can generate data in accordance with an additional condition can be constructed. The generation model 41 described above may also be such a conditional generation model. In this case, the generation model 41 may be constructed to generate pieces of data respectively corresponding to a plurality of groups by giving information indicating the group as additional information. The additional condition need only be a condition regarding the type of data to be generated by the generation model 41, and may also be given by the attribute of data to be generated, the attribute of a feature appearing in the data to be generated, or the like. When the data to be generated is image data, attributes of data to be generated may be the resolution of image data, the number of pixels, an attribute indicating whether or not a defect is present, or the like. Also, attributes of features appearing in the data to be generated may be the attributes of an object regarding which inference is performed, the type of an object, or the like.

<4.6>

In the embodiment described above, the number of identification models 40 to be constructed by each learning apparatus 2 is not limited to one, and a plurality of models may also be constructed. When a plurality of identification models 40 are retained, each learning apparatus 2 may collect the local learning data 3 separately for each identification model 40, or may collect the local learning data 3 that can be at least partially shared by at least some of identification models 40.

Also, in the embodiment described above, the identification models 40 are retained by the respective learning apparatuses 2. However, the arrangement of the identification models 40 is not limited to this example. For example, at least some of the plurality of identification models 40 may also be retained by the model generation apparatus 1.

Also, in the embodiment described above, the grouping processing may be omitted. When the first grouping method is omitted, the group list 123 may be omitted. When the grouping processing is omitted, the assignment information 124 may be omitted. Also, the grouping unit 116 may be omitted from the software configuration of the model generation apparatus 1.

Also, in the embodiment described above, the data may be replaced by an individual type of data such as image data, sound data, numerical data, text data, measurement data obtained by a sensor, or the like. For example, as a result of the local learning data 3 including image data, an image generation system can be configured by the model generation apparatus 1 and the plurality of learning apparatuses 2. Also, as a result of the local learning data 3 including sensing data obtained by a sensor, a sensing data generation system can be configured by the model generation apparatus 1 and the plurality of learning apparatuses 2, for example.

INDEX TO THE REFERENCE NUMERALS

1 Model generation apparatus
11 Control unit
12 Storage unit
13 Communication interface
14 Input apparatus
15 Output apparatus
16 Drive
111 Generating unit
112 Transmitting unit
113 Receiving unit
114 Learning processing unit
115 Saving processing unit
116 Grouping unit
121 Learning result data
123 Group list
124 Assignment information
81 Model generation program
91 Storage medium
2 Learning apparatus
21 Control unit
22 Storage unit
23 Communication interface
24 Input apparatus
25 Output apparatus
26 Drive
27 External interface
211 Learning data collecting unit
212 Learning processing unit
213 Saving processing unit
216 Object data acquiring unit
217 Inference unit
218 Output unit
221 Learning result data
223 Object data
225 Data group
82 Learning program
83 Inference program
92 Storage medium
S Sensor
3 Local learning data
40 Identification model
401 Input layer
402 Intermediate (hidden) layer
403 Output layer
41 Generation model
411 Input layer
412 Intermediate (hidden) layer
413 Output layer
50 Data
51 (Identification) Result

The invention claimed is:

1. A model generation system comprising:

a plurality of learning apparatuses;

a third party computer configured to issue a public key and a private key, and distribute the public key to the plurality of learning apparatuses, the public key having been generated with homomorphism; and a model generation apparatus comprising a processor configured with a program to perform operations comprising:

operation as a generating unit configured to obtain noise according to a predetermined probability distribution, input the noise into a generation model, and generate data using the generation model, the generated data being of a same type as local learning data; and operation as a transmitting unit configured to transmit the generated data to the plurality of learning apparatuses, each learning apparatus retaining a respective one of a plurality of independently trained identification models that each have acquired, by machine learning using respective local learning data, a capability of identifying whether the transmitted data originates from the respective local learning data, wherein each of the plurality of learning apparatuses is configured to cause the respective identification model to identify whether the transmitted data originates from the respective learning data, and encrypt results of the identification performed by the respective identification model using the public key distributed from the third party computer, another computer, comprising one of the plurality of learning apparatuses or the model generation apparatus, is configured to calculate a total sum of the encrypted results of the plurality of learning apparatuses in an encrypted state, and to transmit the total sum to the third party computer, the third party computer is configured to decrypt the total sum using the private key, and the processor of the model generation apparatus is configured with the program to perform operations further comprising:

operation as a receiving unit configured to receive the decrypted total sum, which corresponds to integrated results of the identification performed by the identification models of the plurality of learning apparatuses; and operation as a learning processing unit configured to train the generation model to generate data that causes identification performance of at least one of the plurality of identification models to be degraded so as to generate an erroneous identification of the data as originating from the respective local learning data by performing machine learning using the decrypted total sum, which corresponds to the integrated results of the identification.

2. The model generation system according to claim 1, wherein the processor of the model generation apparatus is configured with the program to perform operations further comprising operation as a grouping unit configured to assign each learning apparatus to at least one of a plurality of groups, a generation model is retained for each group, the processor of the model generation apparatus is configured with the program such that operation as the receiving unit comprises receiving, for each group, the results of identification performed by the identification models from the respective learning apparatuses, and operation as the learning processing unit comprises training, for each group, the corresponding generation model to generate data that causes the generation of the erroneous identification by the at least one of the plurality of identification models by performing machine learning using the received results of identification.

3. The model generation system according to claim 2, wherein the processor of the model generation apparatus is configured with the program such that operation as the grouping unit comprises distributing a list of the plurality of groups to each learning apparatus, causing the learning apparatus to select at least one group from the plurality of groups on the list, and assigning the learning apparatuses to their selected at least one group.

4. The model generation system according to claim 2, wherein the processor of the model generation apparatus is configured with the program such that operation as the grouping unit comprises:

acquiring attribute data regarding the local learning data from each learning apparatus, performing clustering of the attribute data acquired from the learning apparatuses, and assigning each of the plurality of learning apparatuses to at least one of the plurality of groups based on the clustering result.

5. The model generation system according to claim 1, wherein the processor of the model generation apparatus is configured with the program to perform operations further comprising operation as a grouping unit configured to assign each learning apparatus to at least one of a plurality of groups, a generation model is retained for each group, the processor is configured with the program such that operation as the receiving unit comprises receiving, for each group, the results of identification performed by the identification models from the respective learning apparatuses, and operation as the learning processing unit comprises training, for each group, the corresponding generation model to generate data that causes the generation of the erroneous identification by the at least one of the plurality of identification models by performing machine learning using the received results of identification.

6. A model generation system comprising:

a plurality of learning apparatuses;

a third party computer configured to issue a public key and a private key, and distribute the public key to the plurality of learning apparatuses, the public key having been generated with homomorphism; and a model generation apparatus, wherein each learning apparatus of the plurality of learning apparatuses comprises a first processor configured with a first program to perform operations comprising:

collecting local learning data; and constructing a trained identification model that has acquired, by machine learning using local learning data, a capability of identifying whether given data is local learning data, and the model generation apparatus comprises a second processor configured to perform, for the plurality of learning apparatuses, operations comprising:

obtaining noise according to a predetermined probability distribution, inputting the noise into a generation model, and generating data using the generation model, the generated data being of a same type as local learning data; and transmitting the generated data to the plurality of learning apparatuses, each of the plurality of learning apparatuses is configured to cause the respective identification model to identify whether the transmitted data originates from the respective learning data, and encrypt results of the identification that was performed by the respective identification model using the public key distributed from the third party computer, another computer, which is one of the plurality of learning apparatuses or the model generation apparatus, is configured to calculate a total sum of the encrypted results of the plurality of learning apparatuses in an encrypted state, and to transmit the total sum to the third party computer, the third party computer is configured to decrypt the total sum using the private key, and the second processor of the model generation apparatus is configured with the program to perform operations further comprising:

receiving the decrypted total sum, which corresponds to integrated results of the identification performed by the identification models of the plurality of the learning apparatuses; and training the generation model to generate data that causes an identification performance of at least one of the plurality of identification models to be degraded so as to generate an erroneous identification of the data as originating from the respective local learning data by performing machine learning using the decrypted total sum, which corresponds to the integrated results of the identification.

7. A model generation method, comprising:

Issuing, by a third party computer, a public key and a private key;

distributing, by the third party computer, the public key to each of a learning apparatuses, wherein the public key having been generated with homomorphism;

obtaining, by a model generation apparatus, noise according to a predetermined probability distribution;

inputting, by the model generation apparatus, the noise into a generation model;

generating, by the model generation apparatus, data using a generation model, the generated data being of a same type as local learning data;

transmitting, by the model generation apparatus, the generated data to a plurality of learning apparatuses, each learning apparatus retaining a respective one of a plurality of independently trained identification models that each have acquired, by machine learning using local learning data, a capability of identifying whether given data is local learning data;

causing, by each of the plurality of learning apparatuses, the respective identification model to perform an identification on the given data;

encrypting, by each of the plurality of learning apparatuses, the results of the identification using the public key distributed from the third party computer;

calculating, by another computer, which is one of the plurality of learning apparatuses or the model generation apparatus, a total sum of the encrypted results of the plurality of learning apparatuses in an encrypted state, and transmitting the total sum of the third party computer;

decrypting, by the third party computer, the total sum using the private key;

receiving, by the model generation apparatus, the decrypted total sum, which corresponds to integrated results of identification with respect to the transmitted data executed by the plurality of trained identification models of the plurality of the learning apparatuses; and training, by the model generation apparatus, the generation model to generate data that causes an identification performance of at least one of the plurality of identification models to be degraded so as to generate an erroneous identification of the data as originating from the respective local learning data by performing machine learning using the decrypted total sum, which corresponds to the integrated results of the identification.

8. An inspection system comprising:

a plurality of inspection apparatuses; and a third party computer configured to issue a public key and a private key, and distribute the public key to the plurality of inspection apparatuses, the public key having been generated with homomorphism; and a model generation apparatus, wherein each inspection apparatus of the plurality of inspection apparatuses comprises a first processor configured with a first program to perform operations comprising:

collecting local learning data including product image data of a product image; and constructing a trained identification model that has acquired, by machine learning using local learning data, a capability of identifying whether given data is product image data included in the local learning data, and the model generation apparatus comprises a second processor configured with a second program to perform, for the plurality of inspection apparatuses, operations comprising:

obtaining noise according to a predetermined probability distribution;

inputting the noise into a generation model; and generating image data using a generation model, the generated image data being of a same type as the product image data included in the local learning data; and transmitting the generated image data to each inspection apparatus of the plurality of inspection apparatuses, wherein each of the plurality of inspection apparatuses is configured to cause the respective identification model to identify whether the transmitted data originates from the respective learning data, and encrypt results of the identification performed by the respective identification model using the public key distributed from the third party computer, another computer, comprising one of the plurality of inspection apparatuses or the model generation apparatus, is configured to calculate a total sum of the encrypted results of the plurality of inspection apparatuses in an encrypted state, and to transmit the total sum to the third party computer, the third party computer is configured to decrypt the total sum using the private key, and the second processor of the model generation apparatus is configured with the program to perform operations further comprising:

receiving the decrypted total sum, which corresponds to integrated results of the identification performed by the identification models of the plurality of inspection apparatuses; and training the generation model to generate image data that causes an identification performance of at least one of the plurality of identification models to be degraded so as to generate an erroneous identification of the data as originating from the respective local learning data by performing machine learning using the decrypted total sum, which corresponds to the integrated results of the identification.

9. A monitoring system comprising:

a plurality of monitoring apparatuses that each monitors a cultivation condition of a plant; and a third party computer configured to issue a public key and a private key, and distribute the public key to the plurality of monitoring apparatuses, the public key having been generated with homomorphism; and a model generation apparatus, wherein each monitoring apparatus comprises a first processor configured with a first program to perform operations comprising:

collecting local learning data including condition data regarding a cultivation condition of the plant; and constructing a trained identification model that has acquired, by machine learning using local learning data, a capability of identifying whether given data is condition data included in the local learning data, and the model generation apparatus comprises a second processor configured with a second program to perform operations comprising:

obtaining noise according to a predetermined probability distribution;

inputting the noise into a generation model;

generating pseudo-condition data using a generation model, the generated pseudo-condition data being of a same type as local learning data; and transmitting the generated pseudo-condition data to each monitoring apparatus, wherein each of the plurality of monitoring apparatuses is configured to cause the respective identification model to identify whether the transmitted data originates from the respective learning data, and encrypt results of the identification performed by the respective identification model using the public key distributed from the third party computer, another computer, comprising one of the plurality of monitoring apparatuses or the model generation apparatus, is configured to calculate a total sum of the encrypted results of the plurality of monitoring apparatuses in an encrypted state, and to transmit the total sum to the third party computer, the third party computer is configured to decrypt the total sum using the private key, and the second processor of the model generation apparatus is configured with the program to perform operations further comprising:

receiving the decrypted total sum, which corresponds to integrated results of the identification performed by the identification models of the plurality of monitoring apparatuses; and training the generation model to generate pseudo-condition data that causes an identification performance of at least one of the plurality of identification models to be degraded so as to generate an erroneous identification of the data as originating from the respective local learning data by performing machine learning using the decrypted total sum, which corresponds to the integrated results of the identification.

\* \* \* \* \*